(12) United States Patent
Konduc

(10) Patent No.: US 11,274,465 B2
(45) Date of Patent: Mar. 15, 2022

(54) TOWER ERECTION AND CLIMBING SYSTEMS

(71) Applicant: NOV CANADA ULC, Calgary (CA)

(72) Inventor: Kameron Wayne Konduc, Edmonton (CA)

(73) Assignee: NOV CANADA ULC, Calgary (CA)

( * ) Notice: Subject to any disclaimer, the term of this patent is extended or adjusted under 35 U.S.C. 154(b) by 0 days.

(21) Appl. No.: 16/930,929

(22) Filed: Jul. 16, 2020

(65) Prior Publication Data
US 2021/0207393 A1    Jul. 8, 2021

Related U.S. Application Data

(60) Provisional application No. 62/961,945, filed on Jan. 16, 2020, provisional application No. 62/956,809, filed on Jan. 3, 2020.

(51) Int. Cl.
*E04H 12/34* (2006.01)
*B66C 23/18* (2006.01)
*F03D 13/20* (2016.01)

(52) U.S. Cl.
CPC ......... *E04H 12/344* (2013.01); *B66C 23/185* (2013.01); *E04H 12/34* (2013.01); *F03D 13/20* (2016.05)

(58) Field of Classification Search
CPC ..... E04H 12/344; E04H 12/34; B66C 23/185; F03D 13/20; F03D 80/50
See application file for complete search history.

(56) References Cited

U.S. PATENT DOCUMENTS 3,250,415 A    5/1966   Wuesthoff
4,236,600 A    12/1980  Wooten
(Continued)

FOREIGN PATENT DOCUMENTS

CA        2981225 A1      10/2016
CN      201701655 U       1/2011
(Continued)

OTHER PUBLICATIONS

"WindPACT Turbine Design Scaling Studies Technical Area 3?Self-Erecting Tower and Nacelle Feasibility", Subcontractor Report—NREL/SR-500-29493. Global Energy Concepts, LLC, (March 2000-Mar. 2001), 72 pgs.
(Continued)

*Primary Examiner* — Andrew J Triggs
(74) *Attorney, Agent, or Firm* — Schwegman Lundberg & Woessner, P.A.

(57) ABSTRACT

Disclosed are tower erection systems and tower climbing systems and associated methods of operation. A tower erection system, in accordance with various embodiments, includes a ground-installed lifting structure, and a lifting frame configured to latch onto individual tower sections and traveling vertically inside the ground-installed lifting structure, lifted by a winch-and-cable or other lifting mechanism. Using this system, a tower may be assembled from multiple sections from the top down. A tower climbing system, in accordance with various embodiments, includes upper and lower climbers that can latch onto the lateral surface of a tower and a lifting mechanism that can move the climbers vertically relative to each other. The system can be used to carry a crane or other heavy equipment up and down along the tower. A climbing crane may be used, for example, during tower construction, or to reach the top of the tower for maintenance or repair.

11 Claims, 49 Drawing Sheets

(56) References Cited

U.S. PATENT DOCUMENTS

| | | | |
|---|---|---|---|
| 4,577,796 A | 3/1986 | Powers et al. | |
| 4,651,915 A | 3/1987 | Sprung | |
| 5,896,637 A | 4/1999 | Sarh | |
| 6,408,575 B1 | 6/2002 | Yoshida et al. | |
| 6,859,677 B2 | 2/2005 | Mitterholzer | |
| 7,934,585 B2 * | 5/2011 | Iversen | F03D 80/50 |
| | | | 182/142 |
| 8,042,249 B2 | 10/2011 | Kilibarda | |
| 8,534,958 B2 | 9/2013 | Bogl et al. | |
| 8,601,748 B2 * | 12/2013 | Delago | E04H 12/342 |
| | | | 52/123.1 |
| 9,243,418 B2 | 1/2016 | Bogl et al. | |
| 9,284,165 B2 * | 3/2016 | Willim | B66C 23/36 |
| 9,630,034 B2 | 4/2017 | Stewart | |
| 9,637,257 B2 | 5/2017 | Granger | |
| 9,657,495 B2 | 5/2017 | Lockwood | |
| 10,287,794 B2 * | 5/2019 | Neighbours | F03D 13/10 |
| 10,378,201 B2 | 8/2019 | Coombes et al. | |
| 10,392,083 B2 * | 8/2019 | Van Aalst | B63B 27/30 |
| 10,434,712 B1 | 10/2019 | Tran | |
| 10,487,806 B2 * | 11/2019 | Huot | E02B 17/0034 |
| 10,633,880 B2 | 4/2020 | Murata | |
| 2002/0129566 A1 | 9/2002 | Piccolo et al. | |
| 2009/0288913 A1 | 11/2009 | Nielsen | |
| 2012/0279141 A1 | 11/2012 | Wiederick et al. | |
| 2013/0026002 A1 | 1/2013 | Spangler | |
| 2013/0081337 A1 | 4/2013 | Zavitz et al. | |
| 2013/0223964 A1 | 8/2013 | Zheng et al. | |
| 2014/0102039 A1 | 4/2014 | Wagner | |
| 2014/0202971 A1 | 7/2014 | Bosco et al. | |
| 2016/0010621 A1 | 1/2016 | Zuteck | |
| 2016/0237985 A1 * | 8/2016 | Bogl | B66C 23/185 |
| 2017/0107736 A1 | 4/2017 | Lockwood | |
| 2017/0121998 A1 | 5/2017 | Carrillo Alonso et al. | |
| 2019/0093381 A1 | 3/2019 | Perez Garcia et al. | |
| 2019/0136569 A1 | 5/2019 | Lockwood | |
| 2019/0338757 A1 | 11/2019 | Helmens | |
| 2021/0207359 A1 | 7/2021 | Konduc | |
| 2021/0207393 A1 * | 7/2021 | Konduc | F03D 13/10 |

FOREIGN PATENT DOCUMENTS

| | | |
|---|---|---|
| CN | 105692470 B | 6/2018 |
| DE | 19647515 A1 | 5/1998 |
| DE | 19741988 A1 | 4/1999 |
| DE | 202010008582 U1 | 2/2012 |
| EP | 0334187 A1 | 9/1989 |
| EP | 1284365 A2 | 2/2003 |
| EP | 2360373 A2 | 8/2011 |
| EP | 2715115 A1 | 4/2014 |
| JP | 2006225158 A | 8/2006 |
| NL | 2016927 A | 12/2017 |
| RU | 2564328 C2 | 9/2015 |
| WO | WO-2008099129 A3 | 12/2008 |
| WO | WO-2021134123 A1 | 7/2021 |

OTHER PUBLICATIONS

U.S. Appl. No. 16/993,422, filed Aug. 14, 2020, Mobile Factory.

"U.S. Appl. No. 16/993,422, Non Final Office Action dated Aug. 16, 2021", 16 pgs.

"International Application Serial No. PCT/CA2020/000052, International Search Report dated Jul. 9, 2020", 4 pgs.

"International Application Serial No. PCT/CA2020/000052, Written Opinion dated Jul. 9, 2020", 9 pgs.

* cited by examiner

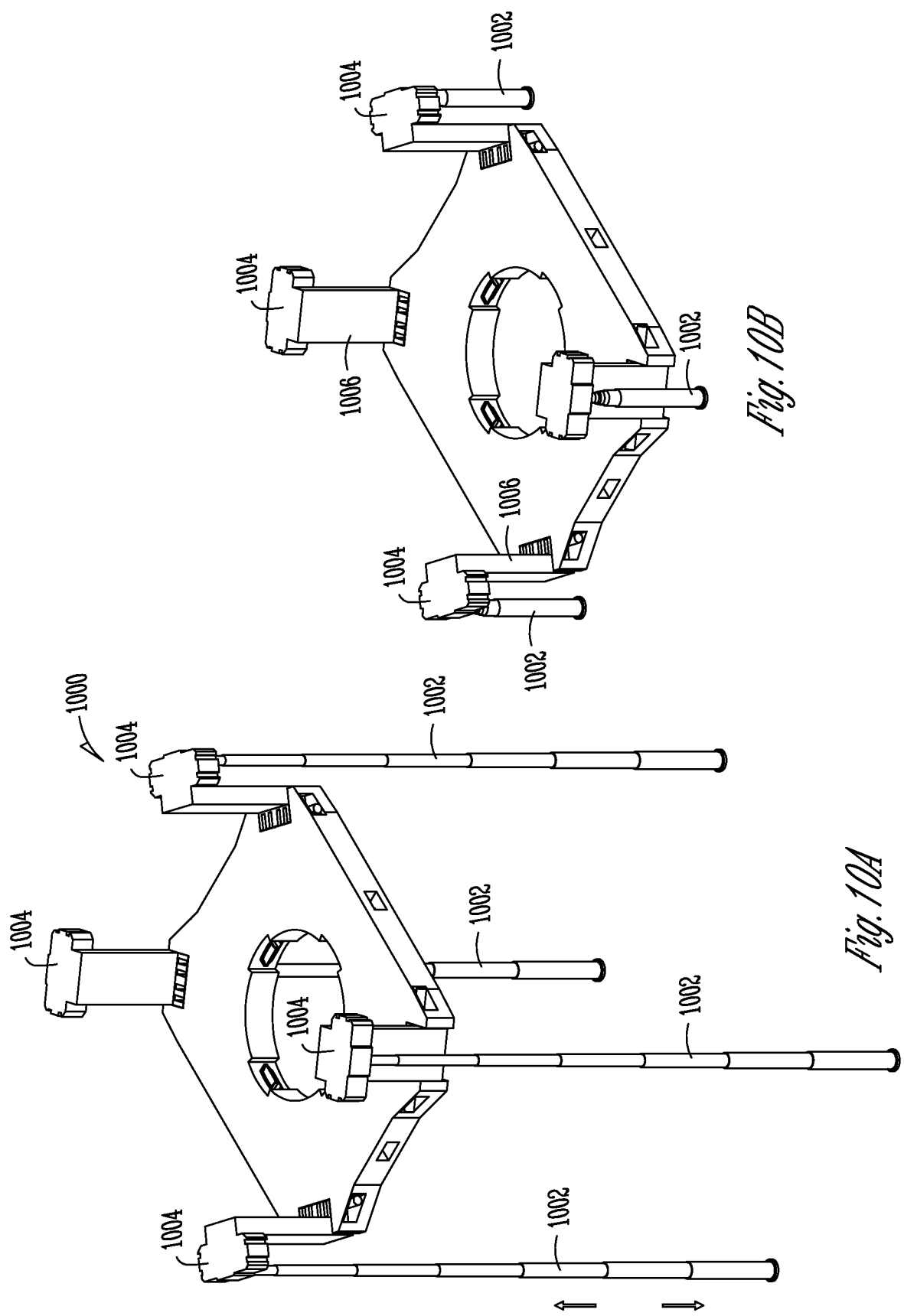

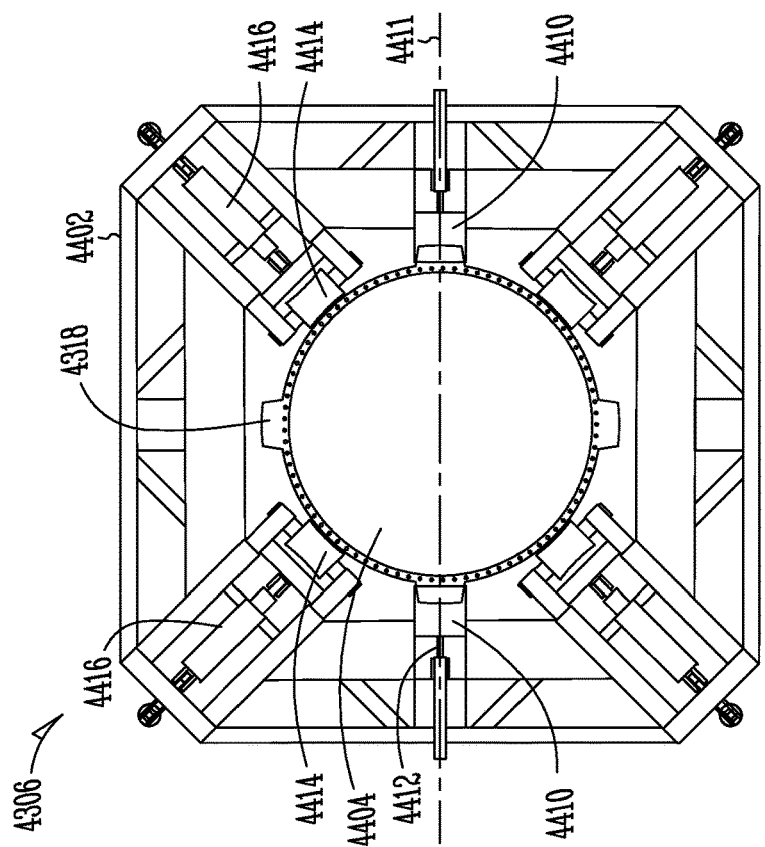
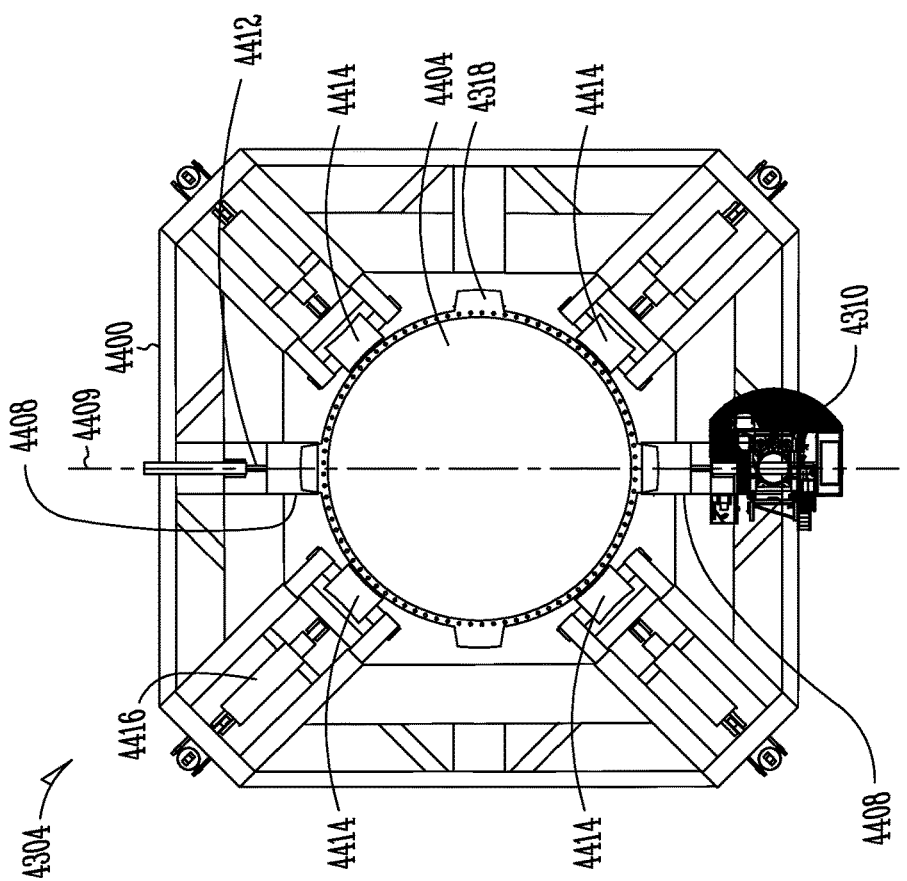
Fig. 44B
Fig. 44A

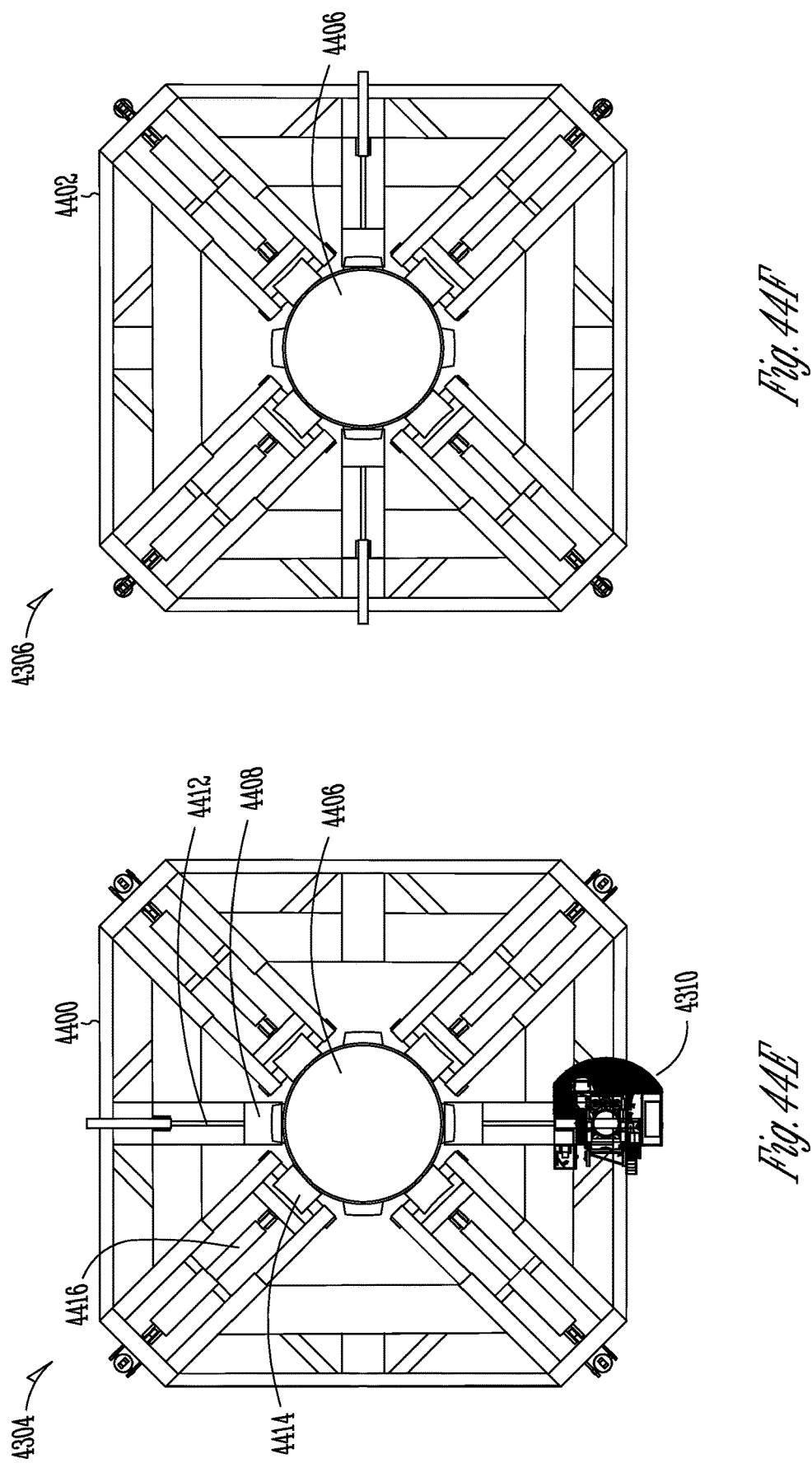

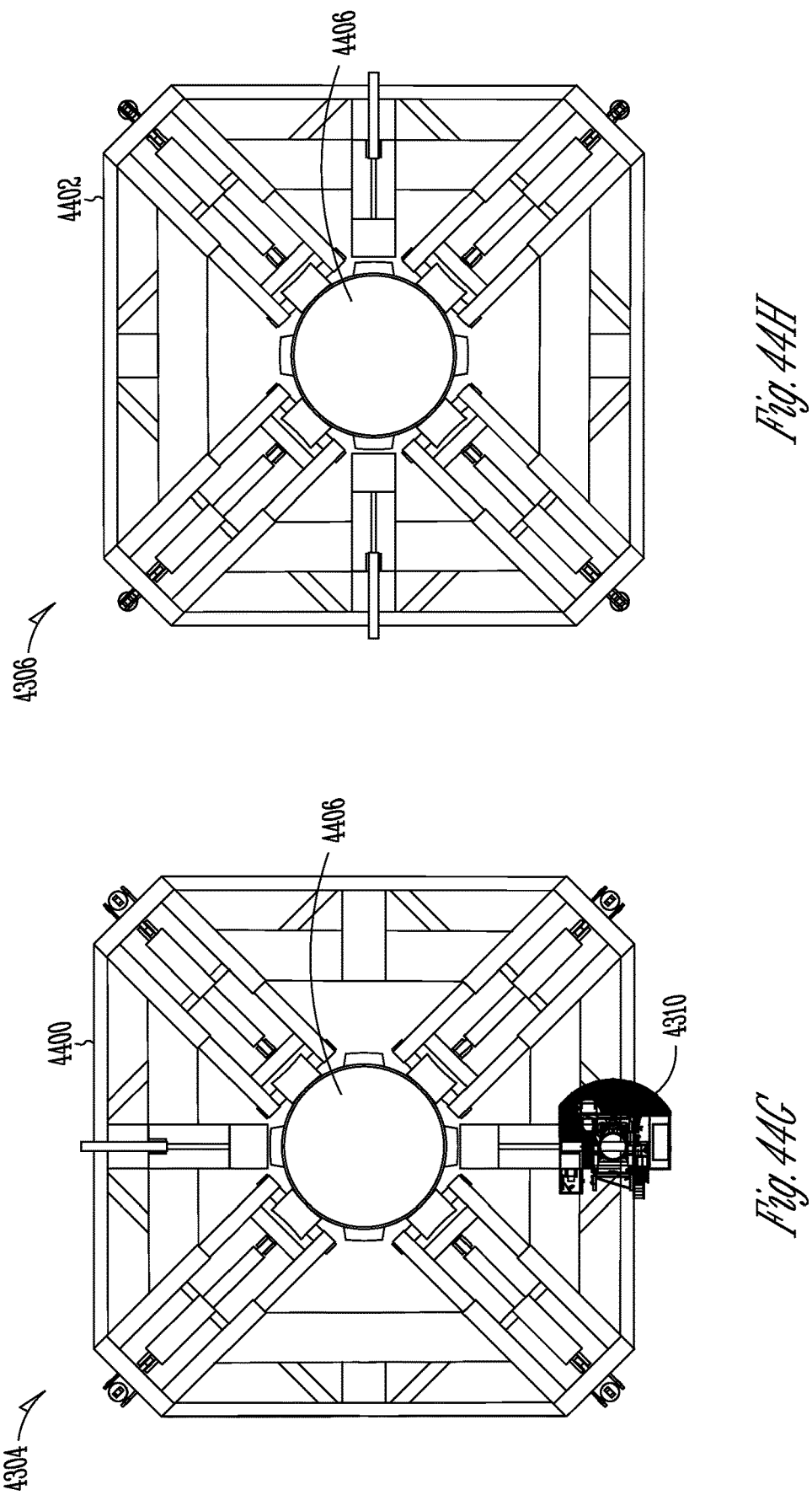

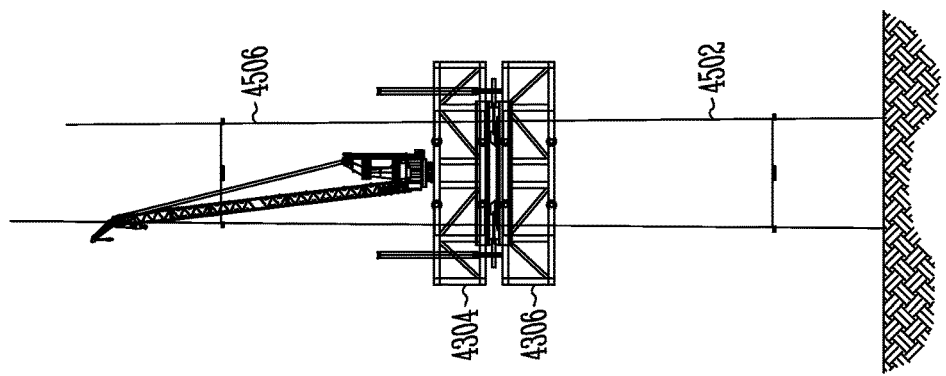
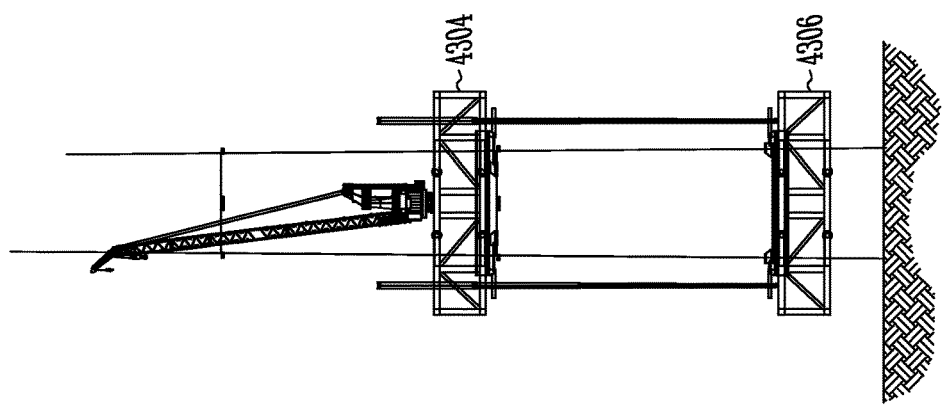
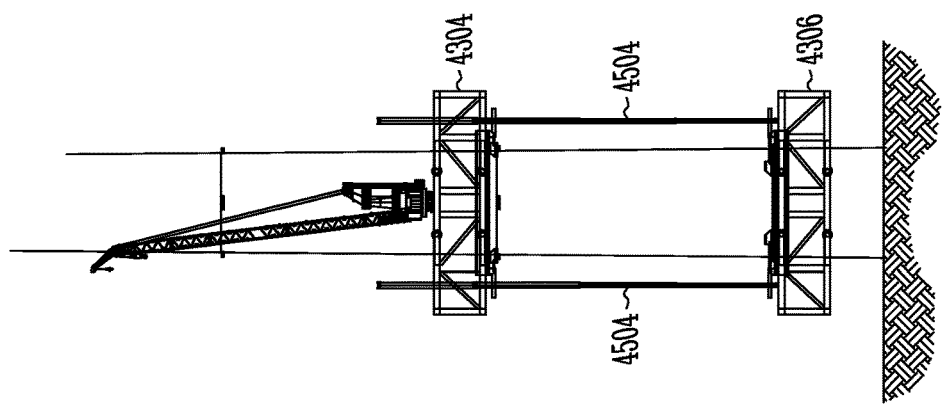
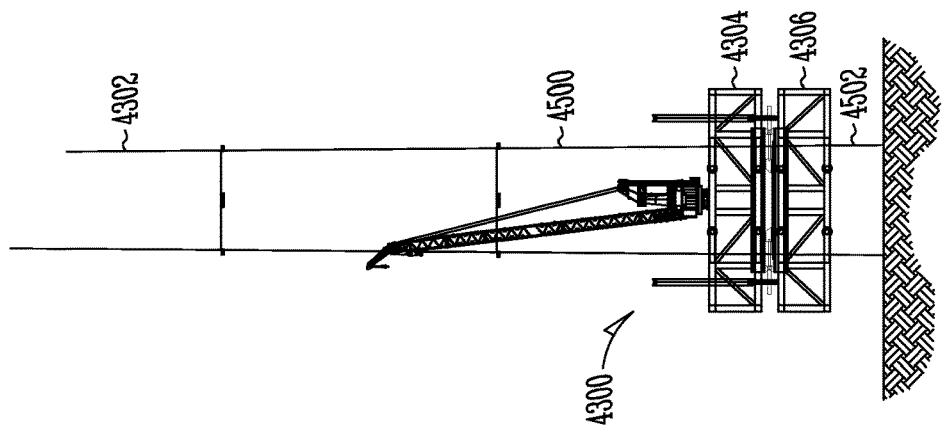

TOWER ERECTION AND CLIMBING SYSTEMS

PRIORITY CLAIM

This patent application claims the benefit of priority, under 35 U.S.C. Section 119, to U.S. Provisional Patent Application Ser. No. 62/956,809, filed on Jan. 3, 2020 and entitled "Tower Erection System," and Ser. No. 62/961,945, filed on Jan. 16, 2020 and entitled "Climbing System," the full disclosures of which are hereby incorporated herein by reference.

TECHNOLOGICAL FIELD

The present disclosure relates to systems and methods for erecting and/or moving equipment up along a tower, such as, e.g., a wind turbine tower composed of multiple sections.

BACKGROUND

Land-based wind turbine towers are often constructed from multiple tower sections stacked on top of one another and extending upward from a tower foundation, with a wind turbine housed in a nacelle atop the tower and a set of turbine blades secured to the turbine. The tower sections are typically shipped separately to the tower site, where cranes may be used to lift the tower sections as well as the nacelle and blades as the tower is being assembled. Limitations in the capacity and reach of cranes, however, can entail limits on the achievable height of the towers. Current industrial wind turbine towers are often constructed from a few sections each measuring sixty to ninety feet in length, reaching a total height of a few hundred feet. While it would be desirable to build towers on the order of a thousand feet or higher to take advantage of the greater wind speed at those heights to generate more electricity, the unavailability of, or limited access to, cranes large enough to accommodate desired tower heights can create difficulties or impasses in assembling (or disassembling) the wind turbine towers. Further, to the extent sufficiently large cranes are available, they are very expensive to rent, and the potential for crane downtime, e.g., when wind speeds are too high for the crane to be used safely, further drives up cost. Operational expenses may likewise be higher for tall towers, due to the use of large cranes for repair and/or regular maintenance, especially on the nacelle and blades. Accordingly, alternatives to high-lift cranes for erecting and servicing wind turbine towers are desirable.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

This disclosure pertains, in some aspects, to systems and methods for assembling a tower from the top down to circumvent the need for large cranes. More particularly, it describes a tower erection system configured for lifting a top portion of the tower, allowing for placement of additional sections below the lifted portion. The system generally includes a ground-installed stationary lifting structure, and a lifting frame vertically movable within the stationary lifting structure via a lifting mechanism and configured to latch onto the tower sections. Erecting a tower with this system generally involves iteratively lifting the top portion of the tower (which may include one tower section or multiple already assembled tower sections) with the lifting frame, placing a new section underneath the lifted top portion and connecting the top portion to the new section, and then unlatching and lowering the lifting frame to allow it to pick up the now extended tower portion. To provide lateral stability during the assembly process, the system may further include horizontal load-bearing rollers that engage a lateral surface of the tower. Beneficially, towers assembled with the disclosed system can be much higher than the system itself. In some embodiments, for example, the stationary lifting structure has a height on the order of two tower-section lengths, providing sufficient travel for the lifting frame, which is raised by only little more than one tower-section length, as well as space above the lifting frame to laterally stabilize the tower. The disclosed system and method thus facilitate erecting towers reaching heights of several hundreds of feet or even in excess of a thousand feet—significantly taller than current industrial wind turbine towers.

In one aspect, a tower erection system including a ground-installed stationary lifting structure, a lifting frame, and a lifting mechanism is described. The stationary lifting structure includes a scaffold surrounding a tower foundation, and, connected to the scaffold, a plurality of horizontal load-bearing rollers to rollably engage a lateral surface of a tower placed centrally inside the stationary lifting structure. The lifting frame, which is placed inside the stationary lifting structure and vertically movable inside the stationary lifting structure by the lifting mechanism, includes a latching mechanism to latch onto the lateral surface of the tower (e.g., in some embodiment, by engaging projections extending from the lateral surface of the tower). In one embodiment, the scaffold includes a plurality of interconnected masts, and the lifting frame includes a plurality of traveling blocks vertically movable inside respective ones of the plurality of masts. In another embodiment, the scaffold takes the form of a tripod. The stationary lifting structure may further include, interior to the tripod, a guide frame installed on or surrounding the tower foundation, with the lifting frame moving vertically inside this guide frame. The horizontal load-bearing rollers may be movable radially relative to the tower, e.g., by associated horizontal hydraulic cylinders, so as to accommodate a varying diameter of the tower while remaining engaged with the tower as the tower is lifted inside the stationary lifting structure. The tower erection system may further include a continuous base with a bolt circle for the tower foundation and loading ramps for the scaffold, as well as guy lines extending from a top of the scaffold to the loading ramps of the base. The lifting mechanism may be or include a winch-and-cable mechanism, e.g., including a plurality of winches, a plurality of sheaves atop the stationary lifting structure, and winch line running from the winches through the sheaves and mechanically coupled to the lifting frame. Alternatively, the lifting mechanism may include telescoping hydraulic cylinders or rack-and-pinion systems. With a scaffold including a plurality of masts and a lifting frame including a plurality of travelling blocks vertically movable inside respective ones of the plurality of masts, each of the masts may have its own associated winch-and-cable mechanism, hydraulic cylinder, or rack-and-pinion system to move the respective travelling block. Similarly, with a tripod scaffold, the lifting frame may include multiple lifting blocks each having its own associated lifting (e.g., winch-and-cable) mechanism. In some embodiments, the lifting mechanism has a travel of at least sixty feet.

In another aspect, a method of erecting a tower comprising multiple tower sections of a common section length (and optionally tapered) is provided. The method involves placing a first one of the tower sections vertically on a tower foundation, lifting the first tower section by more than the section length, placing a second one of the tower sections vertically on the tower foundation below the first tower section, and bringing the first tower section into contact with the second tower section and securing the first tower section to the second tower section to create a connected portion of the tower. A wind turbine and blades may be secured atop the first tower section. Further, for each of one or more additional tower sections, the connected portion of the tower may be lifted by more than the section length, the additional tower section be placed vertically on the tower foundation below the connected portion, and the connected portion be brought into contact with and secured to the additional tower section to thereby expand the connected portion of the tower by the additional tower section. Lifting the first tower section and lifting the connected portion of the tower may each comprise latching a lifting frame onto one or more projections from a lateral surface of the first tower section or the connected portion of the tower, lifting the lifting frame (e.g., with a winch-and-cable mechanism) within a ground-installed stationary lifting structure surrounding the tower foundation, and, after securing the first tower section to the second tower section or the connected portion to the additional tower section therebelow (and prior to lifting the thus expanded connected portion of the tower), unlatching and lowering the lifting frame. As the connected portion of the tower is being lifted, it may be stabilized horizontally with horizontal load-bearing rollers that are connected to the stationary lifting structure, rollably engaged with a lateral surface of the connected portion of the tower and movable radially relative to the connected portion of the tower. Upon connection of the multiple tower sections, the connected portion of the tower may be secured to the tower foundation.

In a further aspect, this disclosure pertains to a system that can climb up and down a tower, carrying a crane or other heavy equipment along with it. More specifically, various embodiments provide a "self-climbing crane" system for use, e.g., in building or performing maintenance on a tower, such as a wind turbine tower. The system generally includes a pair of structures configured to separately latch onto the lateral surface of the tower at different heights, and movable relative to one another in the vertical direction via an associated lifting mechanism; these two structures are herein referred to as the "upper climber" and "lower climber." The lifting mechanism may, for instance, include one or more hydraulic cylinders between the upper and lower climbers, and may have a travel of at least the length of an individual tower section, e.g., sixty feet. A crane may be mounted on the upper climber. The crane may include a boom with associated luffing cylinder and stabilizer, and a winch-and-cable mechanism with winch line running from the upper climber to a sheave at the top of the boom.

In various embodiments, the climbing system is designed for use with a tower that includes, at multiple heights along the tower (generally at regular vertical intervals), sets of projections extending from the lateral tower surface at multiple locations along the circumference of the tower. The projections may, for example, be located at the top of each of the tower sections. The upper climber and lower climber may each include a frame horizontally surrounding the tower, and a latching mechanism to latch onto the projections extending from the lateral surface of the tower. The latching mechanisms are oriented horizontally in that they move in a horizontal direction (radially towards or away from the tower) to latch or unlatch. To enable the upper and lower climbers to simultaneously latch onto the tower at the same vertical position, the latching mechanism associated with the upper climber may be angularly displaced along the circumference relative to the latching mechanism of the lower climber. The latching mechanisms of the upper and lower climbers may, for instance, be oriented perpendicularly to one another, and may each include a pair of latches to latch onto two projections extending from mutually opposite sides of the tower. In some embodiments, the latches each comprise a horizontal surface to be seated on one of the projections, and lateral surfaces to restrict lateral motion of the latch relative to the projection. The upper and lower climbers may further include respective sets of horizontal load-bearing rollers to rollably engage the lateral surface of the tower. These rollers may be movable radially relative to the tower, e.g., by associated horizontal hydraulic cylinders, so as to accommodate a varying diameter of, e.g., a tapered tower.

More broadly, a tower climbing system in accordance with various embodiments includes first and second frames each configured to be placed horizontally around a tower, means for reversibly securing the first and second frames—independently from one another—to a lateral surface of the tower, and means for moving the first and second frames vertically relative to one another.

In yet another, related aspect, a method of moving a crane vertically along a tower is provided. The method involves installing a climbing system including upper and lower climbers (e.g., as described above), with a crane mounted on the upper climber, around the tower. The climbing system along with the crane is iteratively moved up along the tower by repeatedly latching the lower climber to projections from the lateral surface of the tower, pushing the upper climber and crane up relative to the latched lower climber, latching the upper climber to projections from the lateral surface of the tower, unlatching the lower climber, and pulling the lower climber up relative to the latched upper climber. The upper and lower climbers may latch onto respective pairs of projections that extend from opposite sides of the tower along first and second horizontal directions (which may be mutually perpendicular). The projections may be grouped into sets of projections at or near the top of each of the tower sections making up the tower, and the climbing system may move up by one tower-section length at a time. The upper and lower climbers may be laterally stabilized with horizontal load-bearing rollers rollably engaging the lateral surface of the tower, and the rollers may move radially relative to the tower so as to accommodate a varying diameter of the tower. In some embodiments, the climbing system and crane are used to erect the tower; to do so, the crane lifts an individual tower section for placement onto a tower portion of previously placed tower sections, the climbing system then moves up that lifted and placed tower section, and the process is repeated, alternating between lifting and climbing. In some embodiments, the crane is used with a fully erected tower, e.g., to lift equipment to, or lower equipment from, a location at or near the top of the tower.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying figures, in which:

FIGS. 10A and 10B are perspective views of a lifting frame and an associated lifting mechanism with telescoping hydraulic cylinders in extended and contracted positions, respectively, in accordance with one embodiment.

FIGS. 44A and 44B are top plan views of the upper climber and lower climber, respectively, of the tower climbing system of FIG. 43 when latched to a large-diameter tower section.

FIGS. 44E and 44F are top plan views of the upper climber and lower climber, respectively, of the tower climbing system of FIG. 1 when latched to a small-diameter tower section.

FIGS. 44G and 44H are top plan views of the upper climber and lower climber shown in FIGS. 44E and 44F when unlatched from the small-diameter tower section.

FIGS. 45A-45L are side views of the climbing system of FIG. 43 in various positions along a tower, illustrating the operation of the tower climbing system, in accordance with various embodiments.

DETAILED DESCRIPTION

The present disclosure provides multiple embodiments of systems and methods for erecting a tower iteratively from the top down by lifting, in each iteration, a tower portion including one or more connected tower sections to place an additional section below, and then securing the tower portion to the additional section to extend the tower. Additionally, the present disclosure provides embodiments of a tower climbing system and associated method of operation that can be used, in an alternative approach, to construct the tower from the bottom up, or, once the tower is built, to carry a maintenance crane or other heavy equipment up and down the tower. Both approaches can, in various embodiments, accommodate tapered as well as straight cylindrical towers, and achieve tower heights of hundreds of feet (e.g., resulting from the connection of three or more sections each sixty to ninety feet in length).

Figure 1:
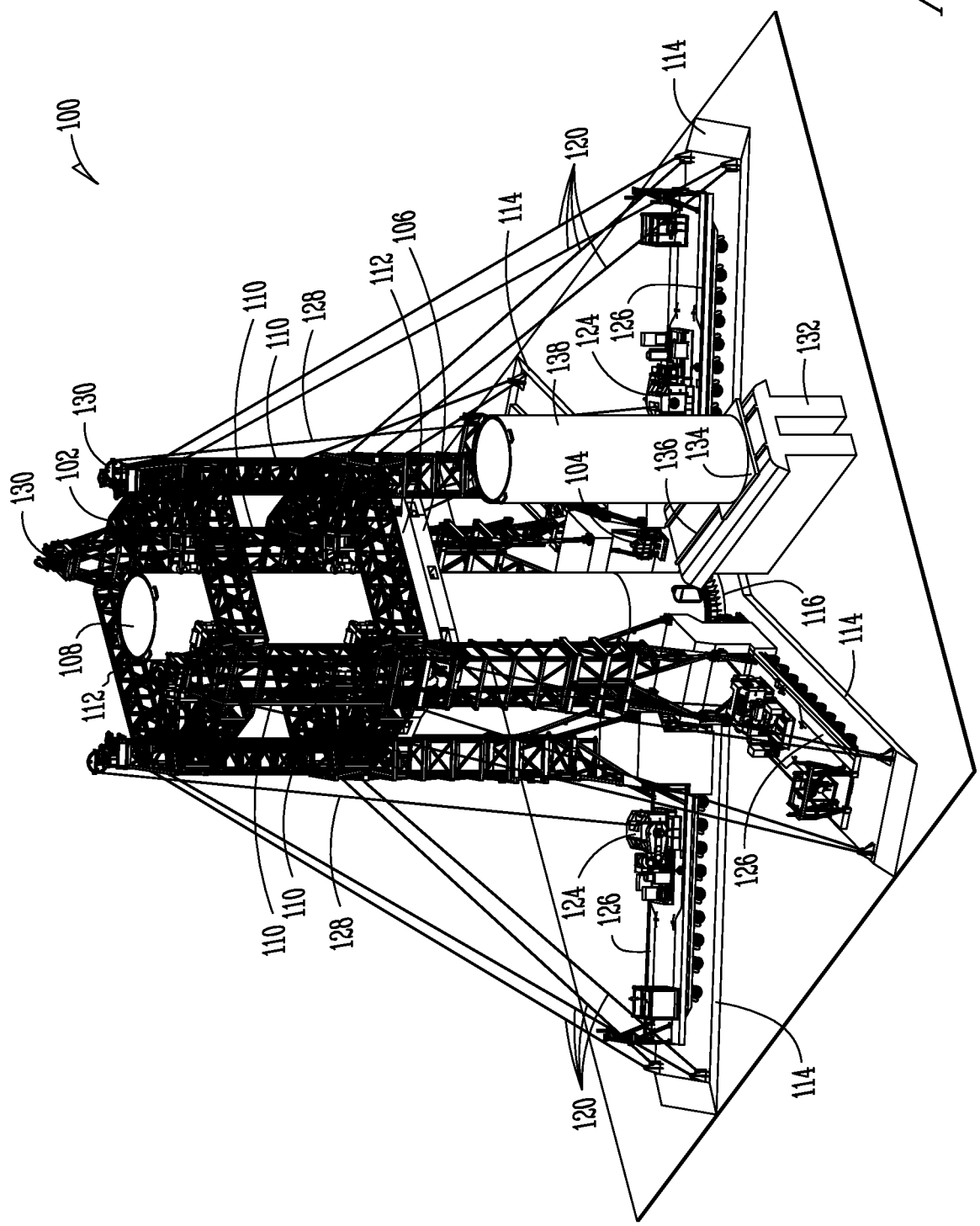
FIG. 1 is a perspective view of a tower erection system for building a tower from the top down, according to one or more embodiments.
Figure 2:
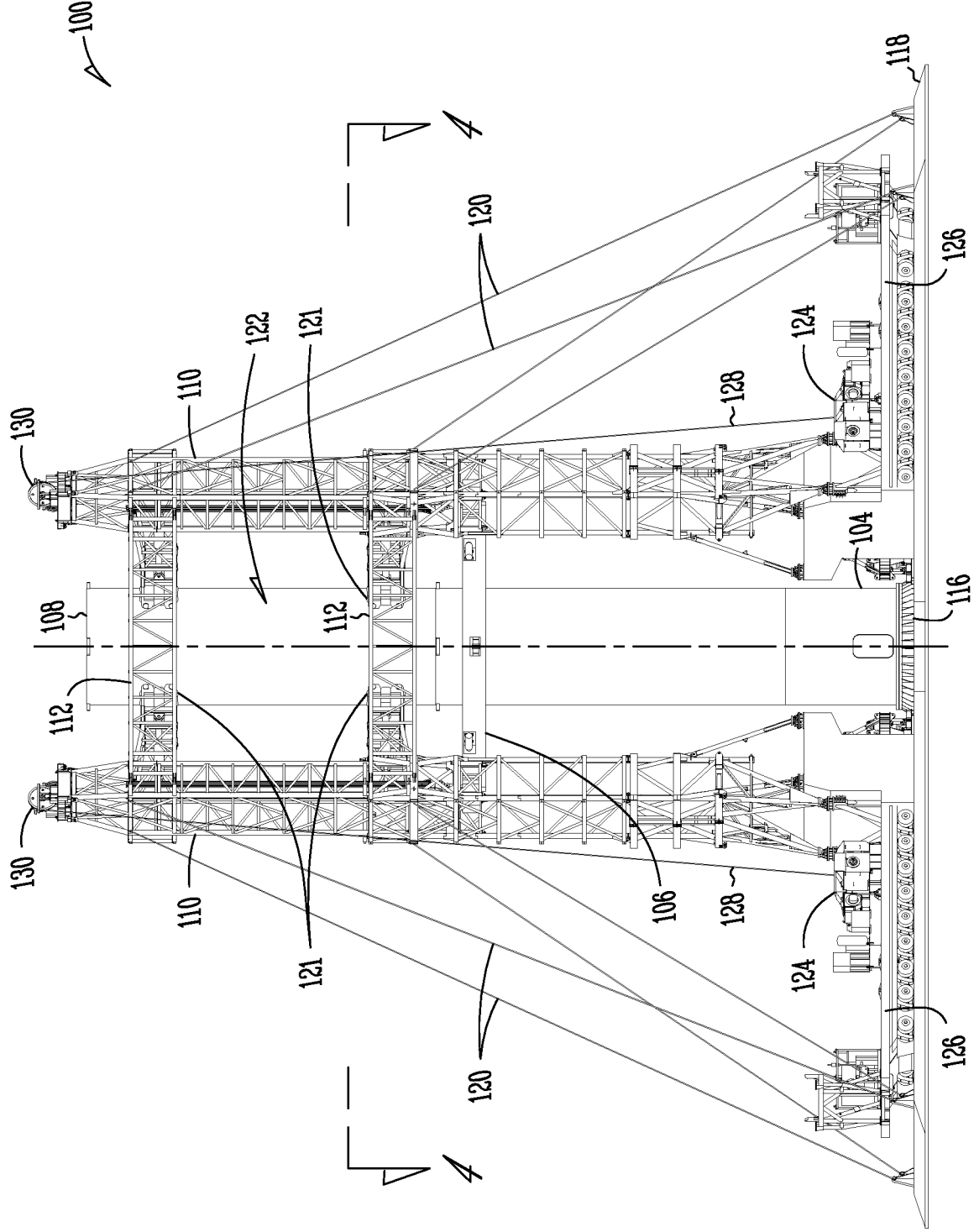
FIG. 2 is a side elevation view of the tower erection system of FIG. 1.
Figure 3:
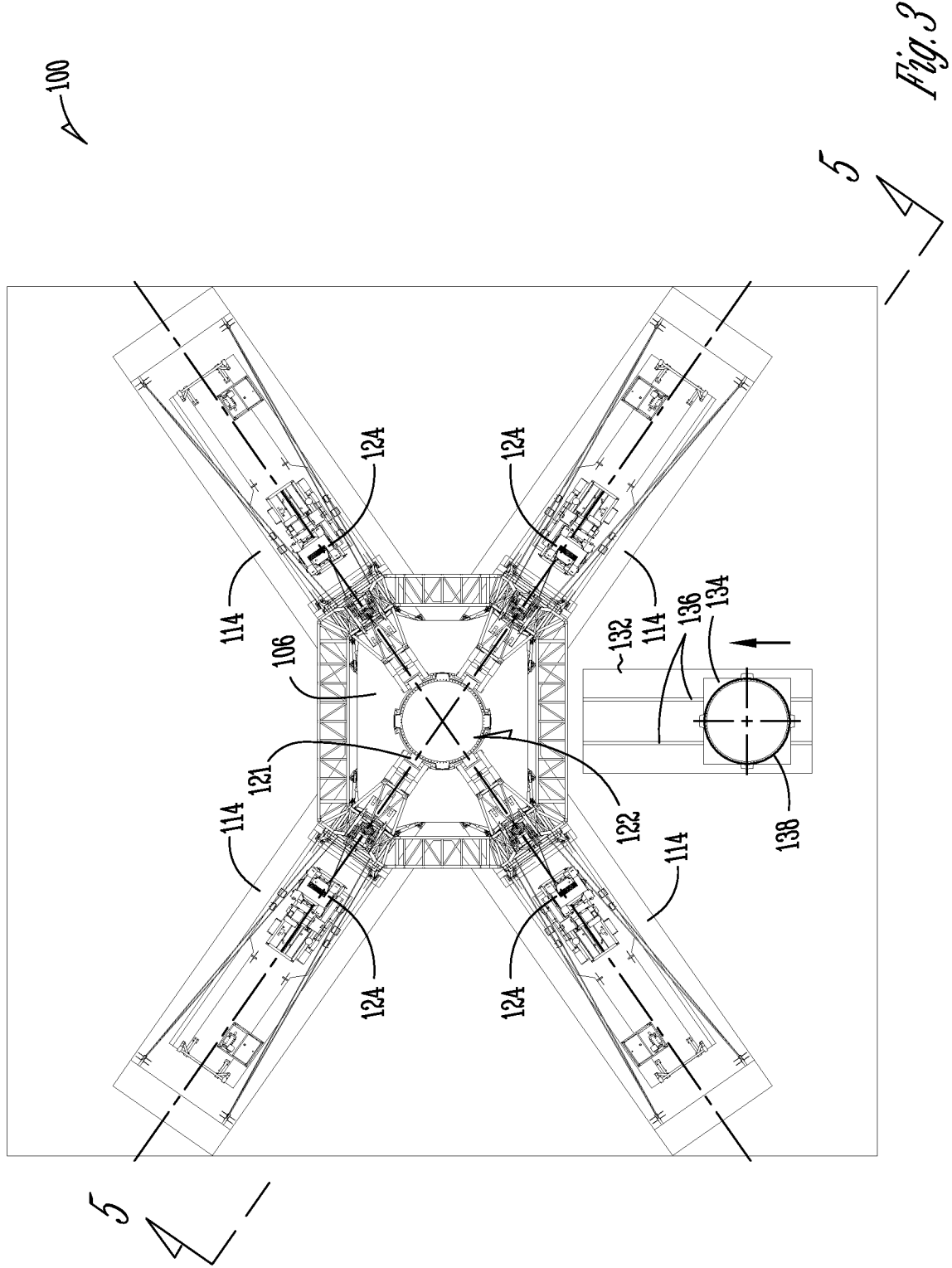
FIG. 3 is a top plan view of the tower erection system of FIG. 1.

FIGS. 1-3 provide a perspective view, elevational side view, and top plan view, respectively, of an example system 100 for building a tower from the top down, according to one or more embodiments. The system 100 includes a ground-installed lifting structure 102 constructed surrounding a tower foundation, herein understood to include the tower base 104 (that is, the bottom tower section, which is usually shorter than the tower sections stacked thereabove), and a lifting frame 106 vertically movable inside the lifting structure 102 by an associated winch-and-cable mechanism. The tower foundation, and thus the tower erected thereon (a portion 108 of which is shown), are placed centrally inside the lifting structure 102. The lifting structure 102 remains stationary throughout the process of erecting the tower, and may thereafter be removed and optionally reused at another tower site, or alternatively stay in place and provide mechanical stability for the erected tower. The lifting frame 106 and associated lifting mechanism are generally removed upon completion of the tower.

The lifting structure 102 includes a scaffold formed of multiple vertical masts 110 (e.g., as are familiar from drilling rigs), which are tied together by horizontal trusses 112. Although four masts 110 are shown, the scaffold can, in principle, also include fewer (e.g., three) or more (e.g., six) masts. In a four-mast embodiment, the masts 110 may, as best shown in FIG. 3, be arranged at the corners of a rectangle, whose aspect ratio may vary between embodiments. For example, while the two pairs of sides of the rectangular configuration may vary in length, as shown, quadratic configurations are also possible. Each of the masts 110 may itself have a generally rectangular cross section, defined by trusses. The masts 110 may rest with their bases on respective loading ramps 114, which serve as base outriggers similar to oilfield service rig carrier loading ramps. The loading ramps 114 may link to each other in a moment-type connection, as well as link to the bolt circle 116 on which the tower base 104 rests, to form a continuous base 118 with a wide footprint to provide stability for the lifting structure 102. Further, guy lines 120 may extend from the tops of the masts 110 to the outer corners of the loading ramps 114 to absorb lateral forces. The resulting vertical lifting structure 102 may be capable of taking the entire weight of a complete wind turbine tower as well as handling the large moment and shear loads that can be caused by wind during the tower installation.

The ground-installed lifting structure 102 serves two purposes: it provides a frame within which the lifting frame 106 can be moved up and down to lift the tower sections or connected tower portions, and it laterally stabilizes the tower during tower assembly by means of load-bearing rollers 121 that are connected to the masts 110 and rollably engaged with the (e.g., cylindrical or conical) lateral surface 122 of the tower. Placement, structure, and function of the load-bearing rollers 121 are explained in more detail below with reference to FIGS. 4 and 5. The lifting frame 106 is described with reference to FIGS. 6-9. It is noted here merely that the lifting frame 106 may include traveling blocks moving up and down inside the masts 110. In order to allow for vertical movement of the lifting frame 106 and traveling blocks relative to the masts 110, the masts may be open (i.e., free of trusses) at their inward-facing sides.

The lifting frame 106 can be raised and lowered by a winch-and-cable mechanism (or, more precisely, multiple winch-and-cable mechanisms, each associated with one of the multiple masts 110). As illustrated in FIGS. 1 and 2, each winch-and-cable mechanism includes a winch 124 (e.g., a hydraulic winch), which may be mounted on a trailer 126 standing on one of the loading ramps 114. Winch line 128, such as a wire rope or other cable, runs, from an end at which it is coupled to the lifting frame 106, up the respective mast 110 to a sheave or cluster sheave 130 at the top of the mast 110, and from there down to the winch 124 at the bottom of the lifting structure 102. As the winches 124 wind up the winch lines, the lifting frame 106 is being raised.

The tower erection system 100 also includes, adjacent the base 118, e.g., in between two neighboring loading ramps 114, a tower-section loading platform 132 with a feeding tray 134 movable along a track 136. The feeding tray 134 is mounted at approximately the same height as the top surface of the tower base 104. The loading platform 132 is oriented such that the feeding tray 134 moves along a radial direction toward the center of the stationary lifting structure 102. To feed an individual tower section 138 into the lifting structure 102, the tower section 138 is placed (e.g., by a small crane) onto the feeding tray 134, and moved horizontally along the track 136 into the center of the lifting structure 102, where it can be placed on the bottom tower section 104 of the tower foundation. The lifting frame 106 can then be lowered around the tower section 136 and latched onto the tower section to lift it up, in a manner explained further below.

Figure 4:
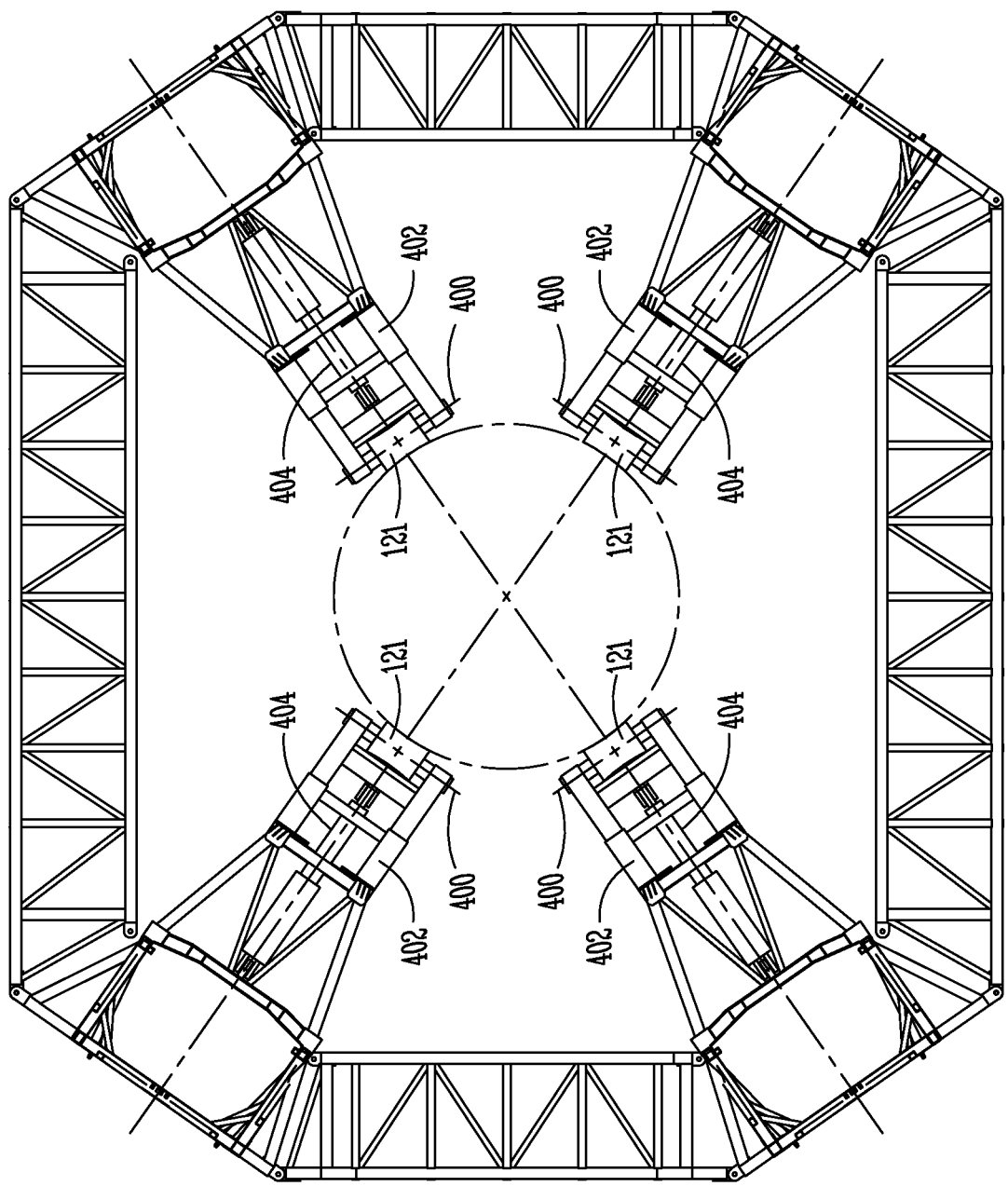
FIG. 4 is a horizontal cross-sectional view of the tower erection system of FIG. 1 at a plane having horizontal load-bearing rollers, in accordance with one embodiment.
Figure 5:
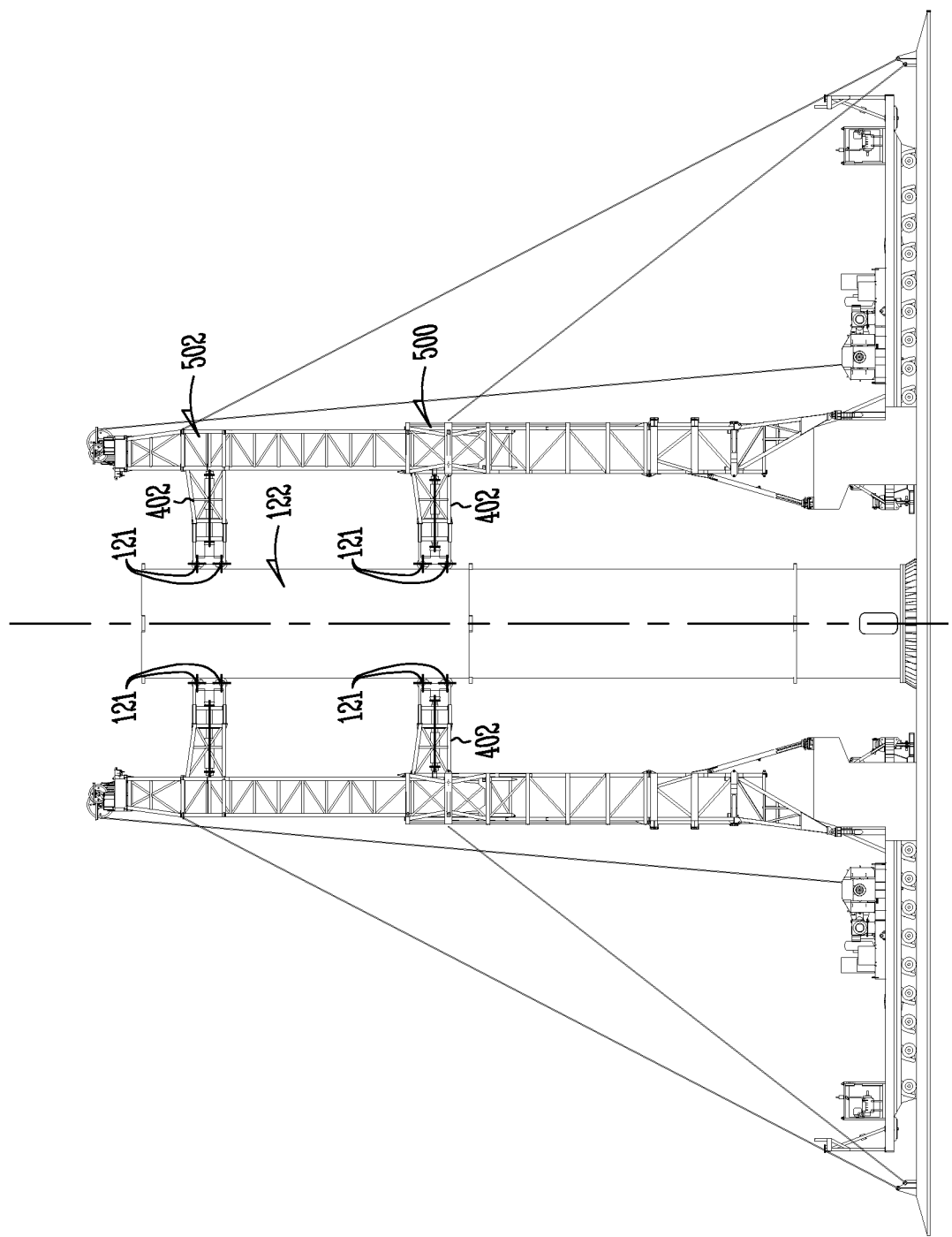
FIG. 5 is a vertical cross-sectional view of the tower erection system of FIG. 1, illustrating the placement of the horizontal load-bearing rollers in accordance with one embodiment.

Turning now to FIGS. 4 and 5, the load-bearing rollers 121 will be further described. The rollers 121 are oriented horizontally (meaning that their rotational axes 400 are horizontal) and mounted on respective roller supports 402 that are fixedly connected to, and extend horizontally inwardly from, the masts 110. As shown in FIG. 5, the rollers 121 may come in pairs connected to the same roller support 402 and spaced vertically apart by a small distance (e.g., a few inches). Such pairs of rollers 121 may be placed at multiple (e.g., as shown, two) vertical levels 500, 502, such as the levels coinciding with the horizontal trusses 112 that tie the masts 110 together, which may be tens of feet apart. In use, the rollers 121 rollably engage the lateral surface 122 of the tower portion 108 inside the lifting structure 102, i.e., they are in contact with the lateral surface 122 and roll along the surface 122 as the tower portion is lifted. The horizontal rollers 121 serve to take any installation wind loading and transfer it from the tower to the lifting structure 102 and onto the ground. The rollers 121 may also have associated horizontal hydraulic cylinders 404, or other means, for moving the rollers 121 radially relative to the tower portion 108 to accommodate a varying tower diameter (e.g., of a tapered tower) and always maintain contact with the lateral surface 122 of either a straight tower or a tapered tower. The cylinders 404 may also enable the completed tower to be guided onto the tower base 104, where it can be bolted down as a complete installation.

Figure 6:
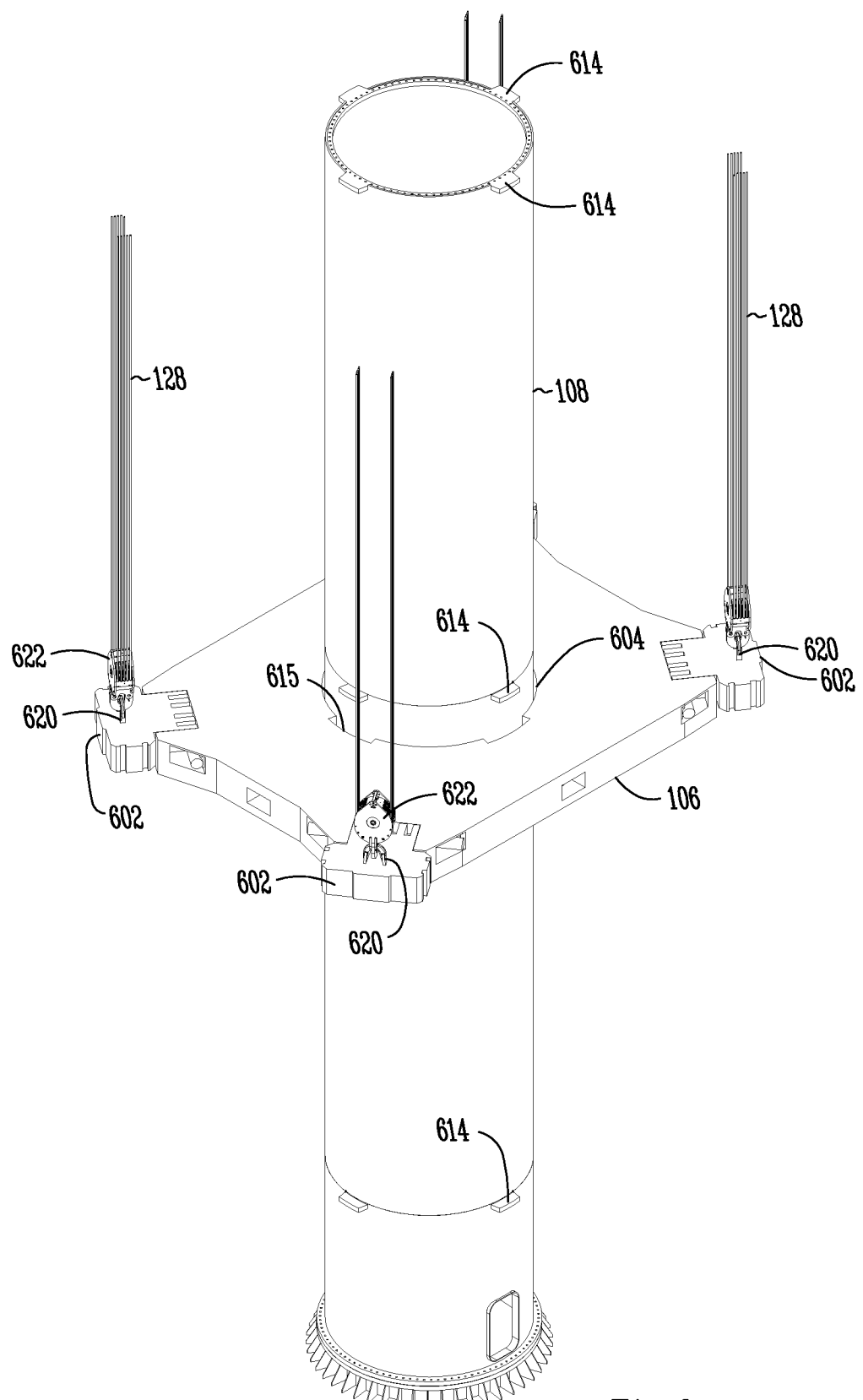
FIG. 6 is a perspective view of a lifting frame surrounding a tower portion and an associated winch-and-cable lifting mechanism, in accordance with one embodiment.
Figure 7:
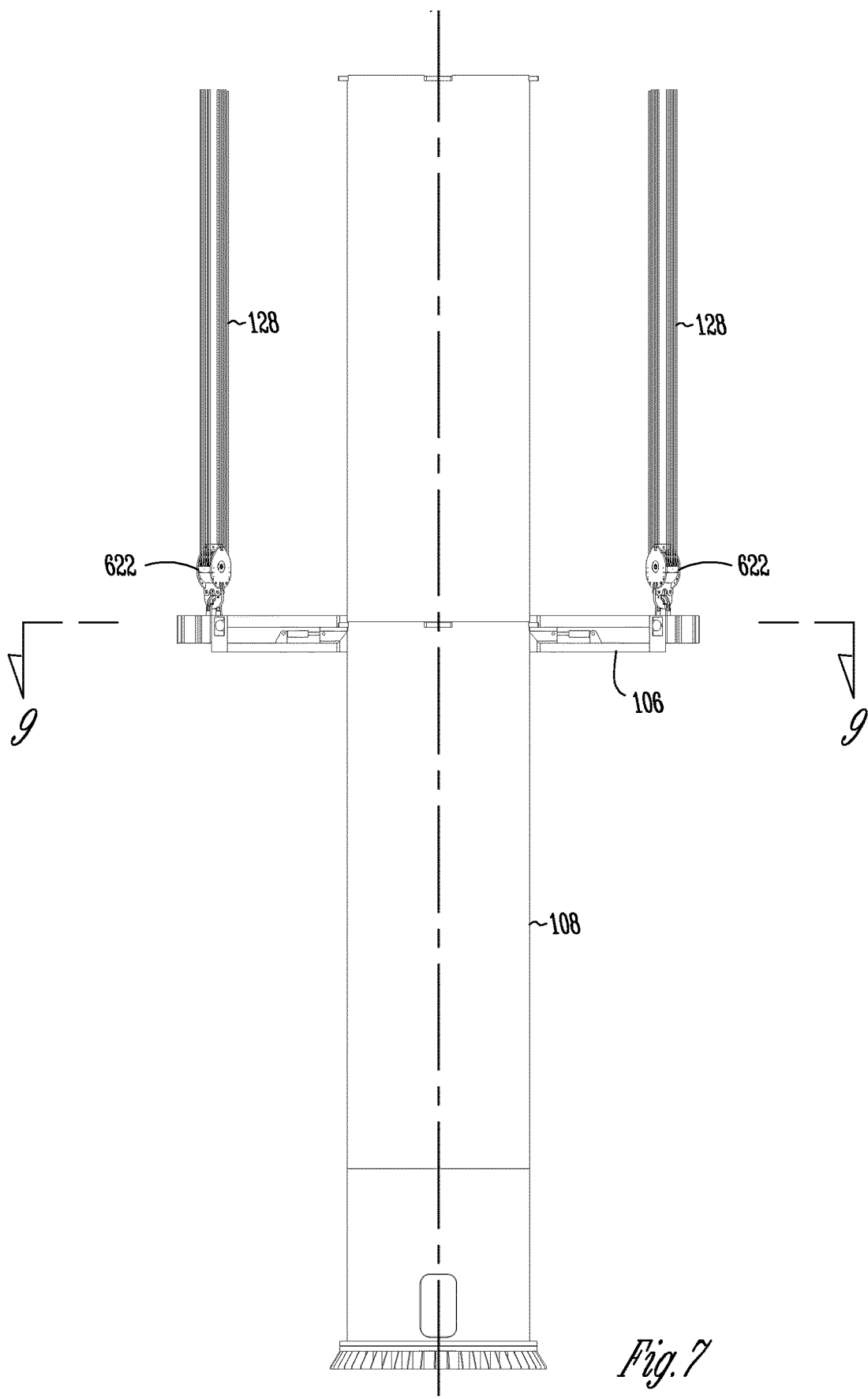
FIG. 7 is a vertical cross-sectional view of the lifting frame and lifting cable mechanism of FIG. 6.
Figure 8:
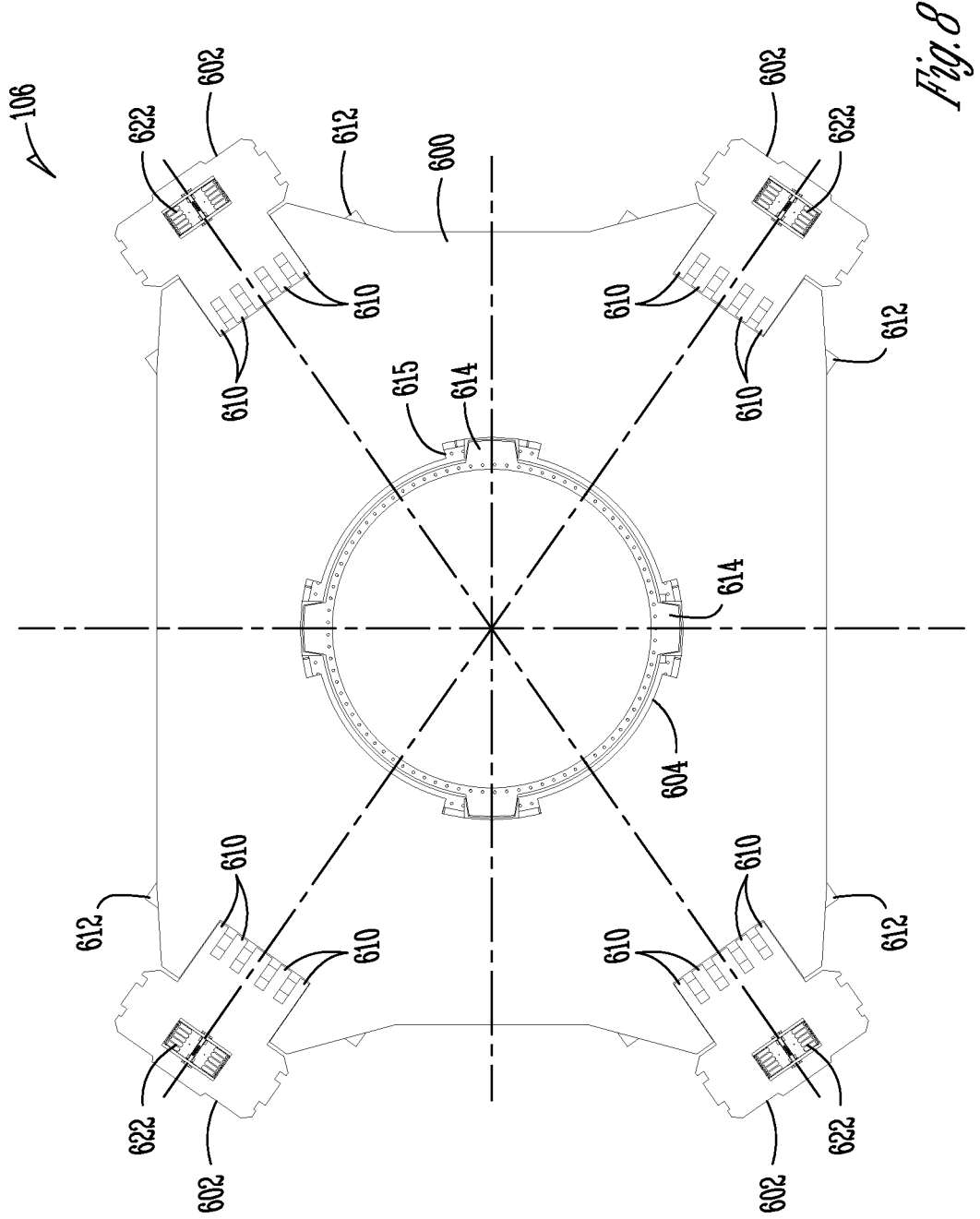
FIG. 8 is a top view of the lifting frame of FIG. 6.
Figure 9:
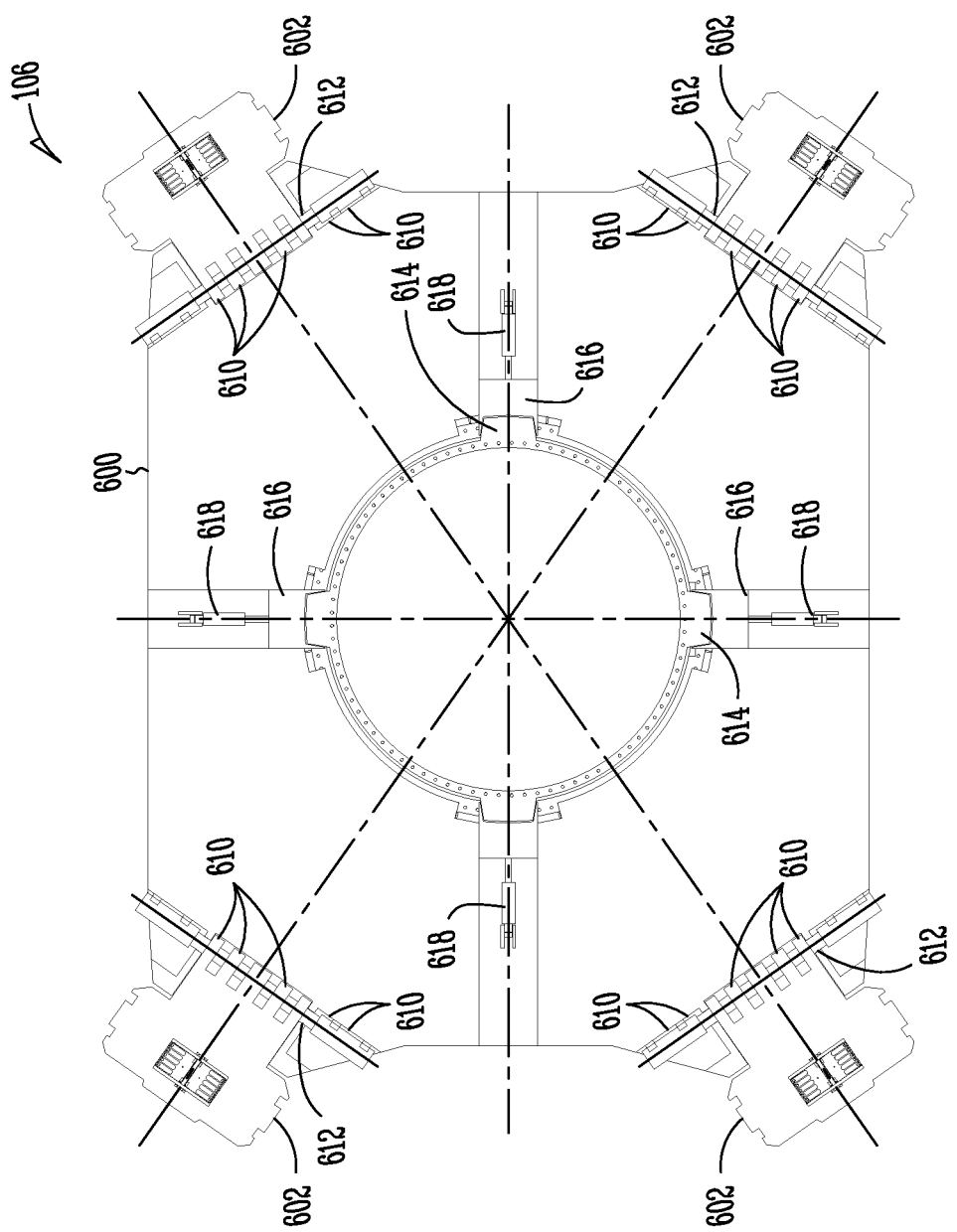
FIG. 9 is a horizontal cross-sectional view of the lifting frame of FIG. 6.

FIGS. 6 and 7 illustrate, in perspective and vertical cross-sectional views, respectively, the lifting frame 106 surrounding the tower portion 108, and the associated winch-and-cable mechanism. FIGS. 8 and 9 provide further detail of the lifting frame 106 in top and horizontal cross-sectional views, respectively. The lifting frame 106 includes a base frame component 600 configured to latch onto the tower portion 108 via a suitable latching mechanism, and traveling blocks 602 that are, in operation, coupled to the winch-and-cable (or some other lifting) mechanism. The base frame component 600 features a central, circular cut-out or hole 604 sized to accommodate the tower portion 108 extending through the cut-out 604. For a cylindrical tower, as shown, the diameter of the cut-out 604 may be barely larger than the tower diameter, leaving just a small clearance. For a tapered tower, the diameter of the cut-out 604 would be large enough to surround the larger-diameter end of the tower section that is second from the bottom of the tower. In the depicted embodiment, the base frame component 600 is substantially rectangular in shape and sized to fit inside the interior space defined by the four-mast lifting structure 102. The traveling blocks 602 are located at the four corners of the base frame component 600, and are shaped and sized to fit and travel inside the masts 110. The base frame component 600 may include horizontal bores or cavities to accommodate elements for securing the base frame component 600 to the traveling blocks 602 as well as the tower portion 108 to be lifted.

The traveling blocks 602 may include protrusions that mate with corresponding recesses in the base frame component 600, where they are locked in place. For example, as shown in FIGS. 8 and 9, the base frame component 600 and the protrusions on the traveling blocks 602 may both include lugs 610 arranged along common axes, allowing the traveling blocks 602 to be locked to the base frame component 600 by insertion of a post 612 through the lugs 610. Other ways of connecting the traveling blocks 602 to the base frame component 600 are possible. Further, in some embodiments, the traveling blocks 602 and base frame component 600 form one integral part.

To facilitate latching the lifting frame 106 onto the tower portion 108, the tower sections may feature lateral projections, such as tabs 614 protruding outwardly from the lateral surface 122, e.g., at the bottom and/or top of each section, as shown in FIG. 6. At each level of tabs 614, multiple tabs 614 are located at multiple different circumferential positions; for instance, as shown, four tabs 614 may be placed at each level, spaced evenly at 90° intervals. The base frame component 600 may include recesses 615 extending from the otherwise circular cut-out 604 to accommodate the tabs 614. Grippers 616 secured to the base frame component 600, complementary in shape to the tabs 614, can be pushed into engagement with the tabs 614 by associated hydraulic cylinders 618 to latch the lifting frame 106 onto the tabs 114, and subsequently retraced to unlatch. The grippers 616 may each include, for example, a bottom seating surface on top of which the tab 604 rests, and interior side surfaces that restrict lateral movement of the tab 604; thus, the bottom surfaces of the grippers 616 collectively bear the weight of the tower section (or connected tower portion), which effects the locking of the tower section to the grippers 616. As illustrated, the grippers 616 and cylinders 618, along with the tabs 114, may be located along lines extending between the mid-points of opposing sides of the rectangular base frame component 600, half-way between neighboring traveling blocks 602. The illustrated use of tabs 614 provides only one possibility for latching onto the tower portion 108. Other latching mechanisms may occur to those of ordinary skill in the art, and may be compatible with the lifting frame 106 otherwise as described. To the extent tabs 614 or similar projections are used, these tabs may be left in place to double, during the life of the completed wind turbine tower, as means allowing a small, portable crane to walk up the side of the tower to the top to enable maintenance of the tower nacelle and blades.

The traveling blocks 602 may include loops 620 extending upwards from the traveling blocks 602 to allow the traveling blocks 602, and with it the lifting frame 106 as a whole, to hook up to the winch-and-cable mechanism. More specifically, to each traveling block 602, a sheave 622 may be mechanically coupled, e.g., via a hook and the loop 620. The winch line 128 is run down from the sheave(s) 130 at the top of the mast 110, around the sheave 622 coupled to the traveling block 602, and back up to the top of the mast once or, as shown, multiple times, forming a multi-part reeving system that decreases the force required to lift the lifting frame 106 and tower section 108 by a factor of two for each round-trip of the winch line mechanism suitable for use in conjunction with the ground-installed lifting structure 102 and lifting frame 106. Alternative lifting mechanisms that can be straightforwardly substituted for the winch-and-cable mechanism, otherwise leaving the tower erection system 100 as is (up to minor modifications to the lifting frame 106) are illustrated in FIGS. 10A-11B.

FIGS. 10A and 10B are perspective views of a lifting frame 1000 and an associated lifting mechanism that uses telescoping hydraulic cylinders 1002 instead of the winch-and-cable mechanism depicted in FIGS. 1-3 and 6-7, in accordance with one embodiment. The cylinders are shown in extended and contracted positions in FIGS. 10A and 10B, respectively. The cylinders 1002 may be placed inside masts 110 of the stationary lifting structure 102. In the depicted example, the cylinders 1002 push against the traveling blocks 1004 of the lifting frame 1000 from the bottom. In order to be able to lower the lifting frame 1000 all the way to the ground despite the remaining non-zero height of the cylinders 1002 when they are fully retracted, the portions of the traveling blocks 1004 against which the cylinders 1002 push are, in this embodiment, raised relative to the base frame component 600 of the lifting frame 1002 by that minimal cylinder height. A vertical bridge element 1006 may connect the raised portions to the portions of the traveling blocks 1004 that are coupled to the base frame component 600. In an alternative embodiment, the telescoping hydraulic cylinders may be suspended from the top of the masts 110 and lift the lifting frame by suction.

Figure 11B:
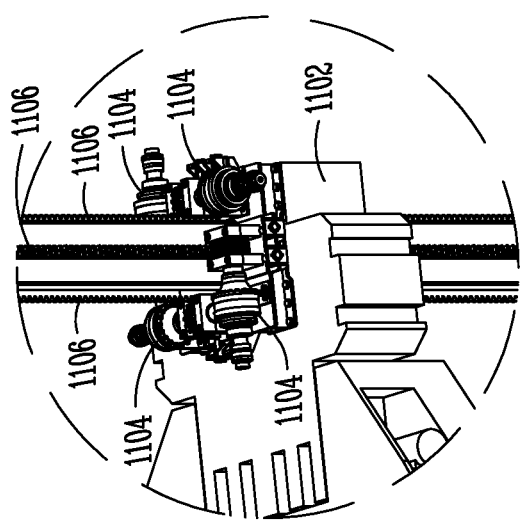
FIGS. 11A and 11B are a perspective view and associated close-up of a lifting frame and an associated rack-and-pinion lifting mechanism in accordance with one embodiment.
Figure 11A:
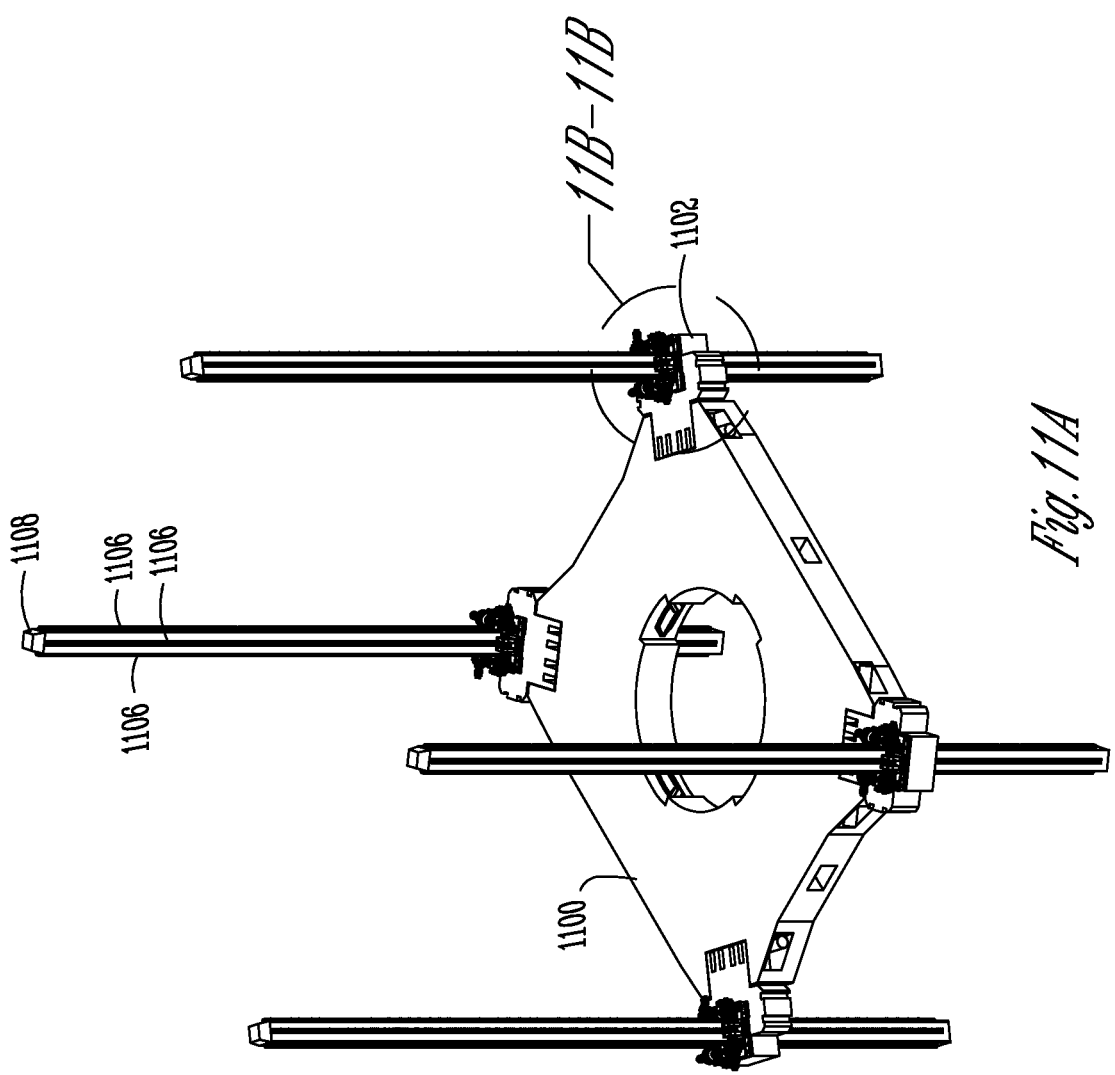

FIGS. 11A and 11B are a perspective view and associated close-up of a lifting frame 1100 and an associated rack-and-pinion lifting mechanism, as an alternative to the winch and cable mechanism, in accordance with one embodiment. The mechanism includes a set of vertical racks (i.e., linear gears) 1102 associated with each mast 110, and a set of horizontally oriented pinions (i.e., circular gears) 1104 on the respective traveling block 1106 of the lifting frame 1100. The pinions 1104 can each travel along a respective one of the racks 1102, driven up and down by, for instance, electric or hydraulic motors attached to the pinions 110. In the depicted example, each set of racks 1102 includes four racks 1002 mounted to the side surfaces of a long steel post 1108 with square cross section that runs vertically inside the mast 110, and the associated traveling block 1102, accordingly, includes four pinions 1104 positioned to engage with the four racks 1106. Other numbers of racks per mast 110 are possible, but the depicted embodiment is beneficial in that it distributes the load over multiple racks 1106 and matches the mast geometry.

Regardless whether the lifting mechanism is implemented with winches and wire rope, hydraulic cylinders, racks and pinions, or other devices, the travel of the lifting mechanism is, in accordance with various embodiments, at least the length of a tower section (e.g., about sixty feet), plus clearance for latches and lifting frame.

Having described a tower erection system 100 in accordance with various embodiments, a process for using such a system 100 to assemble a wind turbine tower from multiple tower sections of equal length will now be illustrated with reference to the perspective views provided in FIGS. 12-20, which show a sequence of steps in the process. The drawings illustrate erection of a cylindrical tower, but the described process is similarly applicable to tapered towers, and those of ordinary skill in the art will know how to make any requisite adjustments.

Figure 12:
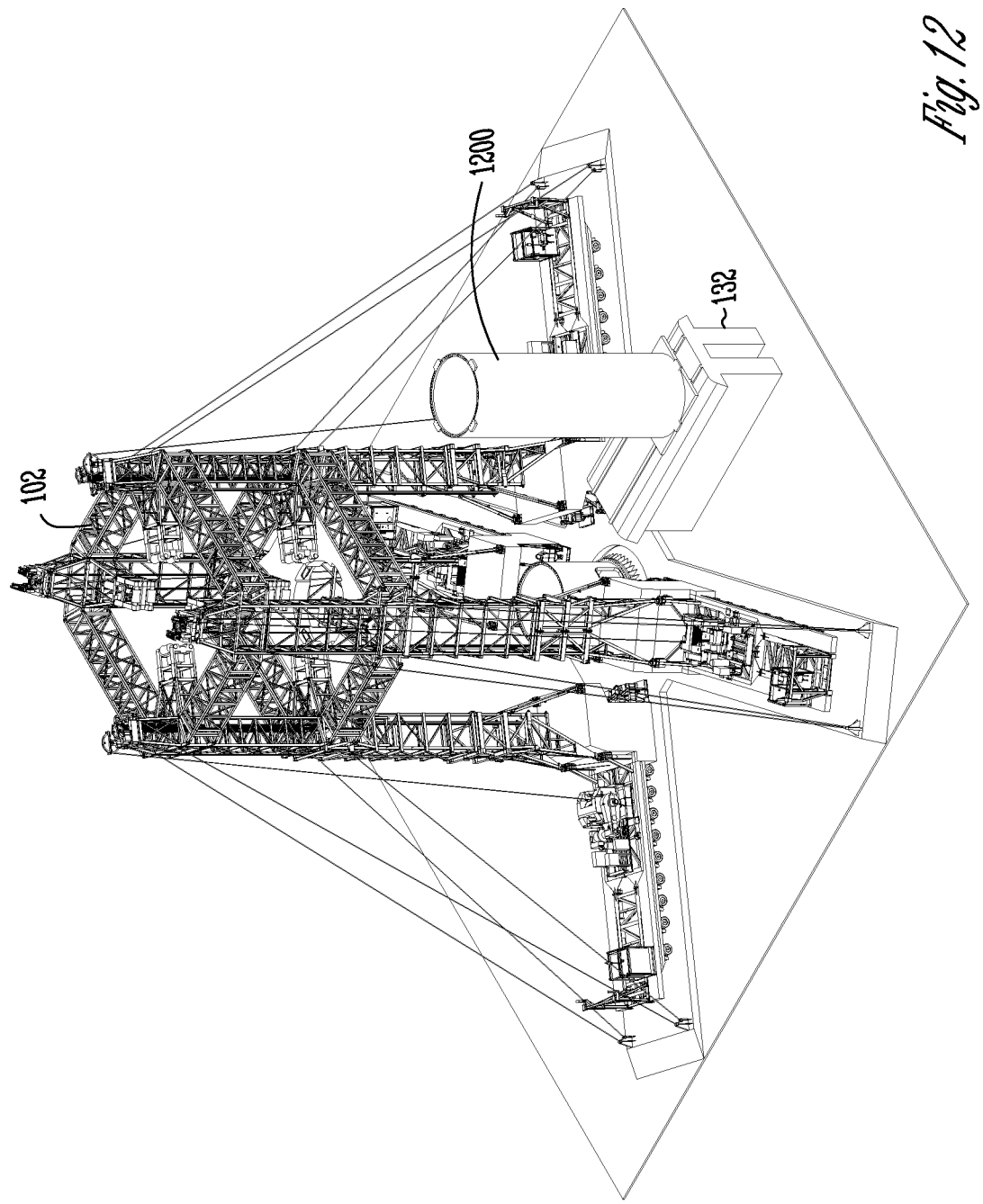
FIGS. 12-29 are perspective views of a wind turbine tower and tower erection system at various consecutive steps during the assembly process, according to one or more embodiments.
Figure 13:
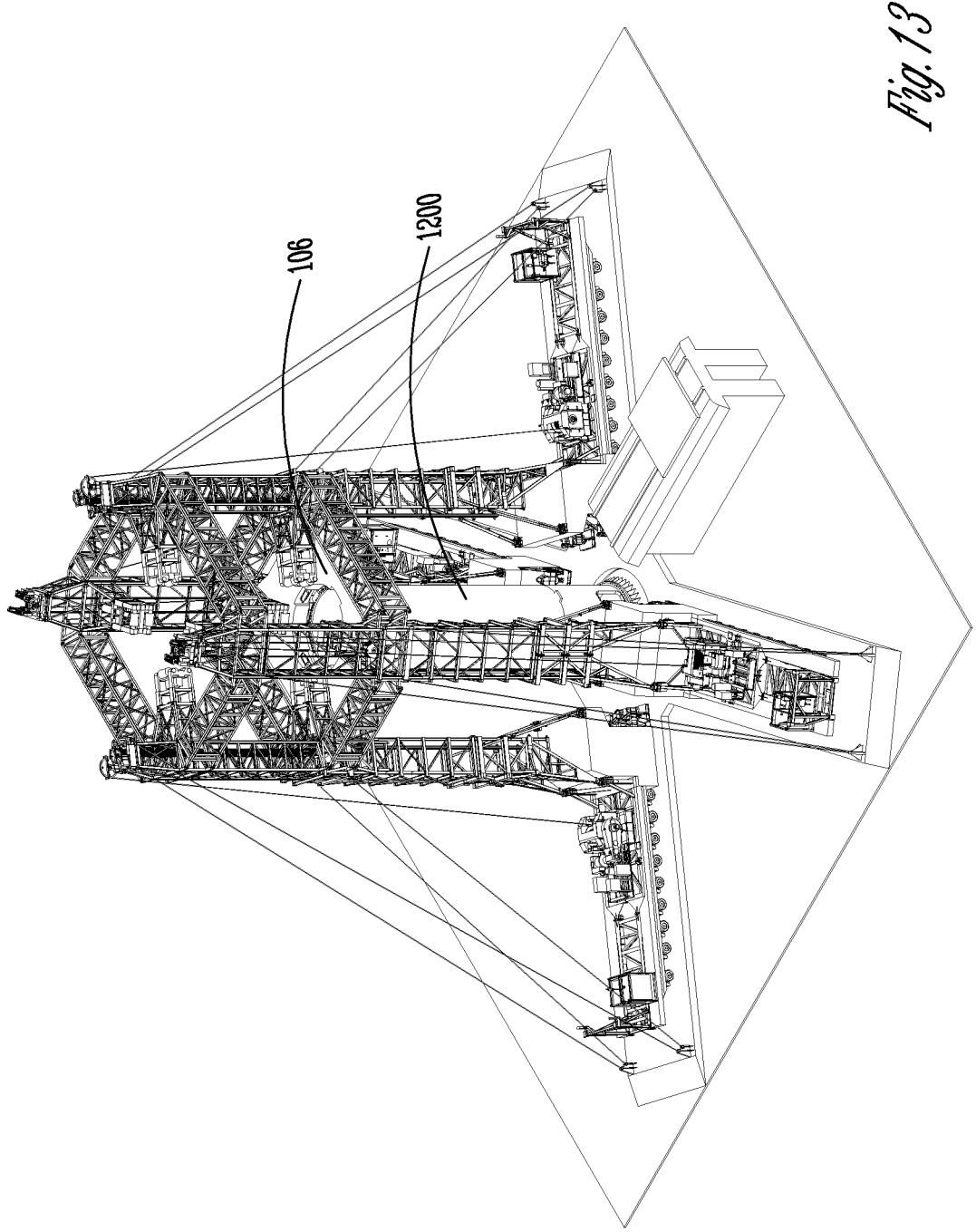
Figure 14:
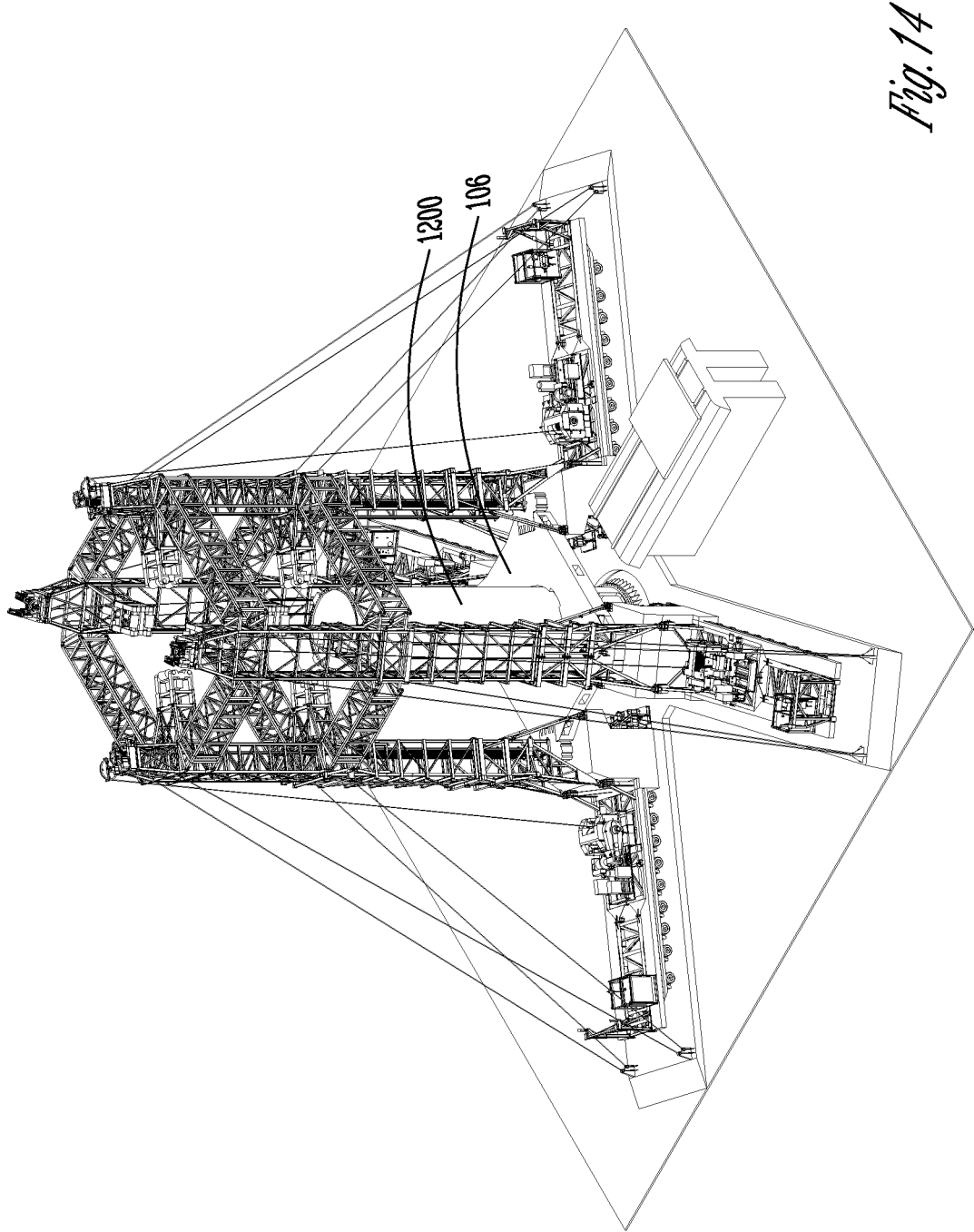
Figure 15:
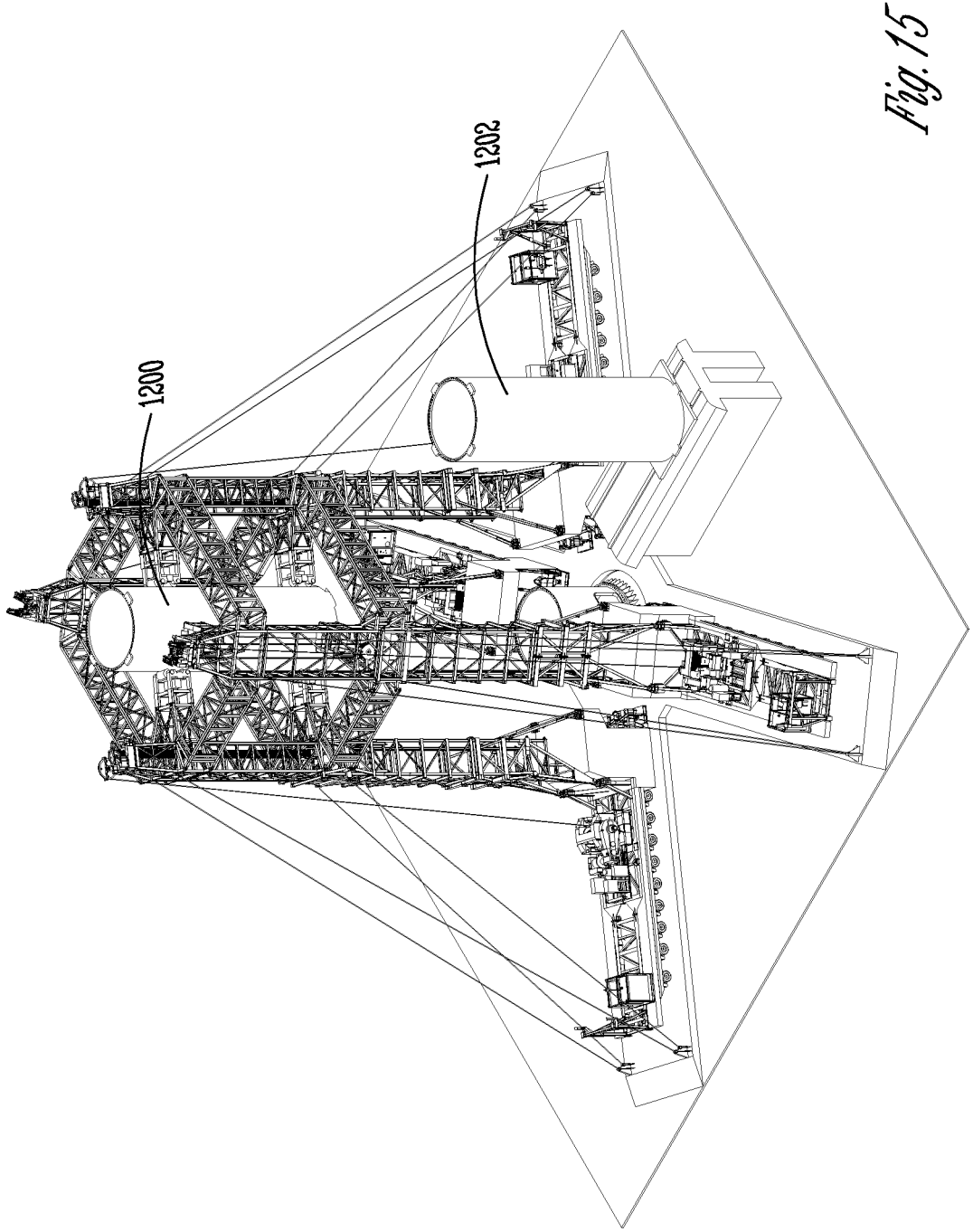

FIG. 12 shows a first tower section 1200 set onto the feeding tray 134 of the loading platform 132. The tower section 1200 may be placed on the feeding tray 134, e.g., by a small crane. The loading platform 132 may then feed the tower section 1200 into the center of the lifting structure 102, where the tower section 1200 is placed vertically on the tower base 104 of the foundation, as shown in FIG. 13. With the first tower section 1200 in position, the lifting frame 106, which may initially be placed above the tower section 1200 (FIG. 13) can now be lowered to latch to the first tower section 1200 at the bottom of the section, as shown in FIG. 14. More specifically, the lifting frame 106 may, for instance, latch onto projections (such as tabs 614) from the lateral surface of the tower section 1200. Once the lifting frame 106 is latched, the winch-and-cable mechanism (or other lifting mechanism) is operated to lift the lifting frame 106 and first tower section 1200 to a height just exceeding the section length, leaving sufficient space underneath to insert the second tower section. FIG. 15 shows the first tower section 1200 in the resulting lifted position, and the second tower section 1202 placed on the feeding tray 134 of the loading platform 132.

Figure 16:
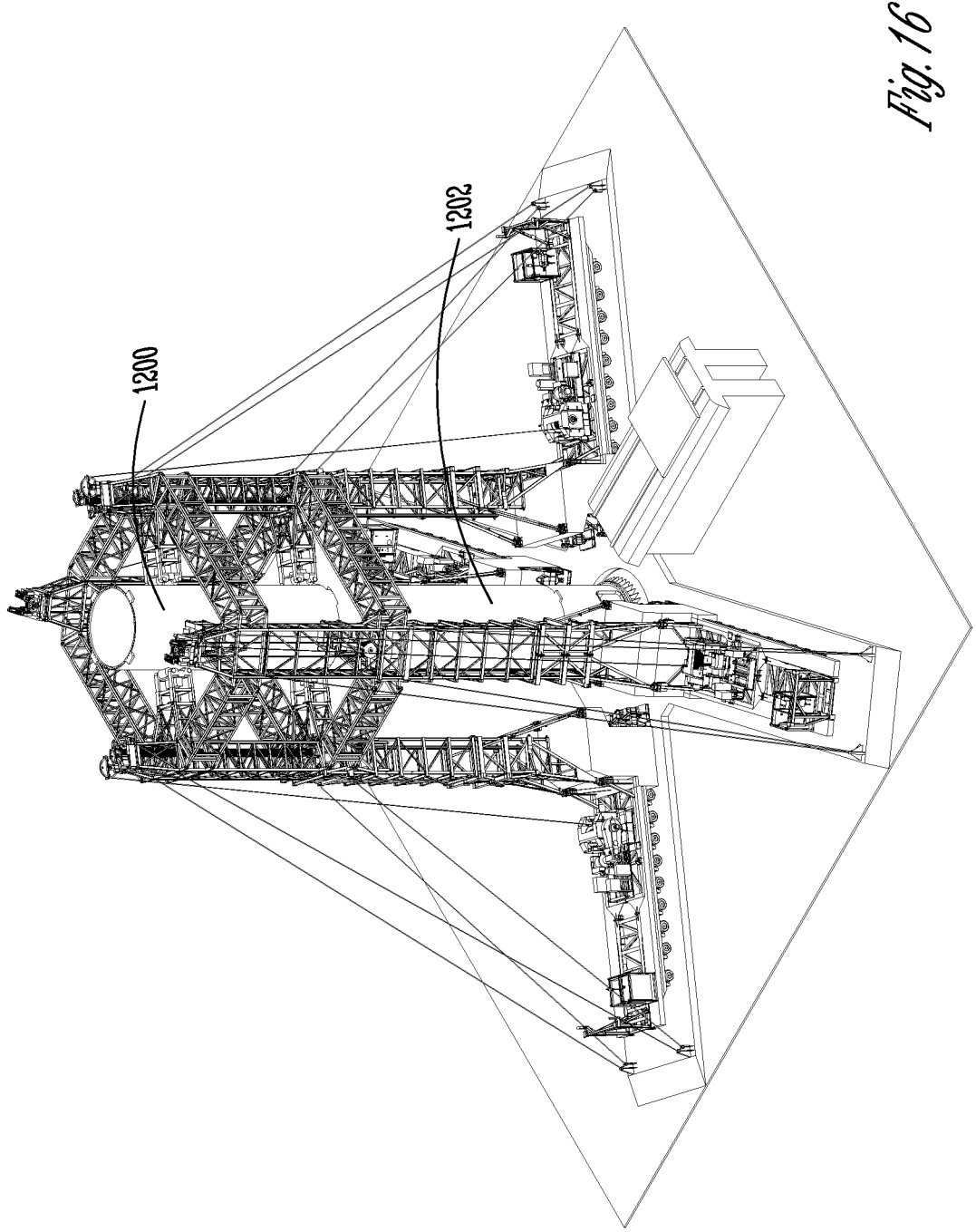

FIG. 16 illustrates the second tower section 1202 loaded into the lifting structure 102. At this stage, the first tower section 1200 can be lowered into contact with and secured to the second tower section 1202 to create a connected tower portion resting on the tower base 104. (In principle, the second tower section 1202 can, alternatively, be lifted into contact with the first tower section, and the connected tower portion be suspended from the lifting structure. To allow the lifting frame 106 from being unlatched and lowered to pick up the next section, the connected tower portion would, in this case, be latched onto the stationary lifting structure 102, e.g., using tabs at the top of the first tower section.) The tower sections 1200, 1202 may be secured to one another, e.g., by bolting them together. Alternatively (or additionally after bolting), a sub-arc welding machine installed onto the lifting structure 102 may ride on a track around the tower portion to weld the sections 1200, 1202 together.

Figure 17:
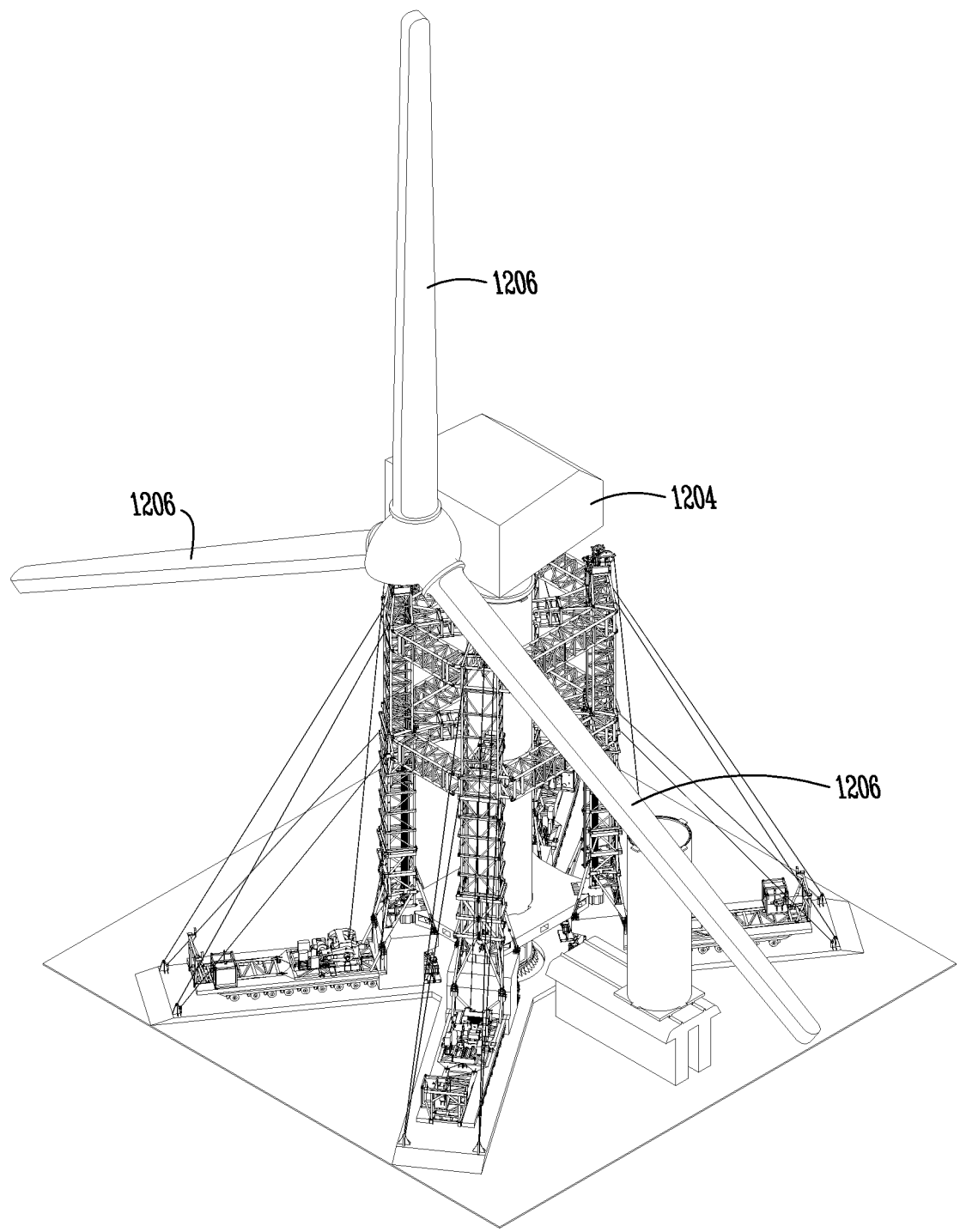

With the first tower section 1200 extending to or beyond the top of the lifting structure 120, about 150 feet above ground, the tower nacelle 1204, blades 1206, and other ancillary pieces of equipment may be installed atop the tower, as shown in FIG. 17. Beneficially, installing the equipment at this stage (rather than upon assembly of the whole tower) allows the installation to be performed much closer to the ground. As the lifting height for installation is, e.g., 150 feet off the ground, instead of 400 feet off the ground as in traditional bottom-to-top wind turbine tower installations, much smaller, lower-cost cranes can be used.

Figure 18:
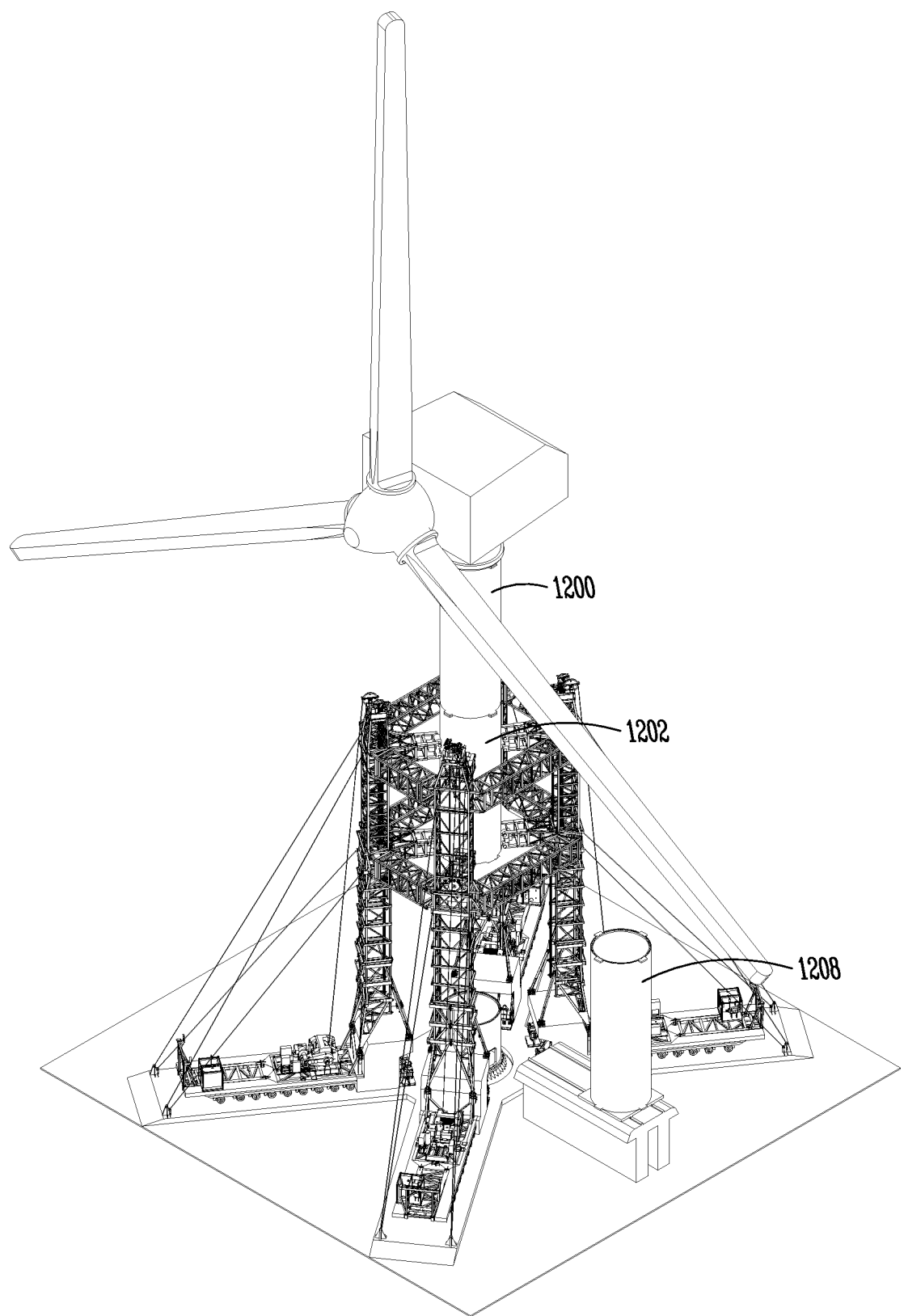
Figure 19:
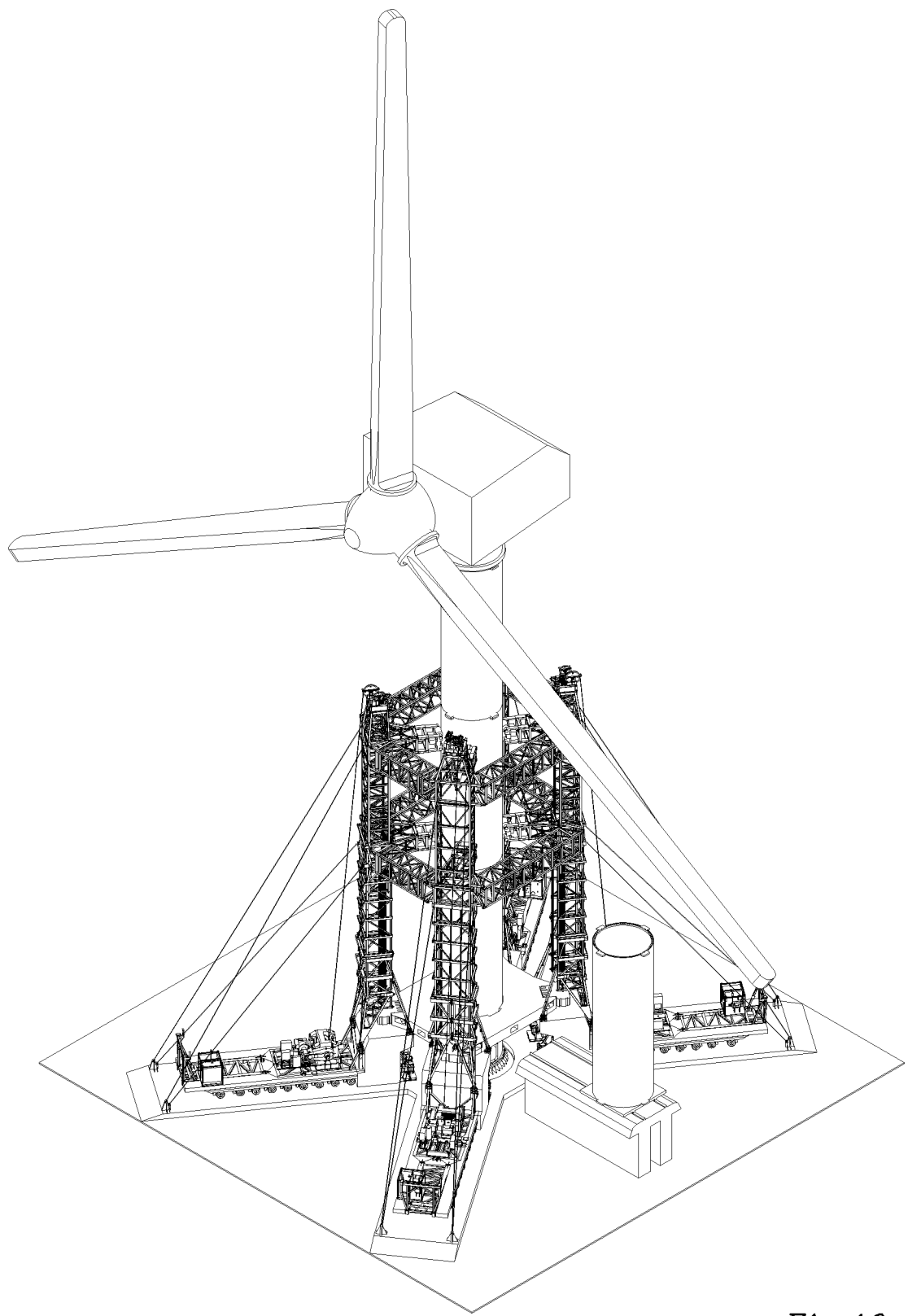
Figure 20:
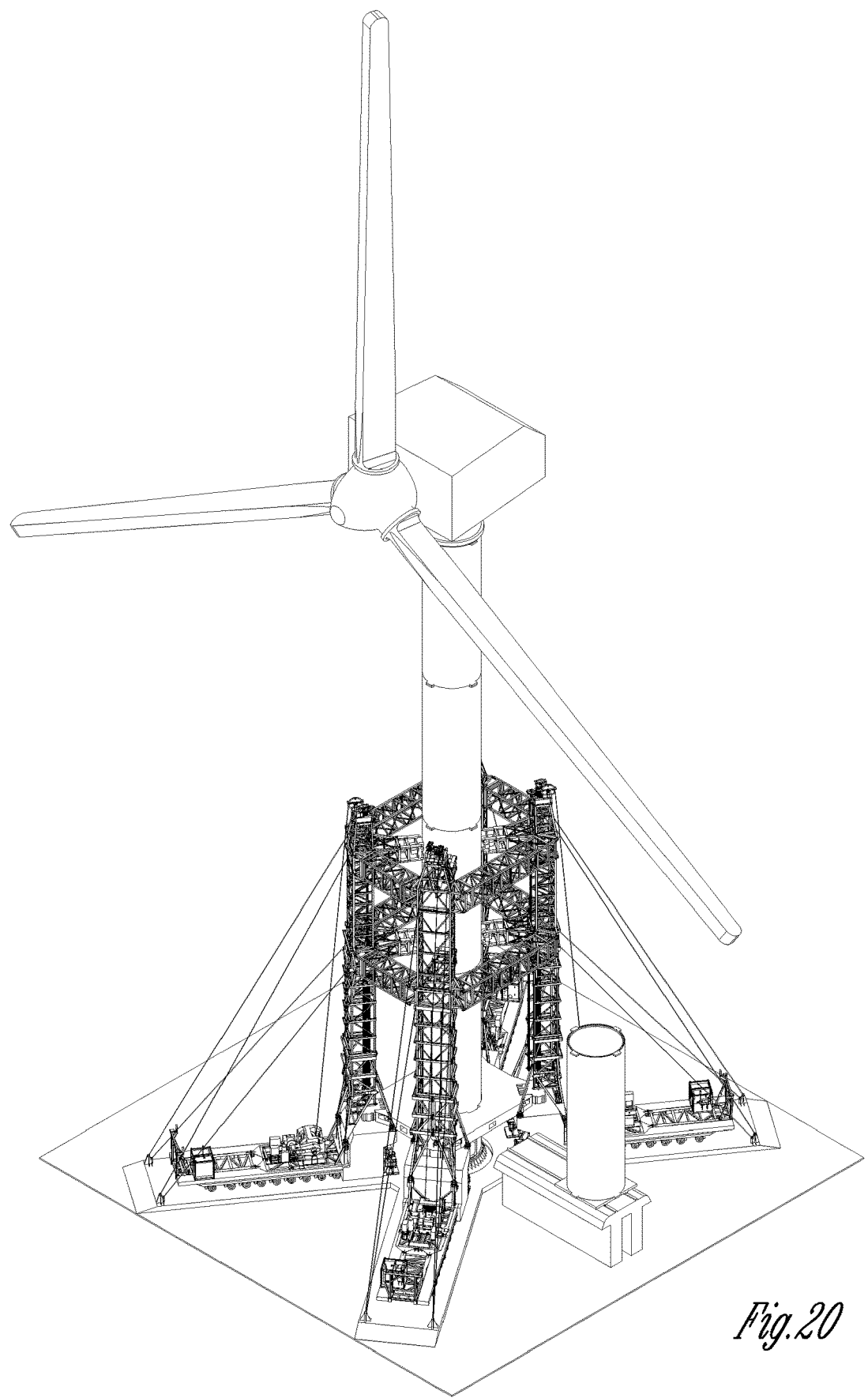
Figure 21:
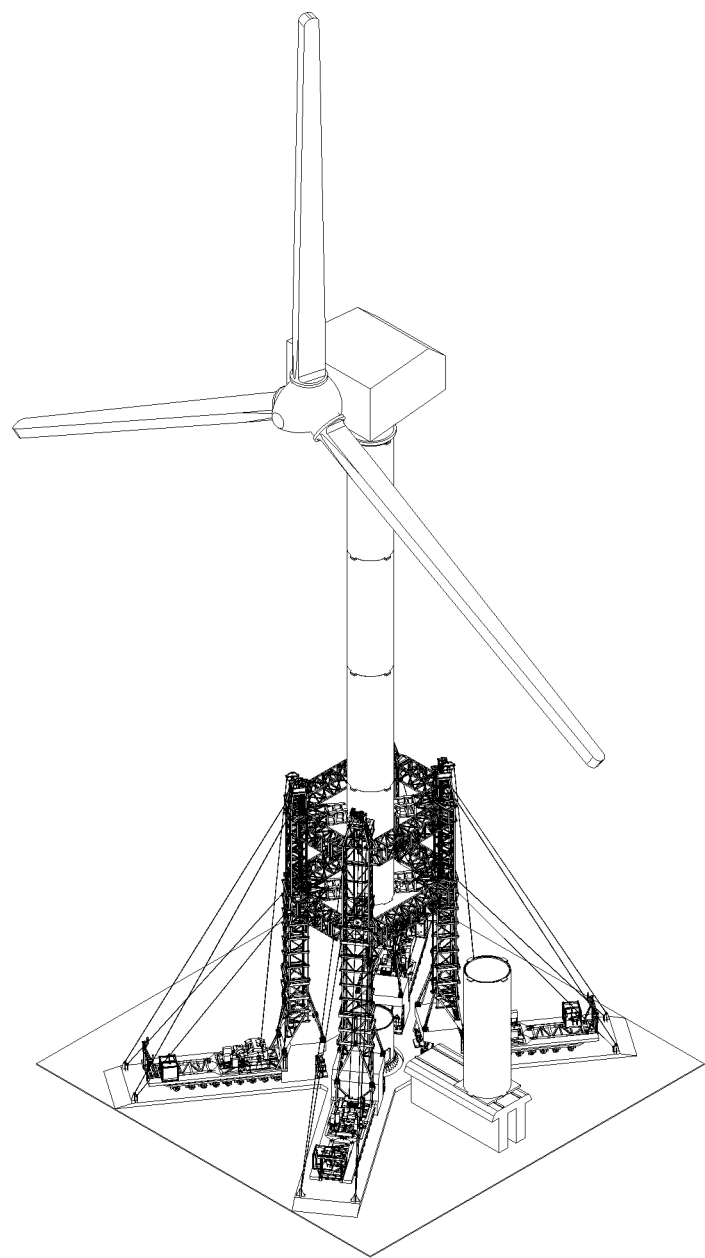
Figure 22:
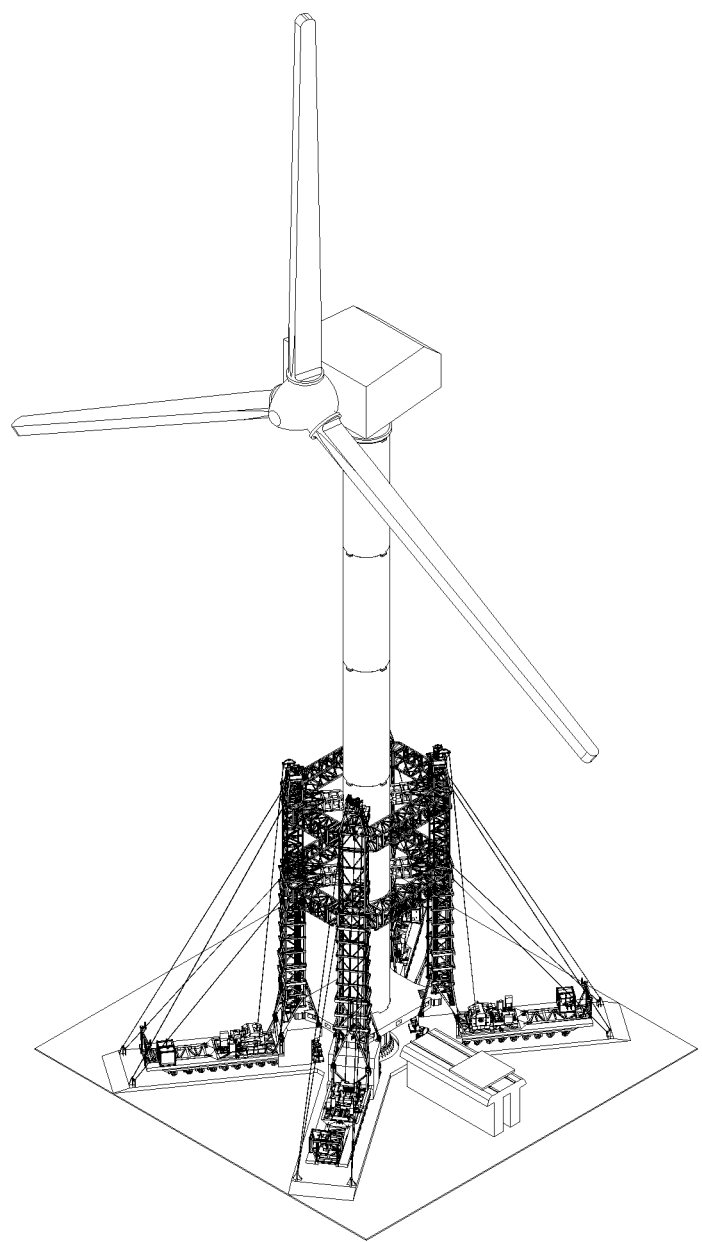
Figure 23:
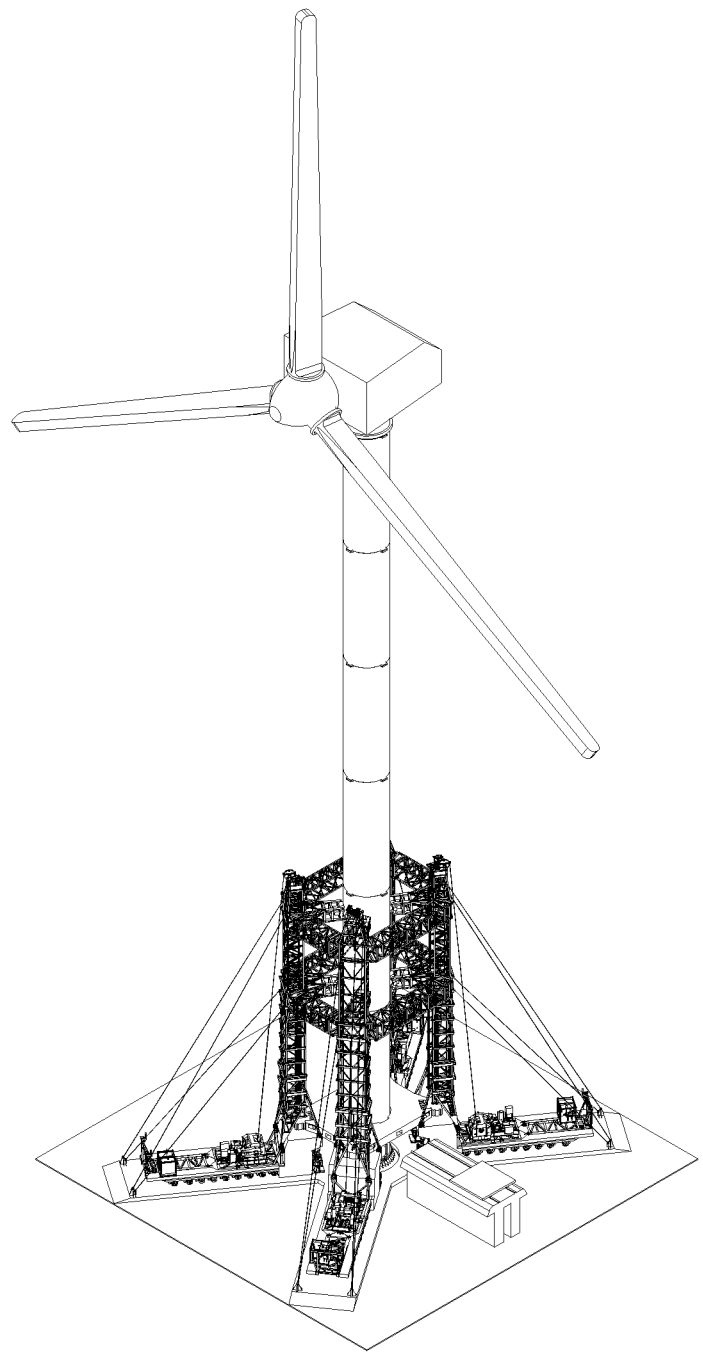
Figure 24:
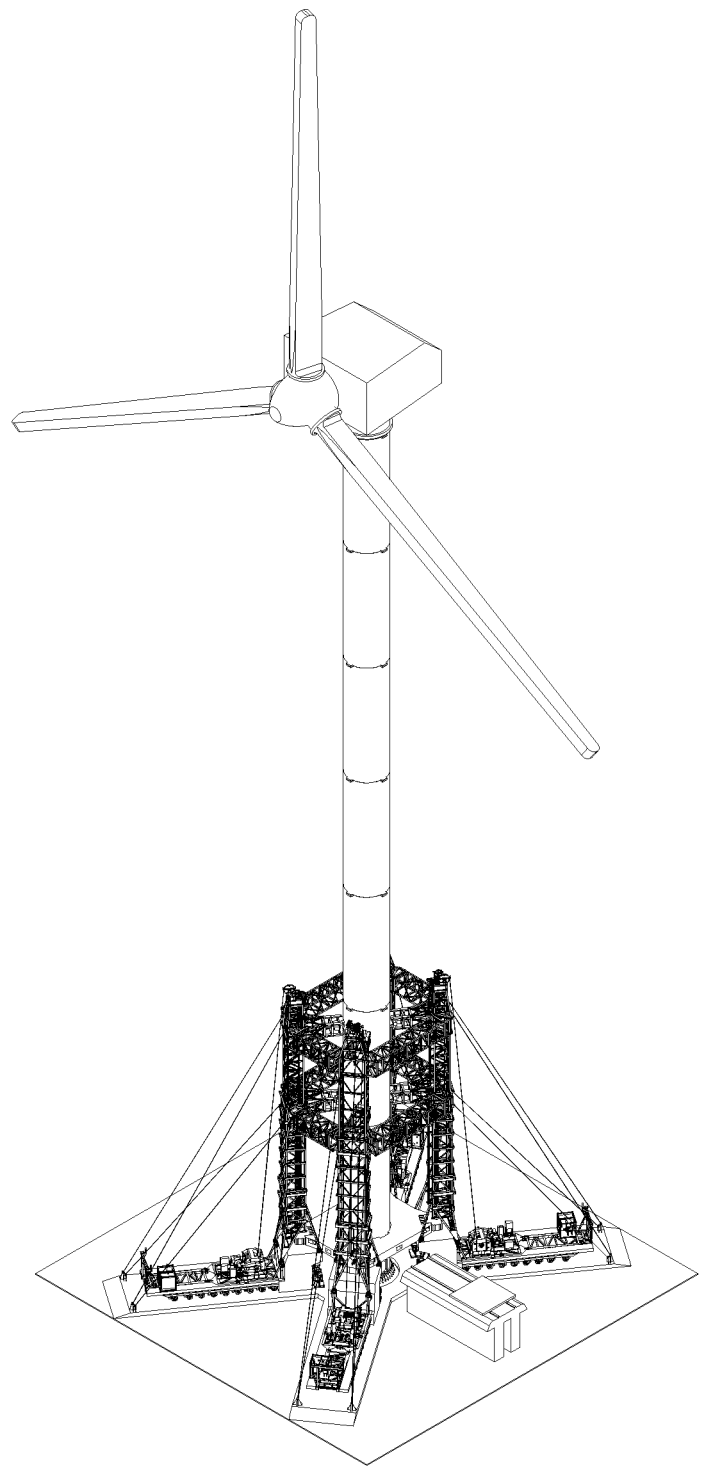
Figure 25:
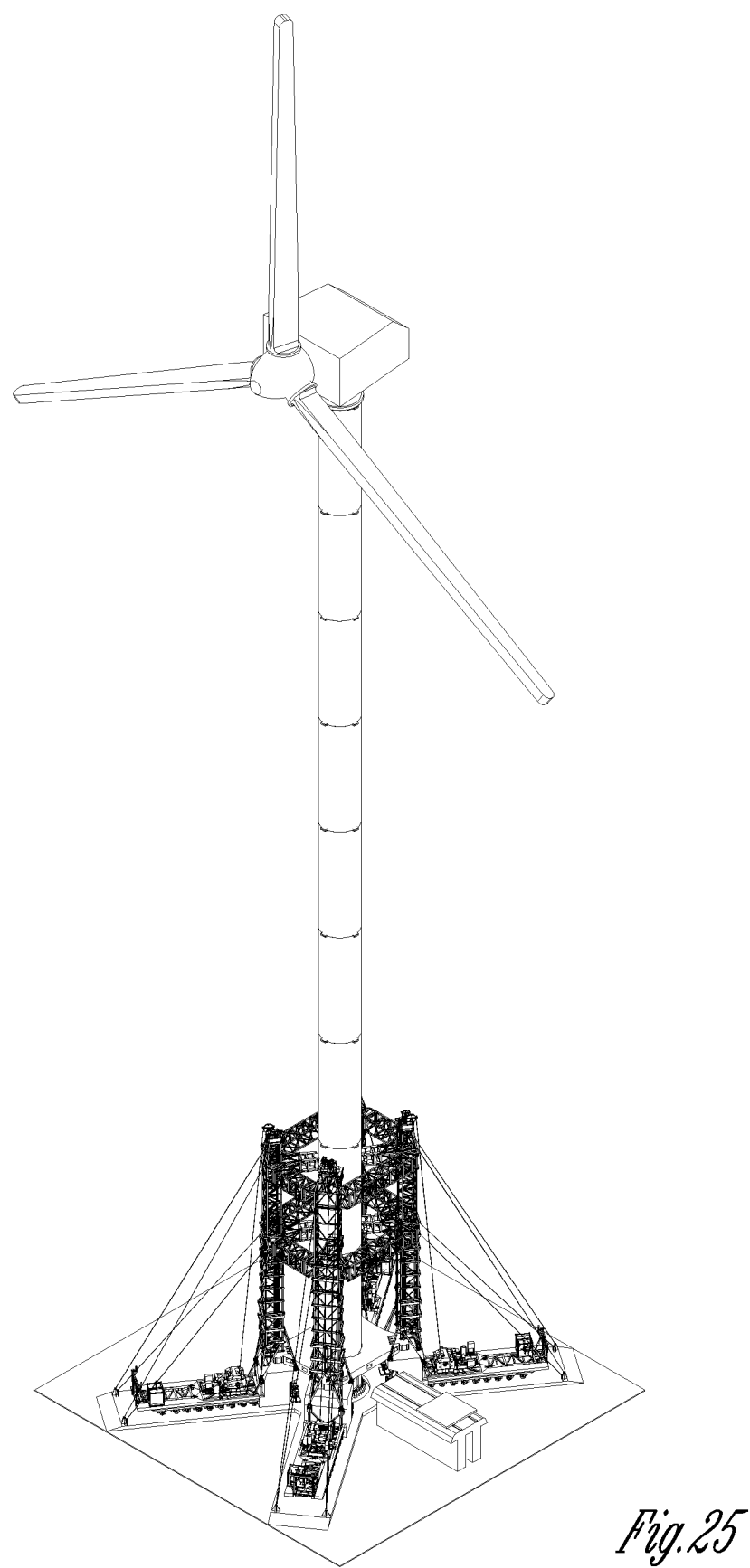
Figure 26:
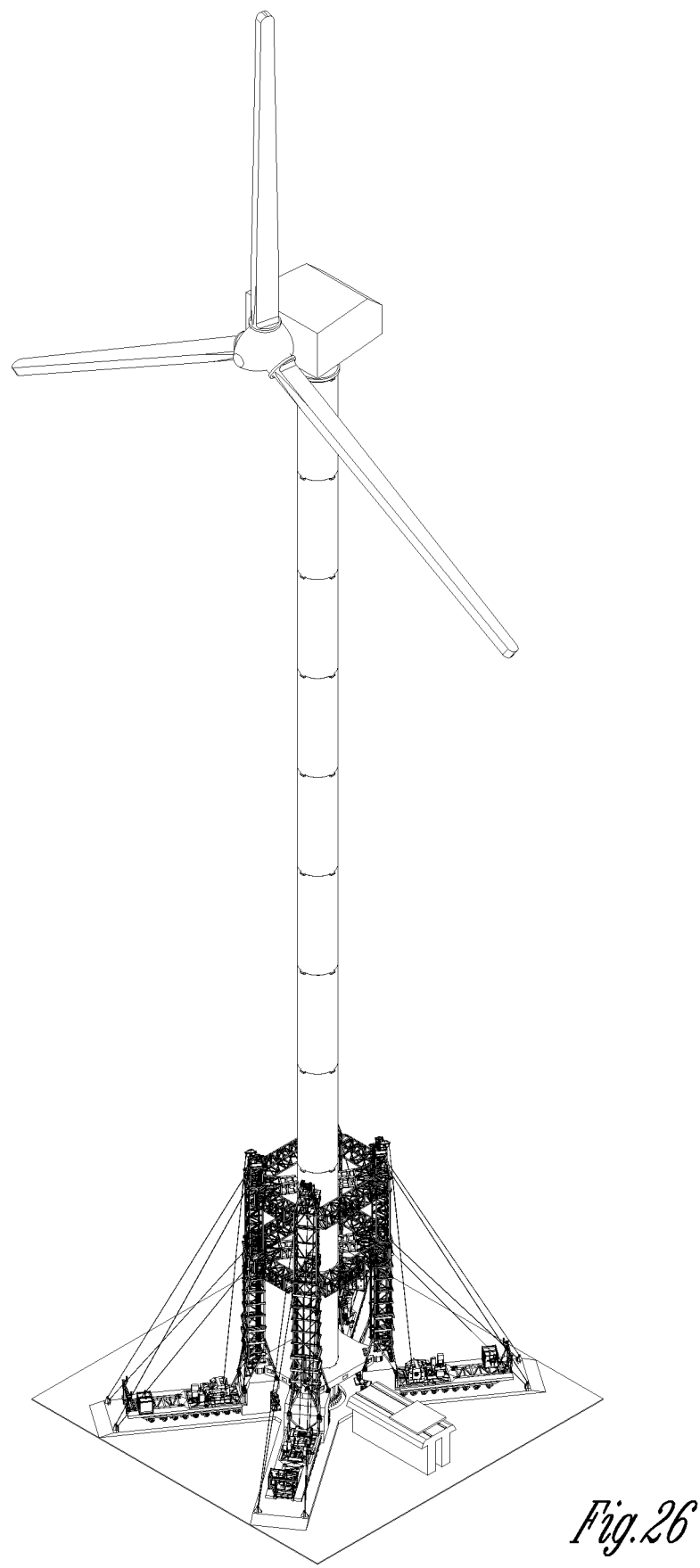
Figure 27:
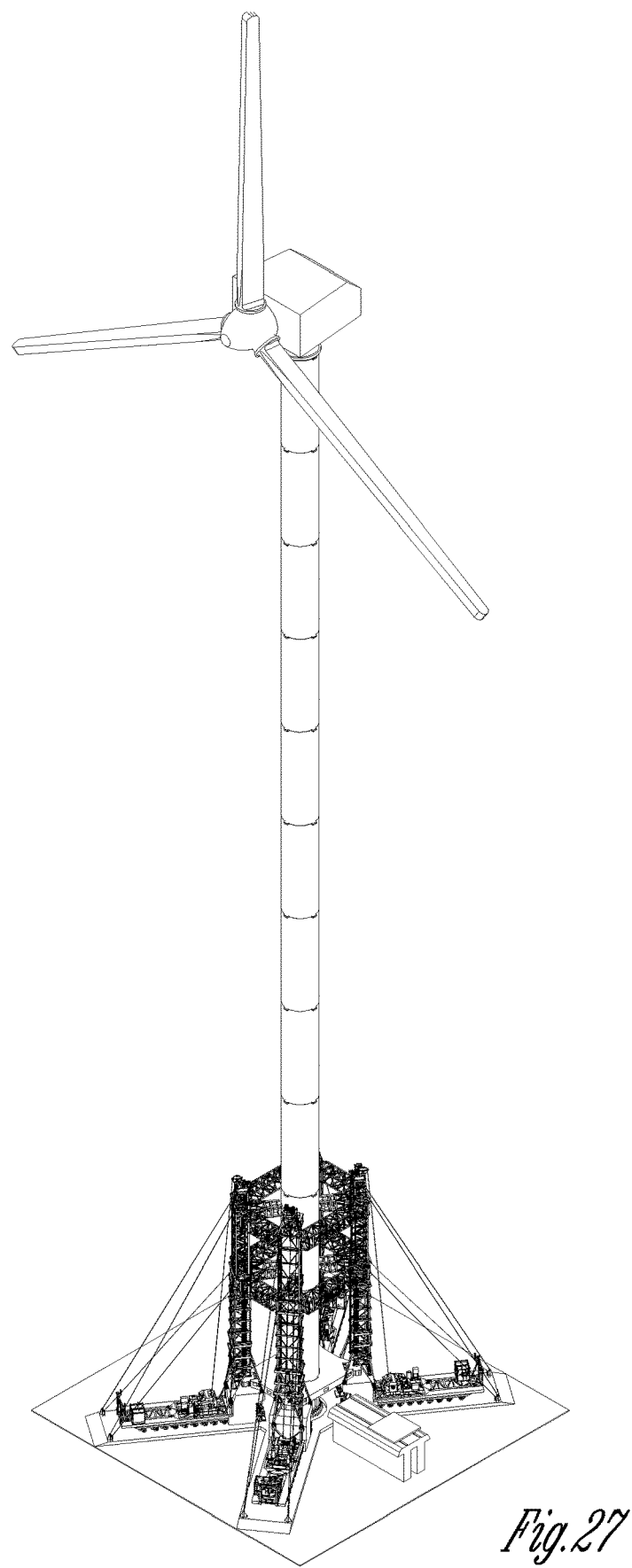
Figure 28:
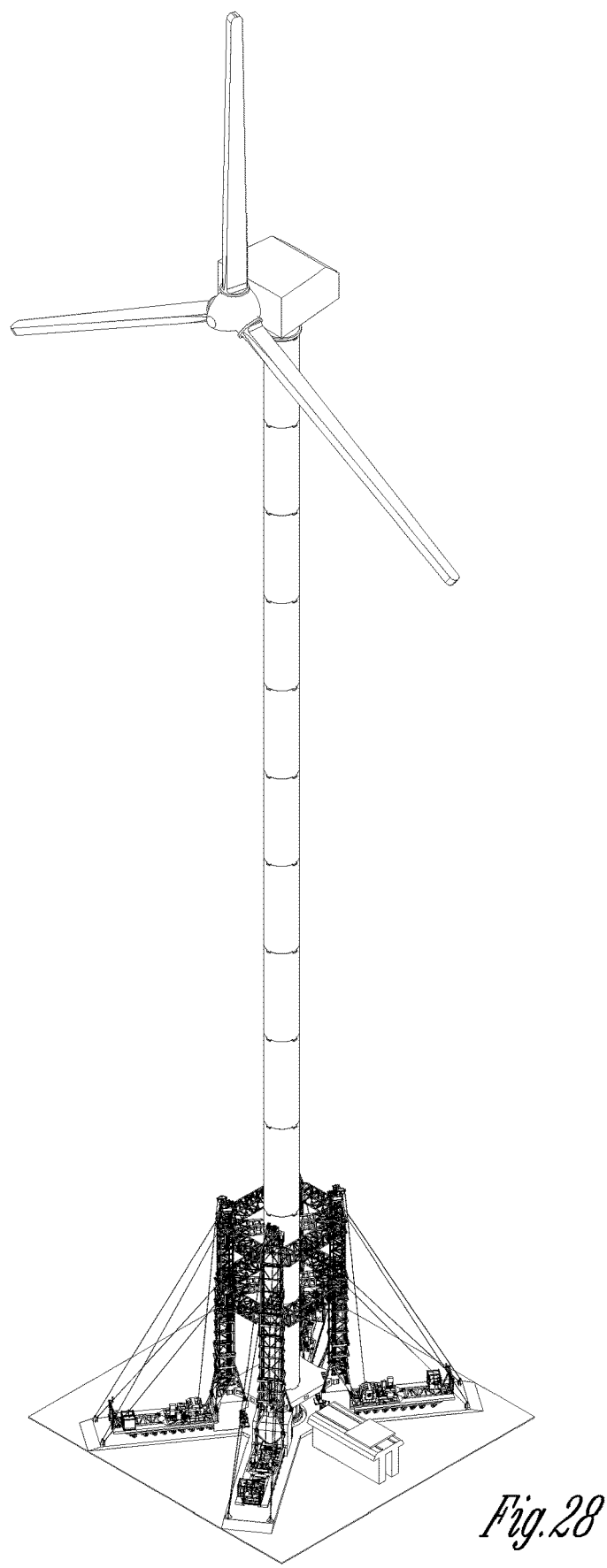
Figure 29:
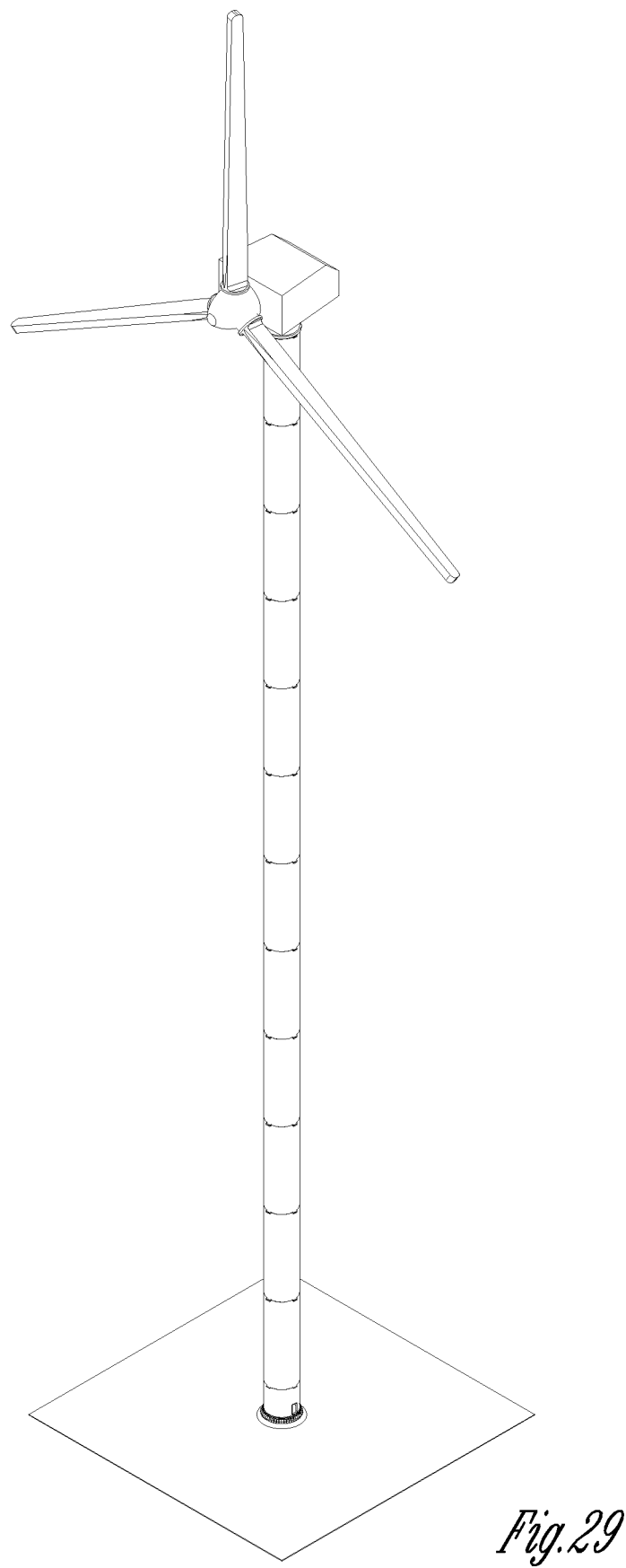

Once the wind tower components such as nacelle 1204 and blades 1206 are installed, the tower height can be extended iteratively by adding additional sections from the bottom. Thus, the lifting frame 102 may be released from the first tower section 1200, lowered, and latched onto the second tower section 1202 at the bottom. Then, as depicted in FIG. 18, the connected tower portion including the first and second tower sections 1200, 1202 may be lifted by just in excess of one section length, and a third tower section 1208 may be placed onto the loading platform 132 and loaded into the lifting structure 102. The lifting frame 102 may again be unlatched and lowered to pick up the third tower section 1208, and so on until the entire tower is completed. Each time a new section is added, the connected tower portion formed of the previously loaded sections is lifted in its entirety to make room for another section to be inserted at ground level. FIGS. 19-28 show the assembled tower portion at increasing heights, corresponding to three to eleven tower sections. Once the tower assembly is complete (with, in this example, eleven sections), the tower is bolted down to the tower base 104 of the foundation to be permanently secured. The tower erection system 100, including the ground-based lifting structure 102, lifting frame 106 and lifting mechanism, as well as the loading ramps 114 and loading platform 132, may then be removed.

Turning now to FIGS. 30-34, an alternative system for erecting a tower iteratively from the top down will be described. In this alternative system, the scaffold of the stationary lifting structure takes the form of a tripod (instead of a plurality of vertical mast), and the stationary lifting structure further includes a bottom guide frame inside of which the lifting frame moves.

Figure 30:
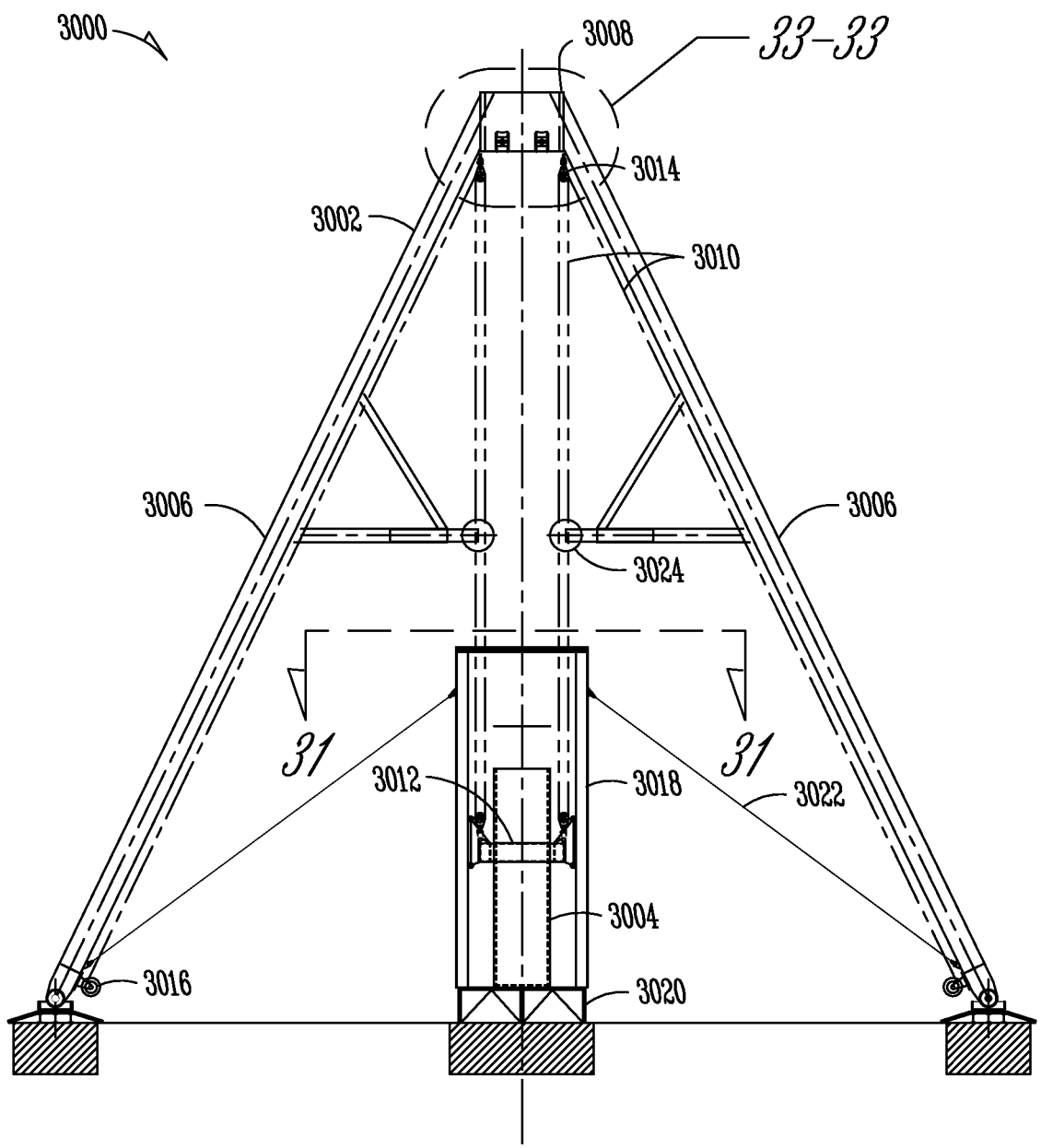
FIG. 30 is a side view of an alternative, tripod-based tower erection system according to one or more embodiments.

FIG. 30 provides a side elevation view of such an alternative, tripod-based tower erection system 3000 according to one or more embodiments. The tripod 3002 surrounds the tower foundation and bottom section(s) 3004 of the tower as the tower is being built. It includes three legs 3006 (only two being visible in the two-dimensional side elevation view) secured to the ground, e.g., at 120° intervals along a circle centered at the tower foundation, and connected at the top to a tripod crown 3008 placed directly above the tower foundation. The diameter of the circle and the height of the tripod 3002 may be on the same order, and may amount to multiple tower-section lengths. For example, in one embodiment, the tripod 3002 is about two hundred feet high and measures about two hundred feet in diameter on the ground.

Suspended from the tripod 3002 via winch lines 3010 is a ring-shaped lifting frame 3012 (herein also "lifting ring"). The winch lines 3010 run straight up to the tripod crown 3008, over sheaves 3014 attached to the crown 3008, and from there down along the tripod legs 3006 to respective winches 3016 mounted to each leg 3006 near the ground. Together, the winches 3016 and associated winch lines 3010 and sheaves 3014 provide a winch-and-cable mechanism for lifting and lowering the lifting frame 3012.

The lifting frame 3012 is laterally guided within a hollow cylindrical bottom guide frame 3018 that has a diameter slightly larger than the diameter of the tower sections and a height exceeding the height of an individual tower section. As shown, the bottom guide frame 3018 may be seated on an installation stool 3020 surrounding the tower foundation or bottom tower section 3004, and may be laterally stabilized by strut wires 3022 extending from a top portion of the bottom guide frame 3018 down to the feet of the tripod legs 3006. The lifting frame 3012 is configured to contact and move along the inner surface of the cylindrical bottom guide frame 3018 as it lifts a tower section. The tower portion above the guide frame 3018 can be laterally stabilized with horizontal load-bearing rollers 3024 similar to those described with respect to FIG. 4.

Figure 31:
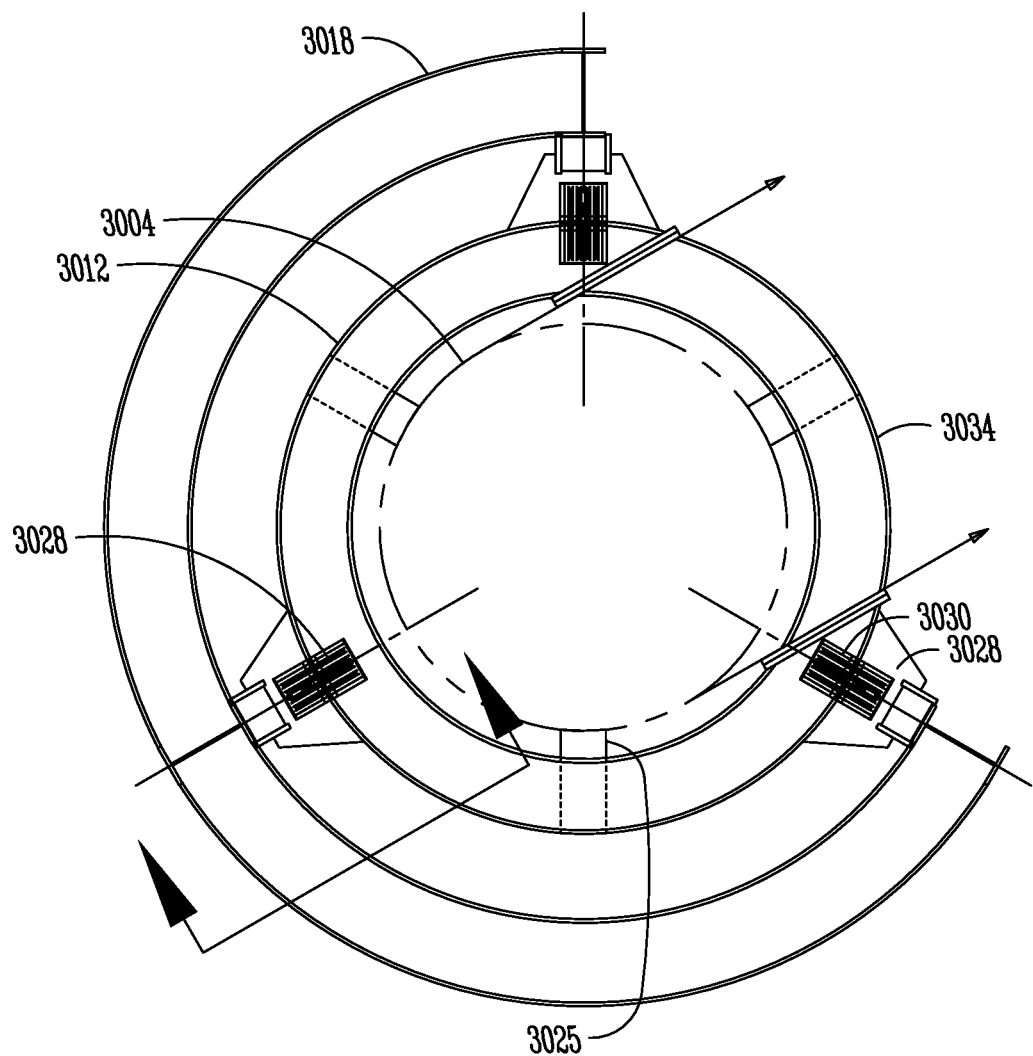
FIG. 31 is a horizontal sectional view of the tower erection system of FIG. 30.
Figure 32:
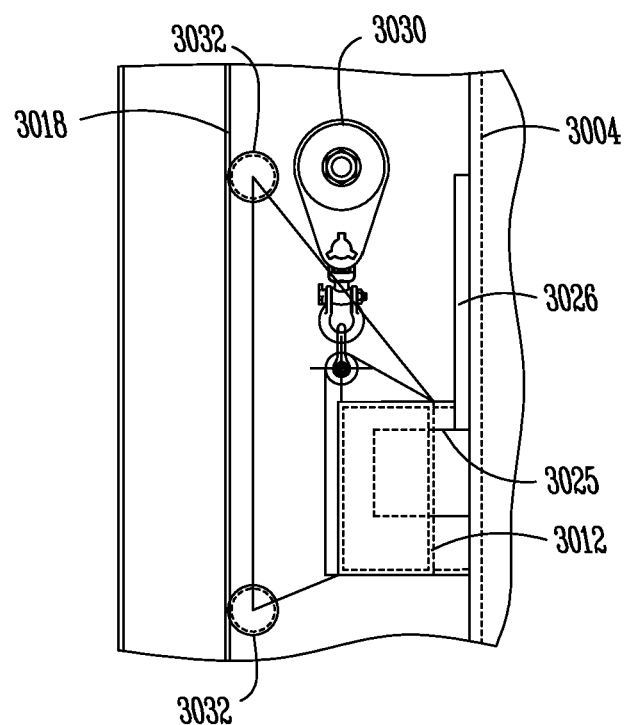
FIG. 32 is a vertical sectional view through the guide frame and lifting ring of the tower erection system of FIG. 30.

FIG. 31 is a horizontal cross-sectional view through the tower erection system 3000 of FIG. 30, showing the tower section 3004 surrounded by the lifting ring 3012, which is, in turn, surrounded by the cylindrical bottom guide frame 3018. FIG. 32 is a vertical sectional view through the walls of the guide frame 3018 and lifting ring 3012. As schematically indicated in broken lines in both FIGS. 31 and 32, the lifting ring 3012, whose inner diameter is slightly larger than the diameter of the tower section 3004 (or, for a tapered tower, slightly larger than the largest tower-section diameter), mechanically couples to the tower section 3004 via retractable latches 3025. The latches 3025 may press a lock plate 3026 against the lateral surface of the tower section 3004. Alternatively, the latches 3025 may be configured to engage with tabs or similar projections extending laterally from the surface of the tower section 3004, e.g., similarly to the latching mechanism described with reference to FIG. 6. Further, the latches may be movable along the radial direction, e.g., by hydraulic cylinders, to accommodate a varying tower diameter. The lifting ring 3012 further includes, laterally extending beyond the outer diameter of its ring-shaped frame, three lifting blocks 3028 (one associated with each of the legs 3006 of the tripod 3002) placed along the circumference of the lifting ring alternatingly with the latches 3024 (which are likewise three in number in the depicted embodiment). Mounted to the top of the lifting blocks 3028 are sheaves 3030 for the winch line 3010 to wind around. The lifting blocks 3028 further include horizontal guide rollers 3032 to engage with the interior surface of the surrounding bottom guide frame 3018. As shown in FIG. 32, an individual lifting block 3028 may include such guide rollers 3032 at two vertically spaced-apart locations.

The bottom guide frame 3018 may be formed by multiple sections, e.g., three sections each covering a 120° angle about the central axis of the tripod, along which the tower is constructed. These sections may be installed separately, allowing the bottom guide frame 3018 to be constructed around a tower section 3004 after the tower section 3004 has been positioned on the tower foundation at the center of the tripod 3002. Similarly, the lifting ring 3012 may be spliced into multiple sections, e.g., to form a door section 3034 that can open up to allow the tower section 3004 to be placed inside the lifting ring 3012 from the side. Alternatively, the lifting ring 3012 may be lifted for placement of a new tower section 3004, and then lowered around the tower section 3004 to pick it up.

Figure 33:
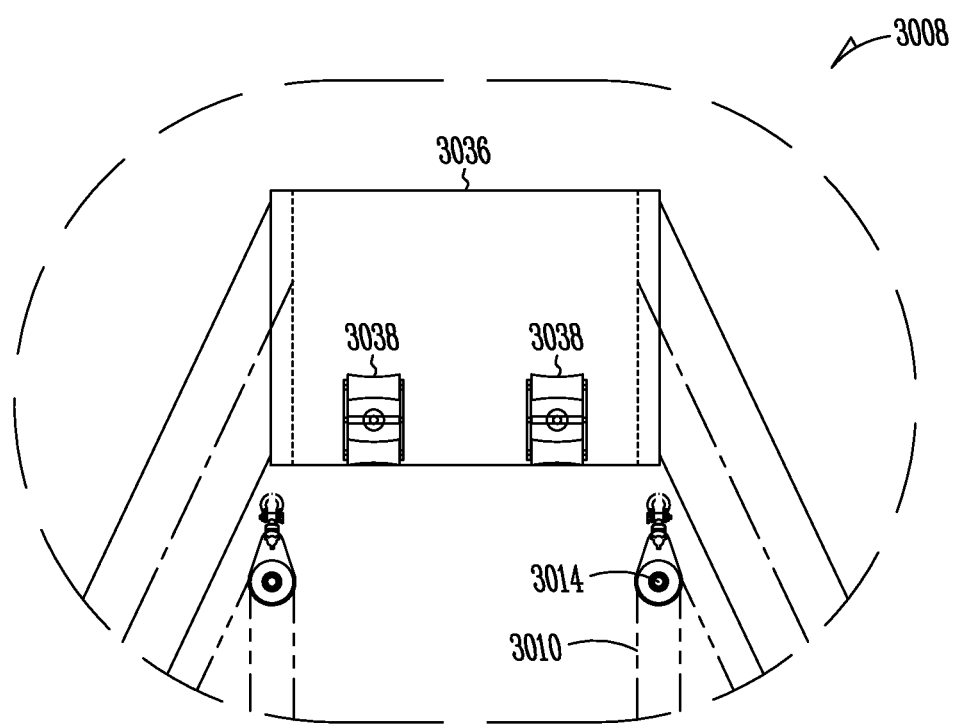
FIG. 33 is a close-up side view of the crown of the tower erection system of FIG. 30.
Figure 34:
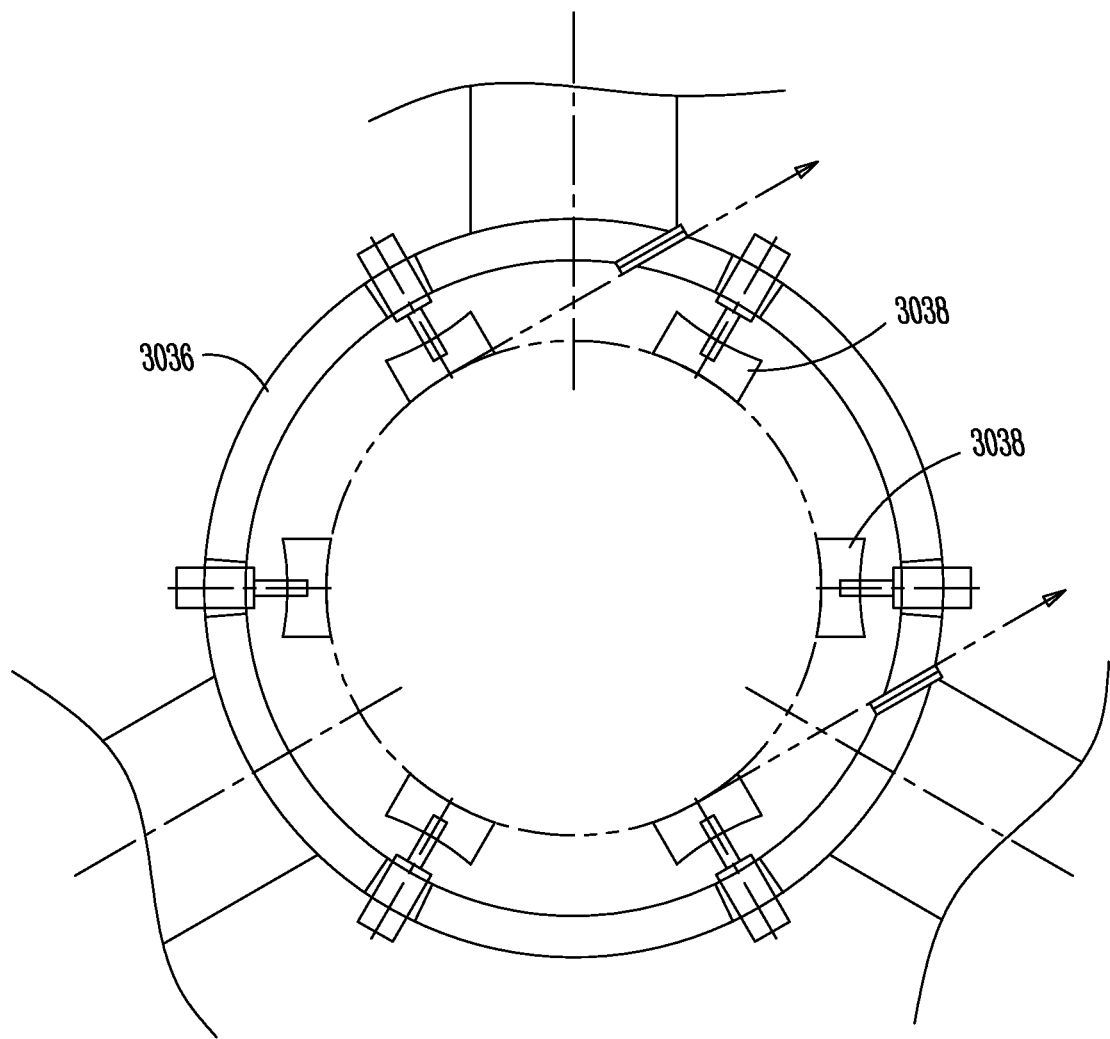
FIG. 34 is a horizontal sectional view through the crown depicted in FIG. 33.

FIGS. 33 and 34 provide a close-up side view and a horizontal sectional view of the crown 3008 of the tower erection system 3000. The crown 3008 includes a bushing 3036 connected to and held in position by the three legs 3006 of the tripod 3002. Three upper blocks with sheaves 3014 for the winch lines 3010 are suspended from the bushing 3036. The crown 3008 further includes a set of horizontal crown guide rollers 3038, e.g., as shown, six rollers 3038 placed every 60° along the circumference of the bushing 3036, to laterally guide the tower sections as they are lifted up through the hole of the bushing 3036 during tower construction.

Figure 35:
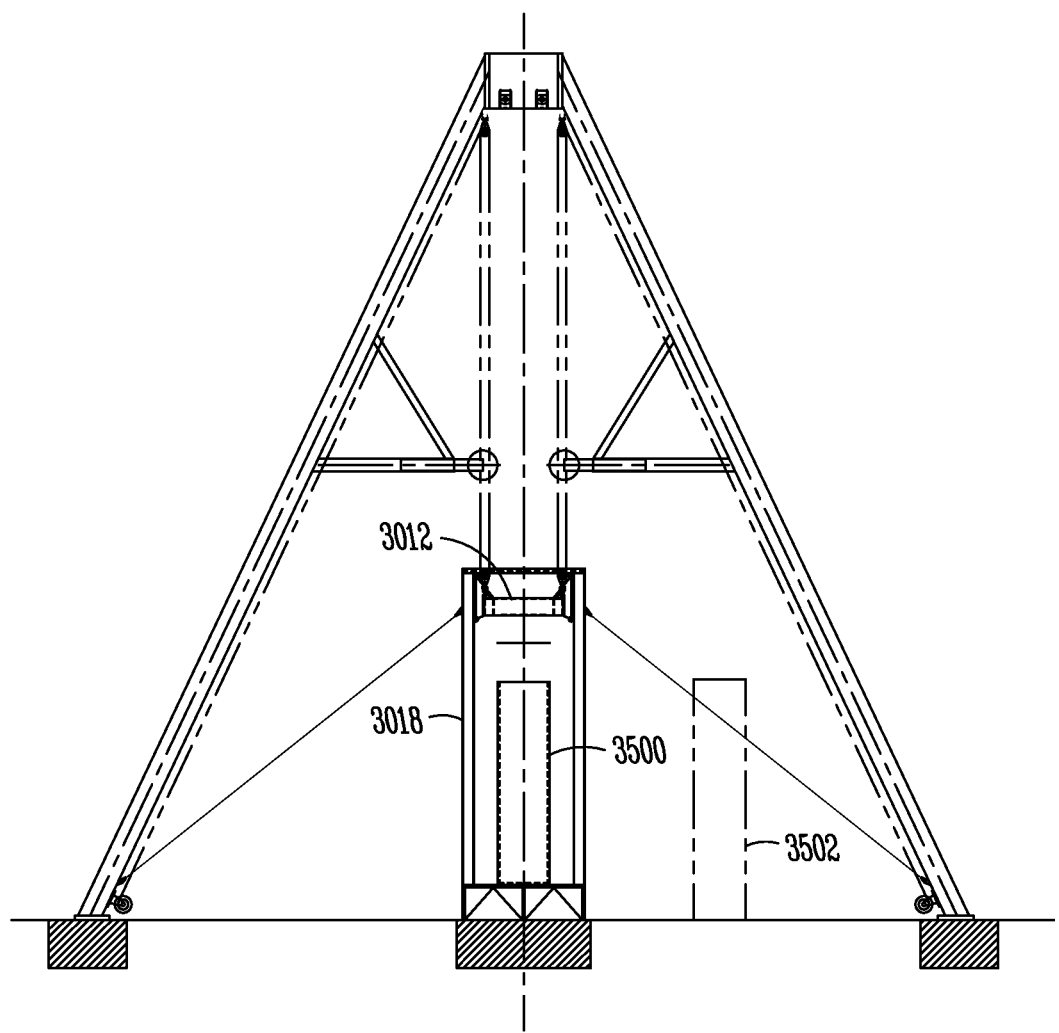
FIGS. 35-40 are side views of the tower erection system of FIG. 30 during a sequence of steps at the beginning of tower assembly, according to one or more embodiments.
Figure 36:
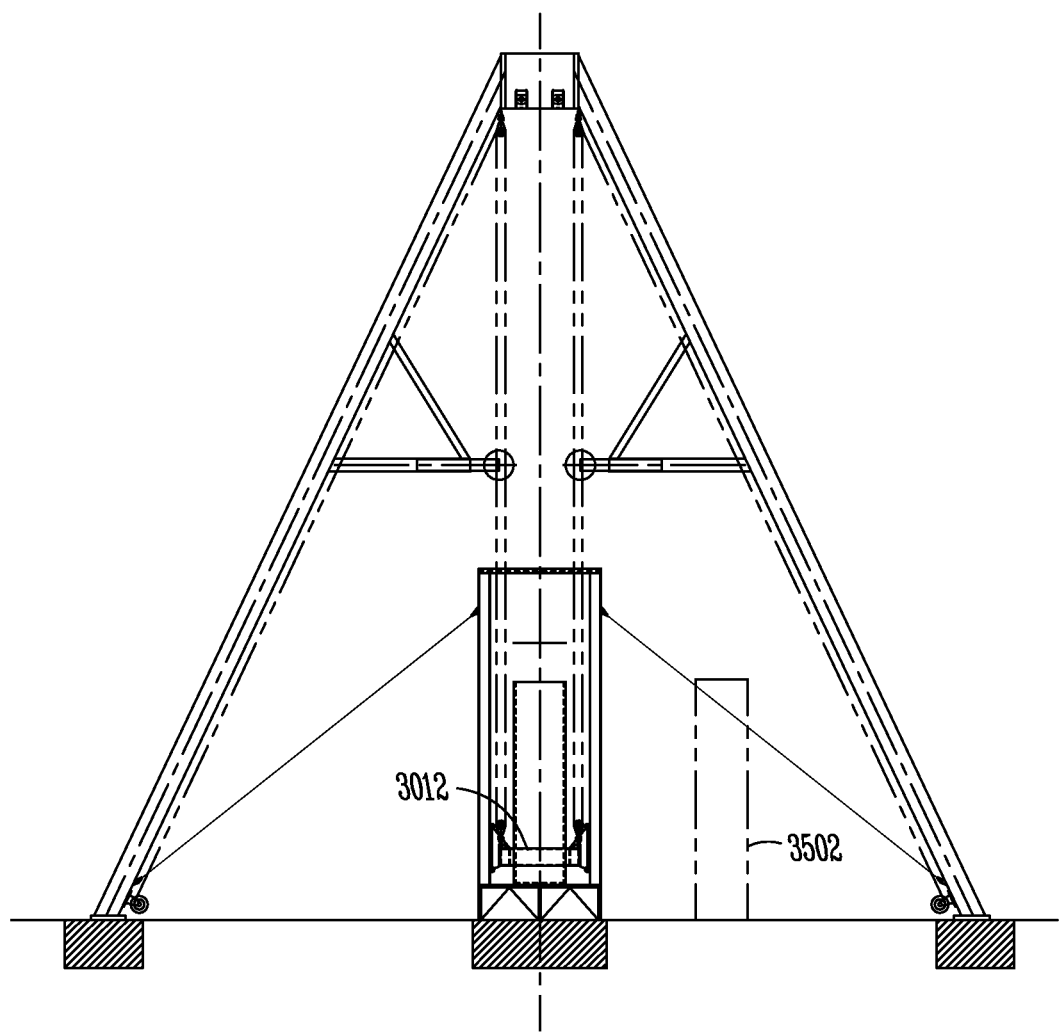
Figure 37:
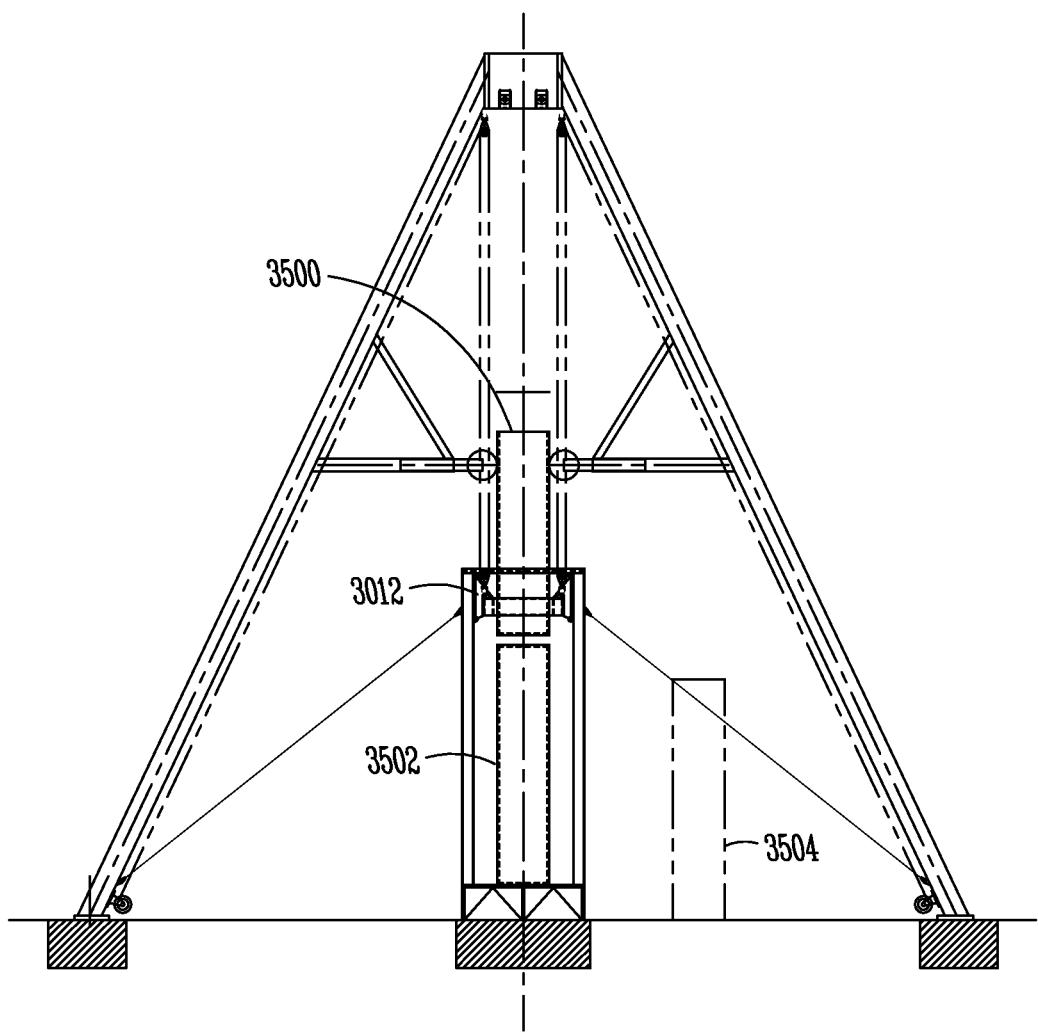
Figure 38:
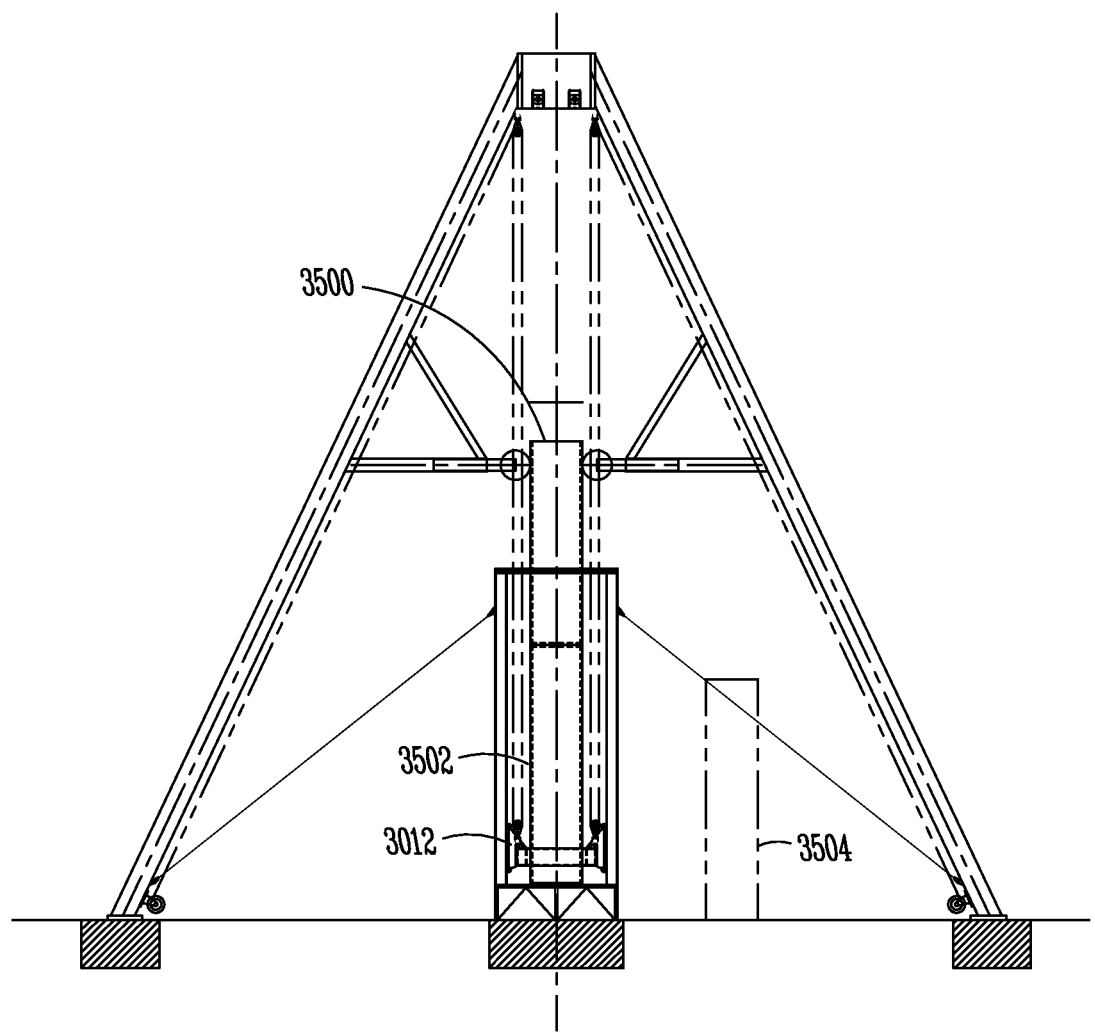
Figure 39:
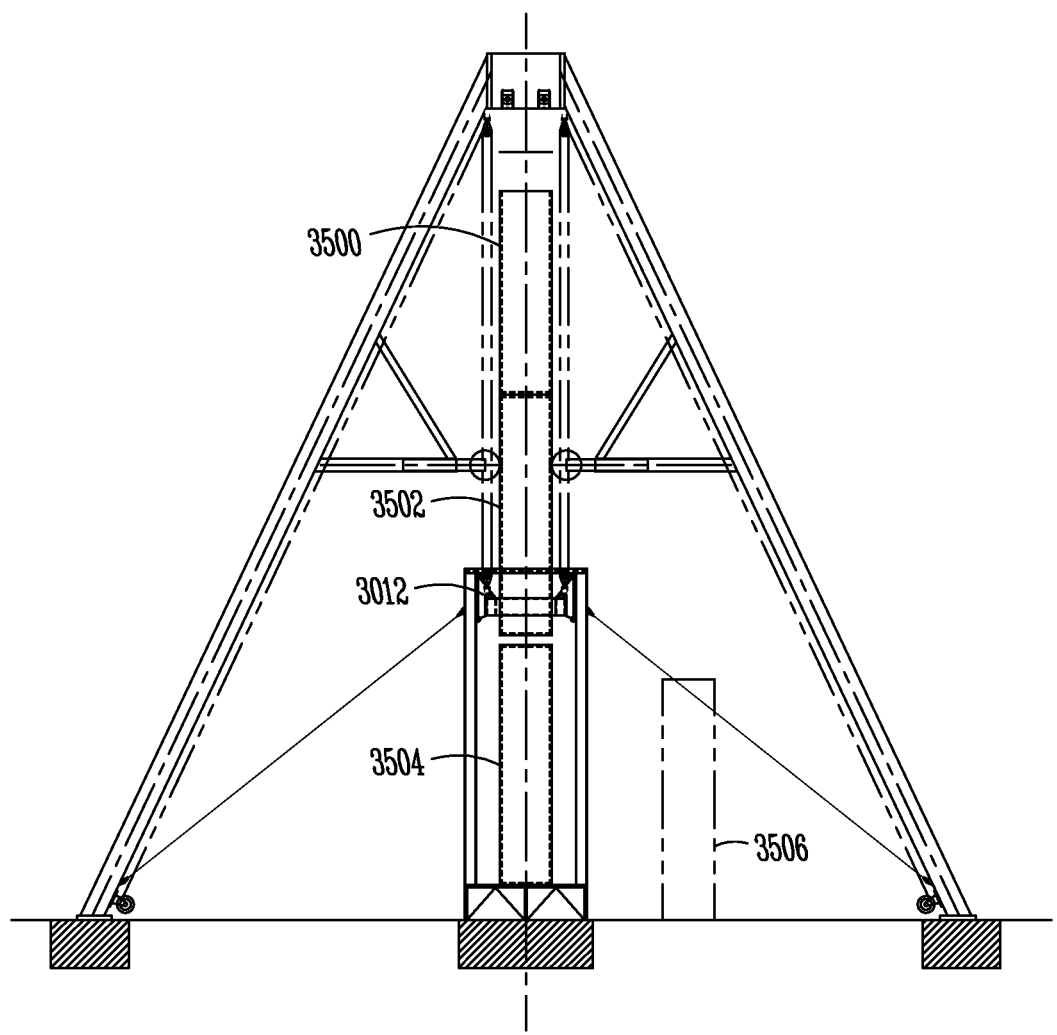
Figure 40:
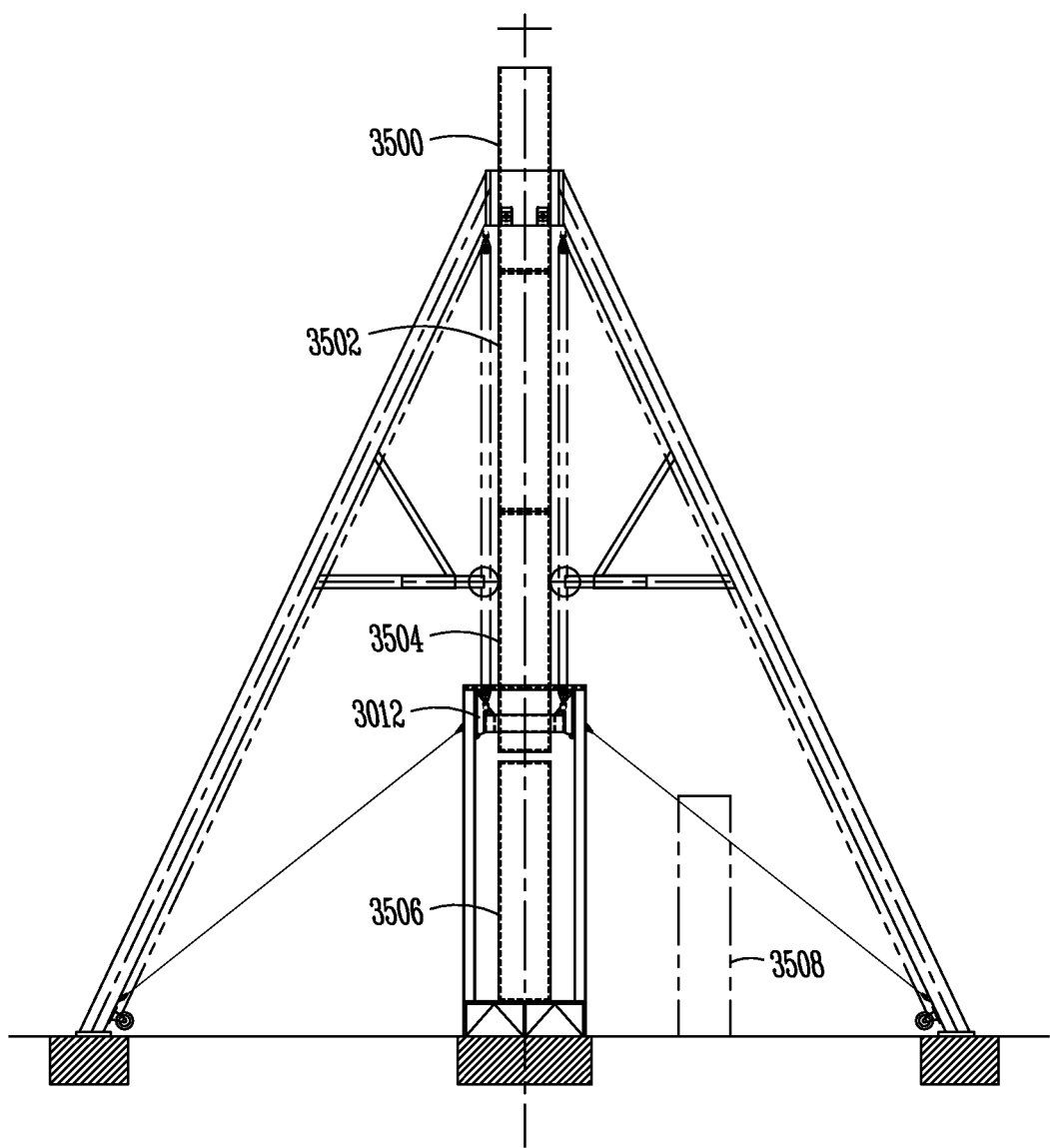

FIGS. 35-40 are side views of the tower erection system of FIG. 30 during a sequence of steps at the beginning of tower assembly, according to one or more embodiments. FIG. 35 shows the first, top-most tower section 3500 placed inside the bottom guide frame 3018, with the lifting ring 3012 positioned near the top of the guide frame 3018, above the tower section 3500. A second tower section 3502 is placed next to the guide frame on the ground. FIG. 36 illustrates the lifting ring 3012 in the bottom position, ready to pick up the first tower section 3500. In FIG. 37, the first tower section 3500 has been lifted by slightly more than one tower-section length, and the second tower section 3502 has been placed inside the guide frame 3018. A third tower section 3504 is placed next to the guide frame on the ground. FIG. 38 shows the first tower section 3500 lowered onto and connected to the second tower section 3502, and the lifting ring 3012 lowered to the bottom of the second tower section, ready to lift the connected tower portion including the first and second sections 3500, 3502. FIG. 39 illustrates the connected tower portion after lifting by slightly more than one tower-section length, with the third tower section 3504 placed underneath inside the guide frame 3018. FIG. 40 shows a connected tower portion including all three sections 3500, 3502, 3504 in a lifted position, ready for connection to a fourth tower section 3506 placed underneath inside the guide frame 3018, with a fifth tower section 3508 sitting on the ground next to the partially constructed tower.

Figure 41:
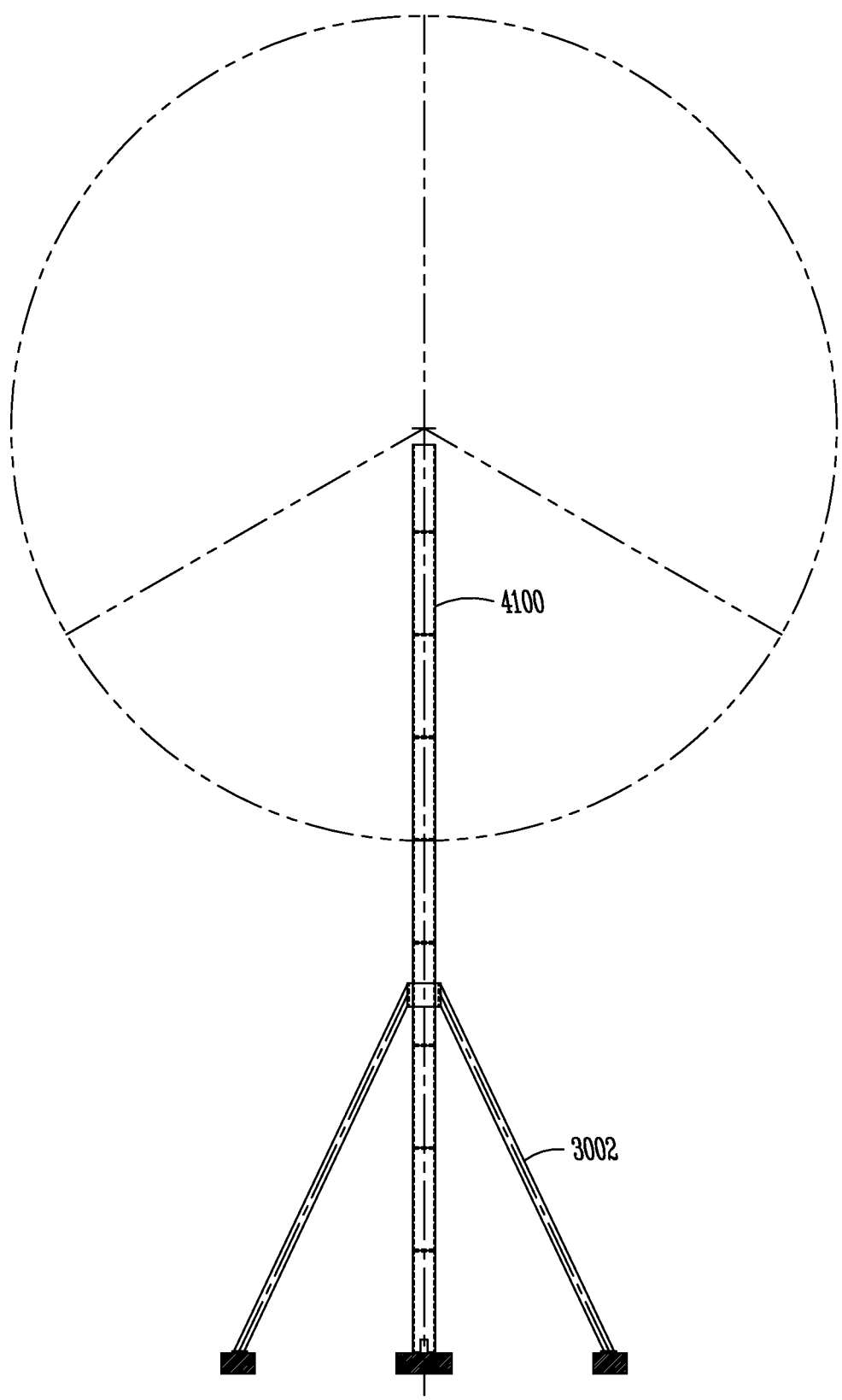
FIG. 41 is a side view of the completed tower with the tripod of the system of FIG. 30 left in place, according to one embodiment.
Figure 42:
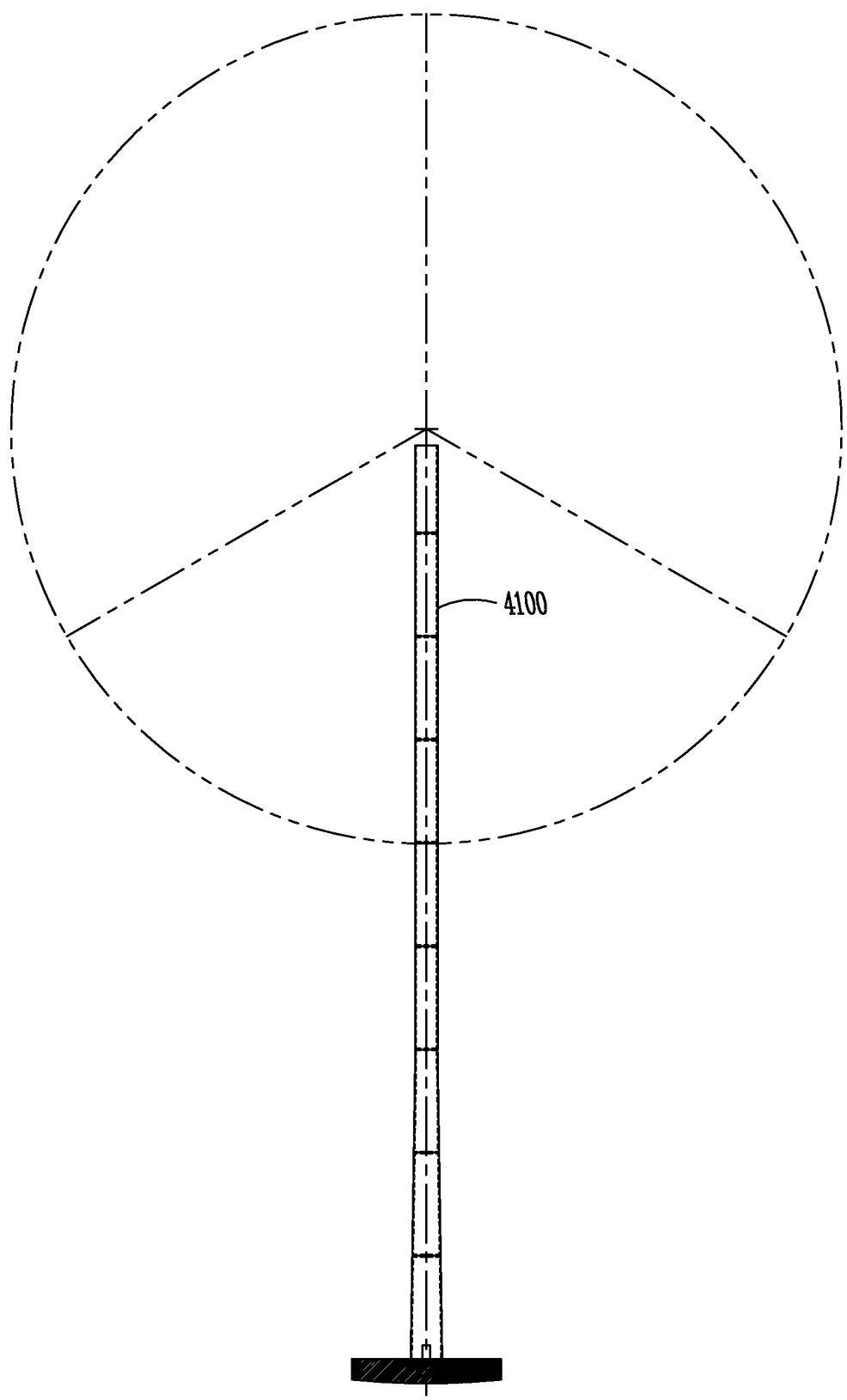
FIG. 42 is a side view of the completed tower after removal of the tripod of the system of FIG. 30, according to one embodiment.

After completion of the tower, the guide frame 3018, lifting ring 3012, and horizontal load-bearing rollers 3024 are removed from the assembly. The tripod 3002 may remain in place to continue stabilizing the tower. Alternatively, the tripod 3002 may likewise be removed, enabling it to be reused at another tower construction site. FIG. 41 is a side view of the completed tower 4100 with the tripod 3002 left in place according to one embodiment, and FIG. 42 is a side view of the completed tower 4100 after removal of the tripod 3002 according to an alternative embodiment.

Embodiments of tower erection systems for constructing a tower from the top down need not necessarily include each and every component of the mast-based or tripod-based systems described above with respect to FIGS. 1A-42. A tripod-based system, for example, may omit the bottom guide frame, and may, instead, use horizontal load-bearing rollers extending from the tripod at multiple vertical positions to provide stability to the tower during construction. Further, various system features may be combined across the two described system. The latching mechanism of the lifting frame depicted in the context of the four-mast system, for example, may be used in the tripod-based system as well. Other modifications and combinations resulting in embodiments that still operate based on concepts and principles discussed above may occur to those of ordinary skill in the art.

In various embodiments, tower erection systems as described herein (e.g., the system 100 or 3000) provide a lifting capacity of, for instance, 1000 tons, and allow wind turbine towers to be assembled to nacelle heights of, for example, 600 to 1000 feet above the ground, reaching far higher wind speeds than most conventional wind turbine towers. Beneficially, the described tower erection systems obviate the need for a large crane, entailing cost savings in tower assembly. The tower erection systems may be safely operable at wind speeds of up to (or even in excess of) 32 knots, which minimize downtime, further contributing to cost efficiency. When the wind does exceed a safe construction wind speed, the partially built wind turbine tower can simply be lowered onto the tower foundation and bolted down to wait out storm winds.

Another advantage of the tower erection systems described herein is that they are generally portable. Thus, once the tower is complete, the lifting structure 102 or tripod 3002 may be rigged down and towed to the next tower foundation to be rigged up for the next tower installation. Transportation of the lifting structure 102 or tripod 3002 can utilize the same vehicles as are employed to move the tower sections from, e.g., a wind turbine tower factory to an installation site. For example, the masts of structure 102, when laid down horizontally onto their respective bases, may be moved by the same kind of multi-wheeled trailers, which may fit between the mast system and the base outrigger loading ramps that are resting on the ground.

Having described multiple embodiments for erecting a tower with a ground-based lifting structure, the discussion now turns to a tower climbing system that can move up and down a fully or partially constructed tower. The tower climbing system may, in some embodiments, carry a crane (the climbing system and crane together constituting a self-climbing crane), as may be used to move equipment (including, e.g., tower parts such as turbine blades) up and down the tower for maintenance and/or repair, or to lift tower sections during construction of the tower. As will be appreciated, however, the tower climbing system is not limited to use for moving a crane up and down the tower, but is suited for transporting other types of equipment along the tower as well. Accordingly, the following description serves to illustrate the tower climbing system in the context of merely one example application.

Figure 43:
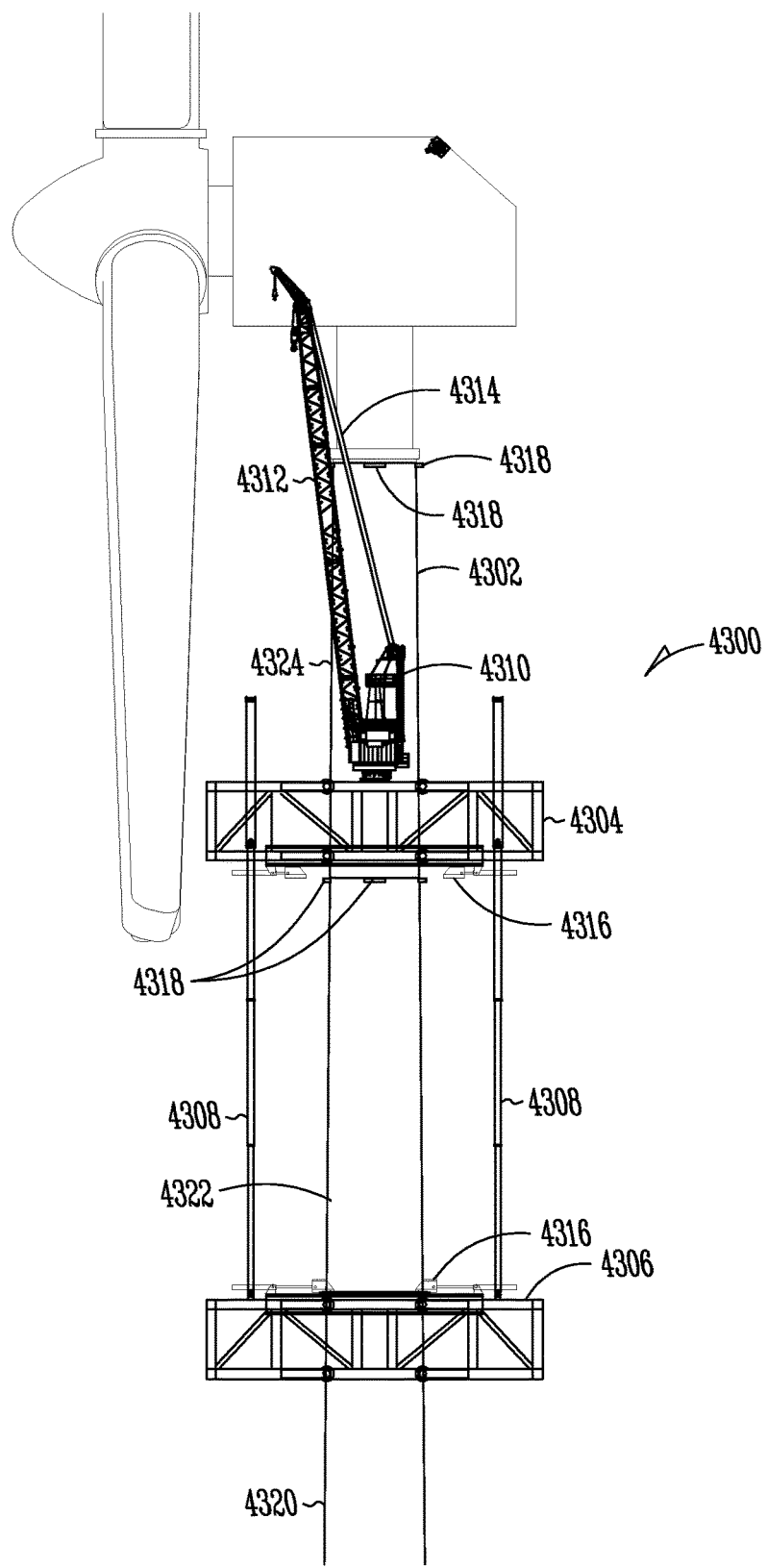
FIG. 43 is a side view of a tower climbing system mounted on a tower, according to one or more embodiments.

With reference to the figures, FIG. 43 is a side view of a tower climbing system 4300 mounted on a tower 4302, according to one or more embodiments. The system 4300 includes an upper climber 4304, a lower climber 4306, and a lifting mechanism 4308 extending between the upper and lower climbers 4304, 4306 to move the upper and lower climbers 4304, 4306 relative to one another in a vertical direction, along the tower 4302. The lifting mechanism 4308 may, for example, include telescoping hydraulic cylinders placed at multiple circumferential locations, e.g., at or near the corners of the upper and lower climbers 4304, 4306, as shown.

Mounted on top of the upper climber 4304 is a crane 4310. The crane may include a boom 4312 and an associated luffing cylinder and stabilizer, and a winch-and-cable mechanism with winch line 4314 running to a sheave at the top of the boom 4312. Compared with many ground-based cranes conventionally used in tower construction, which may be steel structures weighing hundreds of tons and having a boom length substantially more than one hundred meters in length, the crane 4310 mounted on, and moving along with, the upper climber 4304 may be relatively small, e.g., weighing less than one hundred tons and having a boom length of less than fifty meters (e.g., in one embodiment, 37 m). This smaller size can speed up assembly, increase transportation flexibility (e.g., reducing the number of trucks needed for delivering the crane to the tower site), save operational space, and ultimately lower construction cost, all—by virtue of the climbing system—without imposing limitations on the height of the tower.

The upper and lower climbers 4304, 4306 are configured to attach to the tower 4302 via a suitable latching mechanism, indicated generally at 4316 and illustrated in more detail in FIGS. 44A-44H. As shown in FIG. 43, the latches 4316 may engage with some type of lateral projection from the lateral surface of the tower, such as tabs 4318, which may be placed equidistantly along the tower, e.g., at intervals equal to the length of a tower section. For example, FIG. 43 shows three sections 4320, 4322, 4324 near the top of the tower 4302, each including a set of tabs 4318 spaced every 90° along the circumference of the tower at the top of the respective section. In the illustrated configuration, the lower climber 4306 is latched onto the tabs 4318 at the top of tower section 4320, and the upper climber 4304 is placed with its latches 4316 adjacent the tabs 4318 at the top of tower section 4322, ready to latch on. (Note that FIG. 43, for the sake of showing the latches of both upper and lower climbers 4304, 4306 in a single side view, depicts latching/unlatching of the climbers 4304, 4306 along the same horizontal direction. In practice, as explained below with respect to FIGS. 44A-44H, the upper and lower climbers 4304, 4306 may latch onto the tabs 4318 along different (e.g., mutually perpendicular) horizontal directions. Thus, for example, with the latches of the upper climber 4304 oriented as depicted, the latches of the lower climber 4306 may be extending in and out of the plane of the drawing.) The travel of the lifting mechanism 4308 is equal to or greater than the smallest vertical distance between any two sets of tabs 4318. For example, where tabs 4318 are spaced every section length (a section length being, e.g., 60 feet, 75 feet, or 90 feet), the lifting mechanism 4308 may have a travel just barely exceeding the section length, ensuring that the climbing system 4300 can climb up the tower all the way to the top without making the lifting mechanism 4308 longer than needed.

The latches may be configured to rest on top of the tabs 4318, such that the weight of the climbing system 4300, including the crane 4310, is born by any individual set of tabs 4318 placed in a horizontal plane at a given vertical position along the tower. In some embodiments, each latch 4316 includes a horizontal surface to be seated on one of the tabs 4318, and lateral surfaces to restrict lateral motion of the latch 4316 relative to the tab. However, other suitable latch structures may occur to those of ordinary skill in the art, and, in general, the precise structures of tabs 4318 and latches 4316 are not pertinent to the general concept of the disclosed tower climbing system 4300, provided that the tabs 4318 and latches 4316 are designed jointly to enable their engagement with each other, as well as meet specifications such as weight-bearing requirements.

Turning now to FIGS. 44A-44H, the upper and lower climbers 4304, 4306 are illustrated in more detail in top plan views. As shown, the upper and lower climbers 4304, 4306 include respective horizontal frames 4400, 4402 fully surrounding the tower. The frames may be, e.g., generally square-shaped, and are centered at the center of the tower. FIGS. 44A-44D show the climbers 4304, 4306 surrounding a larger-diameter portion 4404 of the tower (e.g., one of the tower sections near the bottom of a tapered tower), while FIGS. 44E-44H show the climbers 4304, 4306 surrounding a smaller-diameter portion 4406 of the tower (e.g., one of the tower sections near the top of the tower). The orientation of climbers 4304, 4306 relative to the tower is consistent across all eight figures. As can be seen in FIGS. 44A, 44C, 44E, and 44G, the crane 4310 is mounted on the frame 4400 of the upper climber 4304 to one side of the tower. Apart from any mounting features for the crane 4310 on the upper climber 4304, the upper and lower climbers 4304, 4306 may be substantially the same in structure.

As shown in each of FIGS. 44A-44H, the tower may include, at each of multiple vertical levels (e.g., at the top of each section), four tabs 4318 horizontally extending from its lateral surface, evenly spaced along its circumference (i.e., every 90°). The upper climber 4304 includes a pair of latches 4408, oriented and movable along a first horizontal direction 4409, and configured to engage with a pair of tabs 4318 placed on mutually opposite sides of the tower. The lower climber 4306, similarly, includes a pair of latches 4410, placed and movable along a second horizontal direction 4411 that is perpendicular to the first horizontal direction 4410, and configured to engage with the other pair of tabs 4318. This configuration allows both climbers 4304, 4306 to simultaneously latch to the tower at the same vertical position. While the climbers 4304, 4306 are each equipped with a single pair of latches 4408, 4410, modifications that include three or more latches (paired or unpaired) are also conceivable. For example, in a hexagonal configuration, each climber may include three latches placed 120° apart around the circumference of the tower, the sets of latches associated with the upper and lower climbers being displaced relative to one another by 60°. In another example embodiment, each climber may include two pairs of mutually opposite latches, i.e., four latches per climber. While higher number of latches may serve to latch the climbing system more securely onto the tower, a single pair of climbers will suffice for many embodiments, and benefits from lower cost and complexity.

Figure 44D:
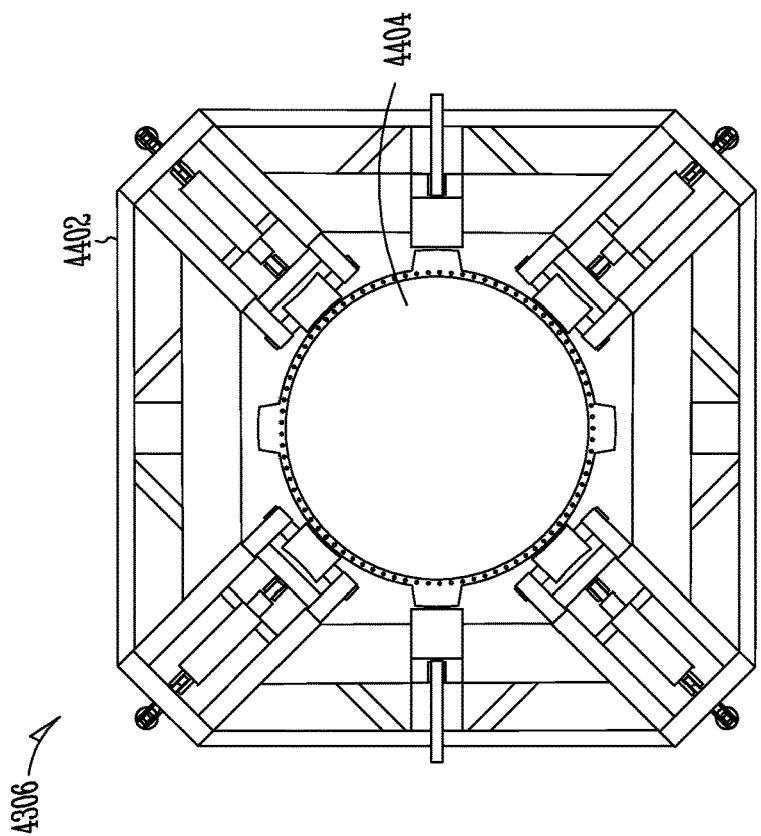
FIGS. 44C and 44D are top plan views of the upper climber and lower climber shown in FIGS. 44A and 44B when unlatched from the large-diameter tower section.
Figure 44C:
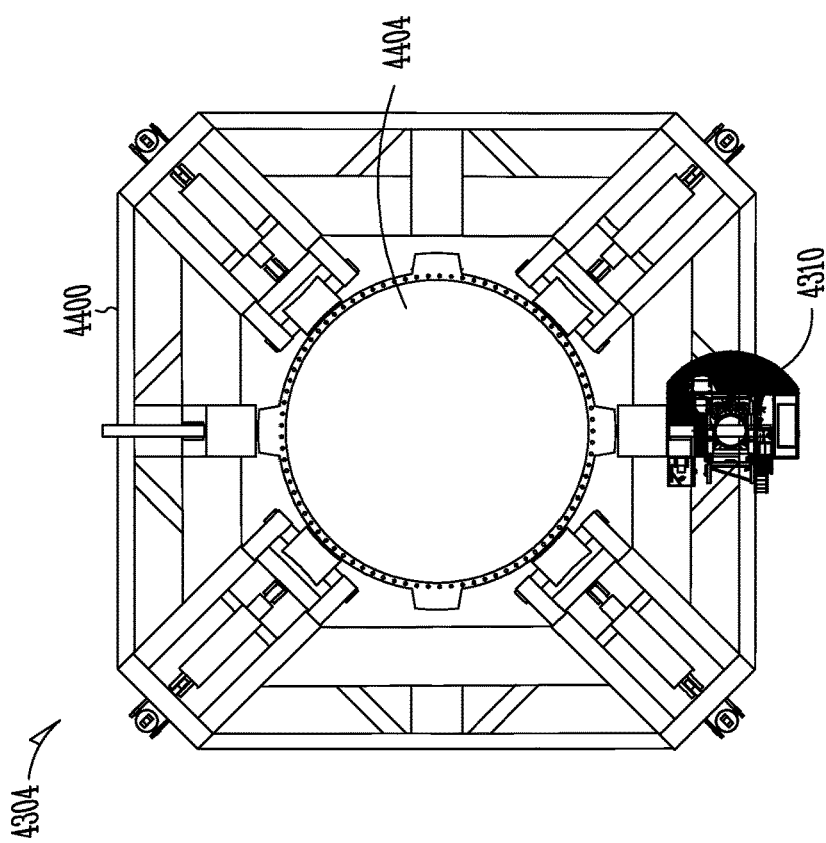

The latches 4408, 4410 may be moved towards (into engagement with) and away from the tower by (e.g., telescoping) hydraulic cylinders 4412. More specifically, to engage a latch 4408, 4410 having a horizontal seating surface (as mentioned above) with the corresponding tab 4318, the latch 4408, 4410 is moved radially inward and positioned just above the tab 4318, and then lowered onto the tab 4318 to latch. To disengage (or "unlatch"), the latch 4408, 4410 is lifted up from the tab 4318, and then retracted radially. (The general latching and unlatching directions are horizontal, notwithstanding the small vertical movement to seat and unseat the horizontal surface.) FIGS. 44A and 44E show the latches 4408 of the upper climber 4304 in the extended, latched state. As can be seen, for a smaller-diameter tower portion 4406, the hydraulic cylinders 4412 are extended more to move the latches 4408 farther inward. FIGS. 44C and 44G illustrate the latches 4408 of the upper climber 4304 in the retraced, unlatched state. Similarly, FIGS. 44B and 44F show the lower climber 4306 in the latched state, while FIGS. 44D and 44H depict the lower climber 4306 in the unlatched state.

In addition to the latches 4408, 4410, the upper and lower climbers 4304, 4306 may have associated horizontal load-bearing rollers 4414. In the depicted embodiment, these rollers 4414 are located in between the latches 4408, 4410, along diagonals of the square-shaped frames 4400, 4402, forming two pairs of rollers 4414 that engage the lateral surface of the tower on opposite sides. The rollers 4414 serve to laterally stabilize the tower climbing system 4300, and, in use, remain continuously engaged with the tower surface, rolling along the surface as the climbers 4304, 4306 move up and down the tower. Like the latches 4408, 4410, the rollers 4414 are equipped with horizontal telescoping cylinders 4416 that can extend and retract to keep the rollers 4414 engaged with the tower surface while accommodating a varying tower diameter. Thus, FIGS. 44E-44H show the hydraulic cylinders 4416 associated with the rollers 4414 extended farther to reach the smaller diameter of the tower portion 4406. Note that, since the rollers 4414 engage with the cylindrical tower surface itself rather than with any projections from that surface at certain heights, there is no need for allowing the rollers 4414 of the upper climber 4304 to be placed in the same horizontal plane as the rollers 4414 of the lower climber 4306. Accordingly, the rollers 4314 of the upper climber 4304 need not be (and, in the depicted embodiment, are not) displaced relative to the rollers 4314 of the lower climber 4306.

Figure 45H:
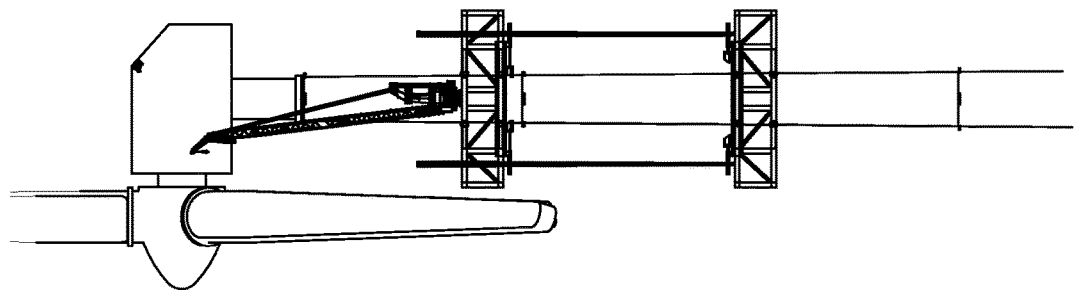
Figure 45G:
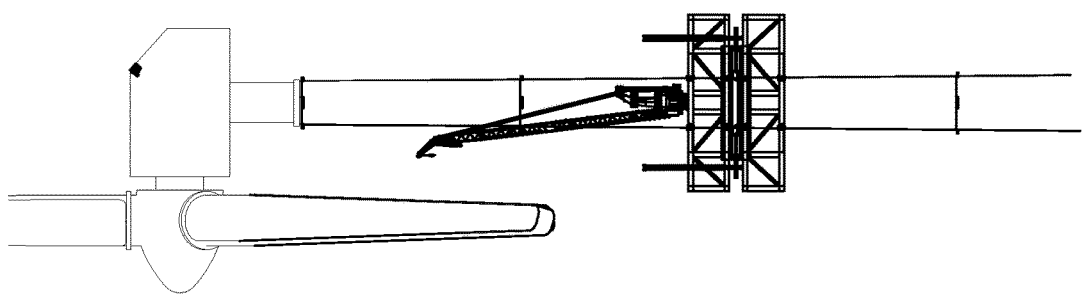
Figure 45F:
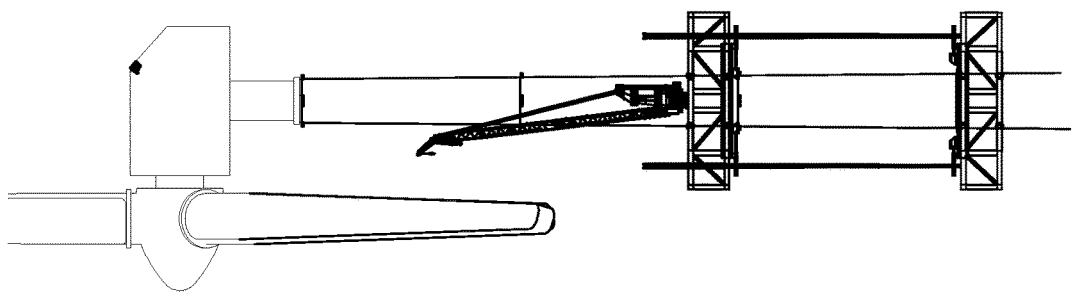
Figure 45E:
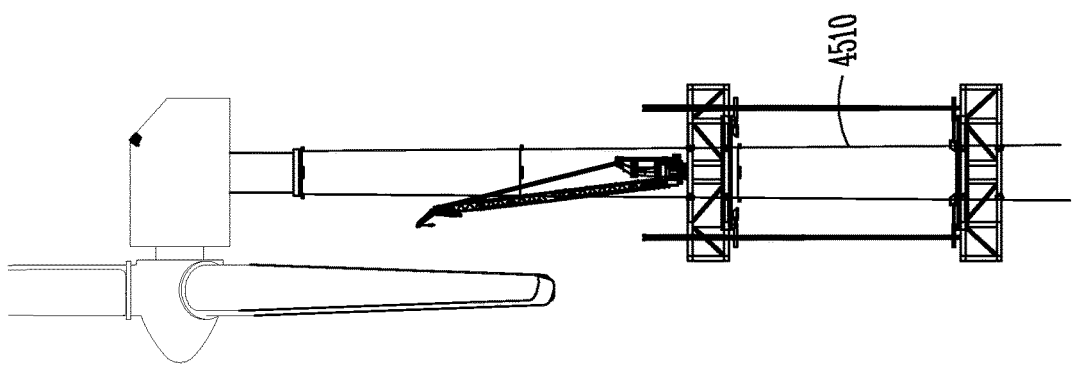
Figure 45L:
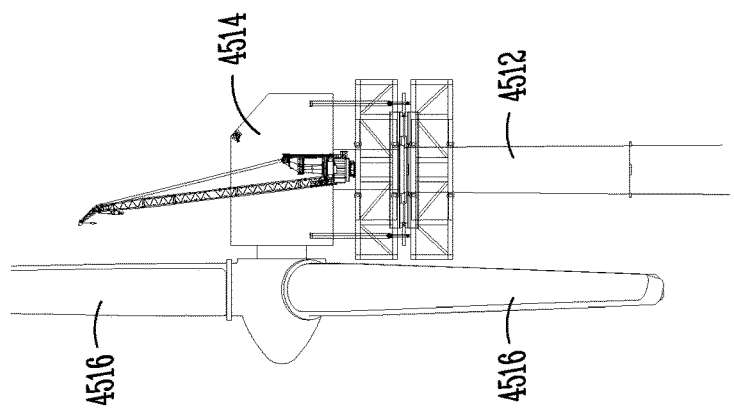
Figure 45K:
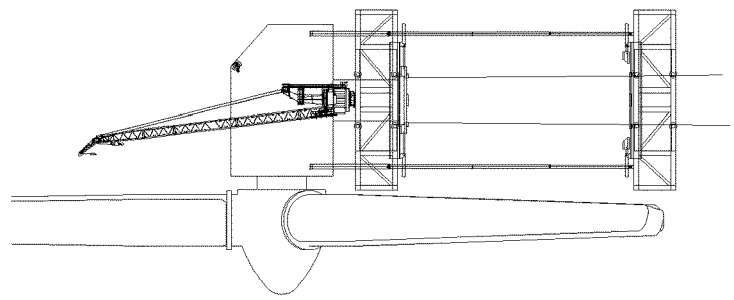
Figure 45J:
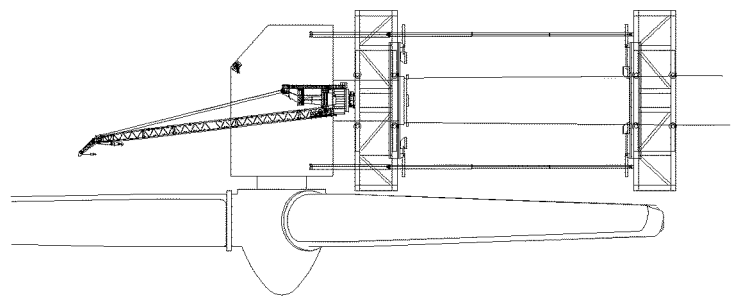
Figure 45I:
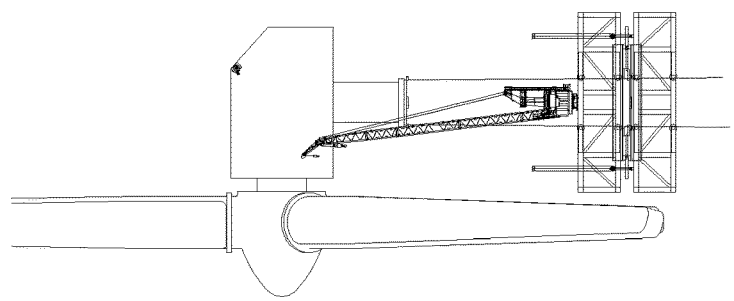

Turning now to FIGS. 45A-45L, a sequence of side views of the tower climbing system 4300 in various positions along a tower illustrates the operation of the system 4300 in accordance with various embodiments. FIG. 45A shows the tower climbing system 4300, including the crane 4310, installed at the bottom of the tower, where the first, bottom-most full-length tower section 4500 interfaces with the tower base 4502 (a typically shorter tower section that may be deemed part of the foundation) beneath. At least the lower climber 4306 is latched onto the tower (e.g., onto tabs at the top of the tower base 3402). (Note that FIGS. 45A-45L, like FIG. 43, show the latches of both upper and lower climbers along the same horizontal direction for the sake of depicting them in the same side view. In practice, as explained above with respect to FIGS. 44A-44H, the upper and lower climbers may latch onto the tabs along different (e.g., mutually perpendicular) horizontal directions.) With the lower climber 4306 latched, the upper climber 4304 can be lifted, e.g., by one section length, as shown in FIG. 45B, by operating the lifting mechanism 4308 between the upper and lower climbers 4304, 4306. For example, four hydraulic cylinders 4304 vertically extending between corresponding corners of the square-shaped upper and lower climbers 4304, 4306 may be extended to push the upper climber 4304 upward relative to the lower climber. The upper climber 4304 can then be latched onto the tower at the top of the first tower section 4500 (see FIG. 45C), and the lower climber 4306 can be pulled all the way to the upper climber 4304 by retracting the telescoping cylinders 4504 of the operating mechanism (see FIG. 45D). The lower climber 4306 can now latch to the top of the first tower section 4500, and the upper climber can be unlatched and lifted to the top of the second tower section 4506. By repeating this process, the tower climbing system can "crawl" up the tower one tower section at a time. FIG. 45E shows the tower climbing system 4300 after multiple iterations, when it has reached a tower section 4510 near the top of the tower, and FIGS. 45F-45L illustrate the last few climbing iterations, with the tower climbing system 4300 and crane 4310 ending up at the top-most section 4512, where the crane is in position to reach the nacelle 4514 and blades 4516. Once work at the top of the tower is complete, the climbing system 4300 can reverse the process to crawl down the tower by latching the upper climber 4304, unlatching and lowering the lower climber 4306, latching the lower climber 4306, unlatching and lowering the upper climber 4304 down to the lower climber 4306, etc.

Various modifications to the described climbing process may be made without departing from the general principles underlying the disclosed approach. For example, as will be appreciated by those of ordinary skill in the art, the climbing increment need not necessarily be one section length. A climbing system may, for example, be configured with a travel of the lifting mechanism equal to two section lengths, allowing the climbers to be moved up and down in increments of two section lengths. Further, the lower climber 4306 need not necessarily move all the way up to the upper climber 4304 during an iteration, but may latch onto the tower 4302 at a lower position, provided the tower includes tabs 4318 at the appropriate locations. For example, with a lifting mechanism 4308 having a travel equal to two section lengths, the climbers may move only one section length at a time, keeping a vertical distance between one and two section lengths. It is also possible for the tower to have tabs along two sets of equidistant vertical locations, e.g., at the top as well as the bottom of each section. In this case, the climbing system need not be configured to allow both upper and lower climbers 4304, 4306 to latch onto the tower at the same vertical position, as the upper climber 4304 may latch, for example, to the tabs at the bottom of one tower section, with the lower climber 4306 latching onto the tabs at the top of the tower section immediately below.

While FIGS. 45A-45L describe the process of climbing up an already erected tower 4302, it will be appreciated that the same tower climbing system 4300 may also be utilized to build the tower 4302. To do so, the climbing system 4300, once the first tower section is in place, may climb up to the top of that first section, and the now tower-mounted crane 4310 may lift the second tower section and place it on top of the first tower section. Upon connection of the two sections, the climbing system 4300 may advance to the top of the second tower section, the crane 4310 may lift and place the third tower section, and so on, until the last, highest tower section has been connected to the tower. The crane 4310, now at the top of the tower, can then be used to lift the nacelle and blades.

In the foregoing description, various embodiments of the present disclosure have been presented to provide an illustration of the principals of the disclosure and their practical application, and to enable one of ordinary skill in the art to utilize the various embodiments, including with various modifications as are suited to the particular use contemplated. All such modifications and variations are within the scope of the present disclosure. The specific described embodiments are not intended to be exhaustive or to limit the invention to the precise form disclosed.

What is claimed is:

1. A tower climbing system, comprising:
an upper climber comprising a first frame to surround a tower and a first latching mechanism to latch onto a first subset of a plurality of projections arranged at a horizontal plane and extending from a lateral surface of the tower;
a lower climber comprising a second frame to surround the tower and a second latching mechanism to latch onto a second subset of the plurality of projections arranged at the horizontal plane and extending from the lateral surface of the tower, the second latching mechanism being displaced along a circumference of the tower relative to the first latching mechanism such that the second latching mechanism can be arranged inplane with the first latching mechanism allowing for the second latching mechanism to latch onto the second subset simultaneously with the first latching mechanism being latched onto the first subset; and a lifting mechanism to move the upper and lower climbers vertically relative to one another.

2. The tower climbing system of claim 1, wherein:

the upper climber further comprises a first set of horizontal load-bearing rollers to rollably engage the lateral surface of the tower; and the lower climber further comprises a second set of horizontal load-bearing rollers to rollably engage the lateral surface of the tower.

3. The tower climbing system of claim 2, wherein the horizontal load-bearing rollers of the upper and lower climbers are movable radially relative to the tower so as to accommodate a varying diameter of the tower.

4. The tower climbing system of claim 2, wherein the horizontal load-bearing rollers are movable radially by respective associated horizontal hydraulic cylinders.

5. The tower climbing system of claim 1, wherein the first and second latching mechanisms are oriented horizontally, and wherein the first latching mechanism is oriented perpendicularly to the second horizontal latching mechanism.

6. The tower climbing system of claim 5, wherein the first and second latching mechanisms each comprise a pair of latches to latch horizontally onto two projections extending from mutually opposite sides of the tower.

7. The tower climbing system of claim 6, wherein the latches each comprise a horizontal surface to be seated on one of the projections and lateral surfaces to restrict lateral motion of the latch relative to the projection.

8. The tower climbing system of claim 1, wherein the lifting mechanism comprises a plurality of hydraulic cylinders connected between the upper and lower climbers.

9. The tower climbing system of claim 1, wherein the lifting mechanism has a travel of at least sixty feet.

10. The tower climbing system of claim 1, further comprising a crane mounted on the upper climber.

11. The tower climbing system of claim 10, wherein the crane comprises a boom with associated luffing cylinder and stabilizer, and a winch-and-cable mechanism with winch line running from the upper climber to a sheave at a top of the boom.

* * * * *